United States Patent
Aravamudan et al.

(10) Patent No.: US 10,984,037 B2
(45) Date of Patent: Apr. 20, 2021

(54) METHODS AND SYSTEMS FOR SELECTING AND PRESENTING CONTENT ON A FIRST SYSTEM BASED ON USER PREFERENCES LEARNED ON A SECOND SYSTEM

(71) Applicant: Veveo, Inc., Andover, MA (US)

(72) Inventors: Murali Aravamudan, Andover, MA (US); Ajit Rajasekharan, West Windsor, NJ (US); Kajamalai G. Ramakrishnan, Nashua, NH (US)

(73) Assignee: Veveo, Inc., Andover, MA (US)

(*) Notice: Subject to any disclaimer, the term of this patent is extended or adjusted under 35 U.S.C. 154(b) by 801 days.

(21) Appl. No.: 14/473,441

(22) Filed: Aug. 29, 2014

(65) Prior Publication Data
US 2015/0149443 A1 May 28, 2015

Related U.S. Application Data

(63) Continuation of application No. 13/959,289, filed on Aug. 5, 2013, now Pat. No. 8,825,576, which is a (Continued)

(51) Int. Cl.
*G06F 16/438* (2019.01)
*G06F 16/248* (2019.01)
(Continued)

(52) U.S. Cl.
CPC .......... *G06F 16/438* (2019.01); *G06F 16/248* (2019.01); *G06F 16/2453* (2019.01);
(Continued)

(58) Field of Classification Search
None
See application file for complete search history.

(56) References Cited

U.S. PATENT DOCUMENTS

| | | |
|---|---|---|
| 3,440,427 A | 4/1969 | Kammer |
| 3,492,577 A | 1/1970 | Reiter et al. |

(Continued)

FOREIGN PATENT DOCUMENTS

| | | |
|---|---|---|
| AU | 199856198 A | 7/1998 |
| AU | 731010 B2 | 3/2001 |

(Continued)

OTHER PUBLICATIONS

US 5,047,897 A, 09/1991, Strubbe et al. (withdrawn)
(Continued)

*Primary Examiner* — Stanley K. Hill
(74) *Attorney, Agent, or Firm* — Haley Guiliano LLP

(57) ABSTRACT

A method of selecting and presenting content on a first system based on user preferences learned on a second system is provided. The method includes receiving a user's input for identifying items of the second content system and, in response thereto, presenting a subset of items of the second content system and receiving the user's selection actions thereof. The method includes analyzing the selected items to learn the user's content preferences for the content of the second content system and determining a relationship between the content of the first and second content systems to determine preferences relevant to items of the first content system. The method includes, in response subsequent user input for items of the first content system, selecting and ordering a collection of items of the first content system based on the user's learned content preferences determined to be relevant to the items of the first content system.

12 Claims, 14 Drawing Sheets

Related U.S. Application Data continuation of application No. 13/021,086, filed on Feb. 4, 2011, now Pat. No. 8,543,516, which is a continuation of application No. 12/882,451, filed on Sep. 15, 2010, now Pat. No. 7,885,904, which is a continuation of application No. 11/682,588, filed on Mar. 6, 2007, now Pat. No. 7,835,998.

(60) Provisional application No. 60/834,966, filed on Aug. 2, 2006, provisional application No. 60/796,614, filed on May 1, 2006, provisional application No. 60/784,027, filed on Mar. 20, 2006, provisional application No. 60/779,547, filed on Mar. 6, 2006.

(51) Int. Cl.
| | | |
|---|---|---|
| *G06F 16/28* | (2019.01) | |
| *G06F 16/335* | (2019.01) | |
| *G06F 16/435* | (2019.01) | |
| *G06F 16/68* | (2019.01) | |
| *G06F 16/951* | (2019.01) | |
| *G06F 16/2453* | (2019.01) | |
| *G06F 16/2457* | (2019.01) | |
| *G06F 16/2458* | (2019.01) | |
| *G06F 16/9535* | (2019.01) | |
| *H04N 21/442* | (2011.01) | |
| *H04N 21/482* | (2011.01) | |

(52) U.S. Cl.
CPC ...... *G06F 16/2457* (2019.01); *G06F 16/2462* (2019.01); *G06F 16/24578* (2019.01); *G06F 16/284* (2019.01); *G06F 16/335* (2019.01); *G06F 16/337* (2019.01); *G06F 16/435* (2019.01); *G06F 16/437* (2019.01); *G06F 16/686* (2019.01); *G06F 16/951* (2019.01); *G06F 16/9535* (2019.01); *H04N 21/44222* (2013.01); *H04N 21/4828* (2013.01); *Y10S 707/99933* (2013.01); *Y10S 707/99934* (2013.01); *Y10S 707/99937* (2013.01); *Y10S 707/99943* (2013.01); *Y10S 707/99945* (2013.01)

(56) References Cited

U.S. PATENT DOCUMENTS

| | | |
|---|---|---|
| 3,493,674 A | 2/1970 | Houghton |
| 3,729,581 A | 4/1973 | Anderson |
| 3,833,757 A | 9/1974 | Kirk, Jr. et al. |
| 3,891,792 A | 6/1975 | Kimura |
| 3,936,868 A | 2/1976 | Thorpe |
| 3,996,583 A | 12/1976 | Hutt et al. |
| 4,004,085 A | 1/1977 | Makino et al. |
| 4,016,361 A | 4/1977 | Pandey |
| 4,024,401 A | 5/1977 | Bernstein et al. |
| 4,026,555 A | 5/1977 | Kirschner et al. |
| 4,031,548 A | 6/1977 | Kato et al. |
| 4,052,719 A | 10/1977 | Hutt et al. |
| 4,058,830 A | 11/1977 | Guinet et al. |
| 4,070,693 A | 1/1978 | Shutterly |
| 4,079,419 A | 3/1978 | Siegle et al. |
| 4,081,753 A | 3/1978 | Miller |
| 4,081,754 A | 3/1978 | Jackson |
| 4,096,524 A | 6/1978 | Scott |
| 4,103,524 A | 8/1978 | Mitchell et al. |
| 4,134,127 A | 1/1979 | Campioni |
| 4,139,860 A | 2/1979 | Micic et al. |
| 4,150,254 A | 4/1979 | Schussler et al. |
| 4,156,850 A | 5/1979 | Beyers, Jr. |
| 4,161,728 A | 7/1979 | Insam |
| 4,162,513 A | 7/1979 | Beyers, Jr. et al. |
| 4,170,782 A | 10/1979 | Miller |
| 4,186,413 A | 1/1980 | Mortimer |
| 4,189,781 A | 2/1980 | Douglas |
| 4,203,130 A | 5/1980 | Doumit et al. |
| 4,205,343 A | 5/1980 | Barrett |
| 4,218,698 A | 8/1980 | Bart et al. |
| 4,228,543 A | 10/1980 | Jackson |
| 4,231,031 A | 10/1980 | Crowther et al. |
| 4,233,628 A | 11/1980 | Ciciora |
| 4,249,211 A | 2/1981 | Baba et al. |
| 4,249,213 A | 2/1981 | Imaide et al. |
| 4,261,006 A | 4/1981 | Weintraub et al. |
| 4,264,924 A | 4/1981 | Freeman |
| 4,264,925 A | 4/1981 | Freeman et al. |
| 4,270,145 A | 5/1981 | Farina |
| 4,271,532 A | 6/1981 | Wine |
| 4,276,597 A | 6/1981 | Dissly et al. |
| 4,280,148 A | 7/1981 | Saxena |
| 4,283,787 A | 8/1981 | Chambers |
| 4,288,809 A | 9/1981 | Yabe |
| 4,290,142 A | 9/1981 | Schnee et al. |
| 4,300,040 A | 11/1981 | Gould et al. |
| 4,305,101 A | 12/1981 | Yarbrough et al. |
| 4,329,684 A | 5/1982 | Monteath et al. |
| 4,331,974 A | 5/1982 | Cogswell et al. |
| 4,337,480 A | 6/1982 | Bourassin et al. |
| 4,337,482 A | 6/1982 | Coutta |
| 4,337,483 A | 6/1982 | Guillou |
| 4,344,090 A | 8/1982 | Belisomi et al. |
| 4,355,415 A | 10/1982 | George et al. |
| 4,367,557 A | 1/1983 | Stern et al. |
| 4,367,559 A | 1/1983 | Tults |
| 4,375,651 A | 3/1983 | Templin et al. |
| 4,381,522 A | 4/1983 | Lambert |
| 4,385,210 A | 5/1983 | Marquiss |
| 4,388,645 A | 6/1983 | Cox et al. |
| 4,390,901 A | 6/1983 | Keiser |
| 4,393,376 A | 7/1983 | Thomas |
| 4,403,285 A | 9/1983 | Kikuchi |
| 4,405,946 A | 9/1983 | Knight |
| 4,412,244 A | 10/1983 | Shanley, II |
| 4,413,281 A | 11/1983 | Thonnart |
| 4,420,769 A | 12/1983 | Novak |
| 4,425,579 A | 1/1984 | Merrell |
| 4,425,581 A | 1/1984 | Schweppe et al. |
| 4,429,385 A | 1/1984 | Cichelli et al. |
| 4,439,784 A | 3/1984 | Furukawa et al. |
| 4,449,249 A | 5/1984 | Price |
| 4,456,925 A | 6/1984 | Skerlos et al. |
| 4,466,017 A | 8/1984 | Banker |
| 4,477,830 A | 10/1984 | Lindman et al. |
| 4,488,179 A | 12/1984 | Kru/ ger et al. |
| 4,495,654 A | 1/1985 | Deiss |
| 4,496,171 A | 1/1985 | Cherry |
| 4,496,804 A | 1/1985 | Hung |
| 4,496,976 A | 1/1985 | Swanson et al. |
| 4,510,623 A | 4/1985 | Bonneau et al. |
| 4,520,404 A | 5/1985 | Von Kohorn |
| 4,523,228 A | 6/1985 | Banker |
| 4,527,194 A | 7/1985 | Sirazi |
| 4,531,020 A | 7/1985 | Wechselberger et al. |
| 4,533,910 A | 8/1985 | Sukonick et al. |
| 4,536,791 A | 8/1985 | Campbell et al. |
| 4,547,804 A | 10/1985 | Greenberg |
| 4,554,584 A | 11/1985 | Elam et al. |
| 4,555,755 A | 11/1985 | Kurosawa et al. |
| 4,555,775 A | 11/1985 | Pike |
| 4,566,034 A | 1/1986 | Harger et al. |
| 4,573,072 A | 2/1986 | Freeman |
| 4,587,520 A | 5/1986 | Astle |
| 4,595,951 A | 6/1986 | Filliman |
| 4,595,952 A | 6/1986 | Filliman |
| 4,598,288 A | 7/1986 | Yarbrough et al. |
| 4,602,279 A | 7/1986 | Freeman |
| 4,605,964 A | 8/1986 | Chard |
| 4,605,973 A | 8/1986 | Von Kohorn |
| 4,608,859 A | 9/1986 | Rockley |
| 4,611,269 A | 9/1986 | Suzuki et al. |
| 4,620,229 A | 10/1986 | Amano et al. |
| 4,622,545 A | 11/1986 | Atkinson |
| 4,635,109 A | 1/1987 | Comeau |

(56) References Cited

U.S. PATENT DOCUMENTS

| | | |
|---|---|---|
| 4,635,121 A | 1/1987 | Hoffman et al. |
| 4,641,205 A | 2/1987 | Beyers, Jr. |
| 4,677,466 A | 6/1987 | Lert, Jr. et al. |
| 4,677,501 A | 6/1987 | Saltzman et al. |
| 4,685,131 A | 8/1987 | Home |
| 4,689,022 A | 8/1987 | Peers et al. |
| 4,691,351 A | 9/1987 | Hayashi et al. |
| 4,694,490 A | 9/1987 | Harvey et al. |
| 4,701,794 A | 10/1987 | Froling et al. |
| 4,704,725 A | 11/1987 | Harvey et al. |
| 4,706,121 A | 11/1987 | Young |
| 4,712,105 A | 12/1987 | Kohler |
| 4,714,919 A | 12/1987 | Foster |
| 4,718,107 A | 1/1988 | Hayes |
| RE32,632 E | 3/1988 | Atkinson |
| 4,729,027 A | 3/1988 | Hakamada et al. |
| 4,729,028 A | 3/1988 | Micic et al. |
| 4,734,769 A | 3/1988 | Davis |
| 4,745,549 A | 5/1988 | Hashimoto |
| 4,746,983 A | 5/1988 | Hakamada |
| 4,748,618 A | 5/1988 | Brown et al. |
| 4,750,036 A | 6/1988 | Martinez |
| 4,750,213 A | 6/1988 | Novak |
| 4,751,578 A | 6/1988 | Reiter et al. |
| 4,754,326 A | 6/1988 | Kram et al. |
| 4,768,228 A | 8/1988 | Clupper et al. |
| 4,772,882 A | 9/1988 | Mical |
| 4,775,935 A | 10/1988 | Yourick |
| 4,785,408 A | 11/1988 | Britton et al. |
| 4,787,063 A | 11/1988 | Muguet |
| 4,812,834 A | 3/1989 | Wells |
| 4,814,883 A | 3/1989 | Perine et al. |
| 4,821,102 A | 4/1989 | Ichikawa et al. |
| 4,821,211 A | 4/1989 | Torres |
| 4,829,558 A | 5/1989 | Welsh |
| 4,847,604 A | 7/1989 | Doyle |
| 4,847,698 A | 7/1989 | Freeman |
| 4,847,700 A | 7/1989 | Freeman |
| 4,847,744 A | 7/1989 | Araki |
| 4,855,813 A | 8/1989 | Russell et al. |
| 4,857,999 A | 8/1989 | Welsh |
| 4,862,268 A | 8/1989 | Campbell et al. |
| 4,864,429 A | 9/1989 | Eigeldinger et al. |
| 4,873,584 A | 10/1989 | Hashimoto |
| 4,873,623 A | 10/1989 | Lane et al. |
| 4,876,600 A | 10/1989 | Pietzsch et al. |
| 4,882,732 A | 11/1989 | Kaminaga |
| 4,884,223 A | 11/1989 | Ingle et al. |
| 4,888,796 A | 12/1989 | Olivo, Jr. |
| 4,890,168 A | 12/1989 | Inoue et al. |
| 4,890,320 A | 12/1989 | Monslow et al. |
| 4,890,321 A | 12/1989 | Seth-Smith et al. |
| 4,894,789 A | 1/1990 | Yee |
| 4,899,136 A | 2/1990 | Beard et al. |
| 4,899,139 A | 2/1990 | Ishimochi et al. |
| 4,905,094 A | 2/1990 | Pocock et al. |
| 4,908,707 A | 3/1990 | Kinghorn |
| 4,908,713 A | 3/1990 | Levine |
| 4,908,859 A | 3/1990 | Bennett et al. |
| 4,914,517 A | 4/1990 | Duffield |
| 4,914,732 A | 4/1990 | Henderson et al. |
| 4,918,531 A | 4/1990 | Johnson |
| 4,930,158 A | 5/1990 | Vogel |
| 4,930,160 A | 5/1990 | Vogel |
| 4,931,783 A | 6/1990 | Atkinson |
| 4,935,865 A | 6/1990 | Rowe et al. |
| 4,937,821 A | 6/1990 | Boulton |
| 4,937,863 A | 6/1990 | Robert et al. |
| 4,939,507 A | 7/1990 | Beard et al. |
| 4,942,391 A | 7/1990 | Kikuta |
| 4,945,563 A | 7/1990 | Horton et al. |
| 4,954,882 A | 9/1990 | Kamemoto |
| 4,959,719 A | 9/1990 | Strubbe et al. |
| 4,959,720 A | 9/1990 | Duffield et al. |
| 4,963,994 A | 10/1990 | Levine |
| 4,965,825 A | 10/1990 | Harvey et al. |
| 4,977,455 A | 12/1990 | Young |
| 4,987,486 A | 1/1991 | Johnson et al. |
| 4,991,011 A | 2/1991 | Johnson et al. |
| 4,991,012 A | 2/1991 | Yoshino |
| 4,992,782 A | 2/1991 | Sakamoto et al. |
| 4,992,940 A | 2/1991 | Dworkin |
| 4,995,078 A | 2/1991 | Monslow et al. |
| 4,996,642 A | 2/1991 | Hey |
| 4,998,171 A | 3/1991 | Kim et al. |
| 5,003,384 A | 3/1991 | Durden et al. |
| 5,005,084 A | 4/1991 | Skinner |
| 5,008,853 A | 4/1991 | Bly et al. |
| 5,012,409 A | 4/1991 | Fletcher et al. |
| 5,014,125 A | 5/1991 | Pocock et al. |
| 5,023,721 A | 6/1991 | Moon-Hwan |
| 5,027,400 A | 6/1991 | Baji et al. |
| 5,031,045 A | 7/1991 | Kawasaki |
| 5,036,314 A | 7/1991 | Barillari et al. |
| 5,038,211 A | 8/1991 | Hallenbeck |
| 5,040,067 A | 8/1991 | Yamazaki |
| 5,045,947 A | 9/1991 | Beery |
| 5,046,092 A | 9/1991 | Walker et al. |
| 5,047,867 A | 9/1991 | Strubbe et al. |
| 5,058,160 A | 10/1991 | Banker et al. |
| 5,062,060 A | 10/1991 | Kolnick |
| 5,068,733 A | 11/1991 | Bennett |
| 5,068,734 A | 11/1991 | Beery |
| 5,072,412 A | 12/1991 | Henderson, Jr. et al. |
| 5,075,771 A | 12/1991 | Hashimoto |
| 5,083,205 A | 1/1992 | Arai |
| 5,083,800 A | 1/1992 | Lockton |
| 5,091,785 A | 2/1992 | Canfield et al. |
| 5,093,921 A | 3/1992 | Bevins, Jr. |
| 5,099,319 A | 3/1992 | Esch et al. |
| 5,103,314 A | 4/1992 | Keenan |
| 5,105,184 A | 4/1992 | Pirani et al. |
| 5,109,279 A | 4/1992 | Ando |
| 5,119,188 A | 6/1992 | McCalley et al. |
| 5,119,577 A | 6/1992 | Lilly |
| 5,121,476 A | 6/1992 | Yee |
| 5,123,046 A | 6/1992 | Levine |
| 5,126,851 A | 6/1992 | Yoshimura et al. |
| 5,128,766 A | 7/1992 | Choi |
| 5,134,719 A | 7/1992 | Mankovitz |
| 5,146,335 A | 9/1992 | Kim et al. |
| 5,148,154 A | 9/1992 | MacKay et al. |
| 5,148,275 A | 9/1992 | Blatter et al. |
| 5,151,782 A | 9/1992 | Ferraro |
| 5,151,789 A | 9/1992 | Young |
| 5,152,012 A | 9/1992 | Schwob |
| 5,155,591 A | 10/1992 | Wachob |
| 5,155,806 A | 10/1992 | Hoeber et al. |
| 5,157,768 A | 10/1992 | Hoeber et al. |
| 5,161,019 A | 11/1992 | Emanuel |
| 5,161,023 A | 11/1992 | Keenan |
| 5,162,905 A | 11/1992 | Itoh et al. |
| 5,170,388 A | 12/1992 | Endoh |
| 5,172,111 A | 12/1992 | Olivo, Jr. |
| 5,172,413 A | 12/1992 | Bradley et al. |
| 5,177,604 A | 1/1993 | Martinez |
| 5,179,439 A | 1/1993 | Hashimoto et al. |
| 5,179,654 A | 1/1993 | Richards et al. |
| 5,182,646 A | 1/1993 | Keenan |
| 5,187,589 A | 2/1993 | Kono et al. |
| 5,189,630 A | 2/1993 | Barstow et al. |
| 5,191,423 A | 3/1993 | Yoshida et al. |
| 5,194,941 A | 3/1993 | Grimaldi et al. |
| 5,195,092 A | 3/1993 | Wilson et al. |
| 5,195,134 A | 3/1993 | Inoue et al. |
| 5,200,822 A | 4/1993 | Bronfin et al. |
| 5,200,823 A | 4/1993 | Yoneda et al. |
| 5,204,897 A | 4/1993 | Wyman |
| 5,206,722 A | 4/1993 | Kwan |
| 5,210,611 A | 5/1993 | Yee et al. |
| 5,212,553 A | 5/1993 | Maruoka |
| 5,214,622 A | 5/1993 | Nemoto et al. |
| 5,216,515 A | 6/1993 | Steele et al. |
| 5,220,420 A | 6/1993 | Hoarty et al. |

(56) References Cited

U.S. PATENT DOCUMENTS

| | | |
|---|---|---|
| 5,223,924 A | 6/1993 | Strubbe |
| 5,227,874 A | 7/1993 | Von Kohorn |
| 5,231,493 A | 7/1993 | Apitz |
| 5,231,494 A | 7/1993 | Wachob |
| RE34,340 E | 8/1993 | Freeman |
| 5,233,423 A | 8/1993 | Jernigan et al. |
| 5,233,654 A | 8/1993 | Harvey et al. |
| 5,235,415 A | 8/1993 | Bonicel et al. |
| 5,236,199 A | 8/1993 | Thompson, Jr. |
| 5,237,411 A | 8/1993 | Fink et al. |
| 5,237,417 A | 8/1993 | Hayashi et al. |
| 5,237,418 A | 8/1993 | Kaneko |
| 5,239,540 A | 8/1993 | Rovira et al. |
| 5,241,428 A | 8/1993 | Goldwasser et al. |
| 5,245,420 A | 9/1993 | Harney et al. |
| 5,247,347 A | 9/1993 | Litteral et al. |
| 5,247,364 A | 9/1993 | Banker et al. |
| 5,247,580 A | 9/1993 | Kimura et al. |
| 5,251,921 A | 10/1993 | Daniels |
| 5,252,860 A | 10/1993 | McCarty et al. |
| 5,253,066 A | 10/1993 | Vogel |
| 5,253,067 A | 10/1993 | Chaney et al. |
| 5,260,778 A | 11/1993 | Kauffman et al. |
| 5,260,788 A | 11/1993 | Takano et al. |
| 5,260,999 A | 11/1993 | Wyman |
| 5,283,561 A | 2/1994 | Lumelsky et al. |
| 5,283,639 A | 2/1994 | Esch et al. |
| 5,283,819 A | 2/1994 | Glick et al. |
| 5,285,265 A | 2/1994 | Choi et al. |
| 5,285,278 A | 2/1994 | Holman |
| 5,285,284 A | 2/1994 | Takashima et al. |
| 5,293,357 A | 3/1994 | Hallenbeck |
| 5,296,931 A | 3/1994 | Na et al. |
| 5,297,204 A | 3/1994 | Levine |
| 5,299,006 A | 3/1994 | Kim et al. |
| 5,301,028 A | 4/1994 | Banker et al. |
| 5,307,173 A | 4/1994 | Yuen et al. |
| 5,311,423 A | 5/1994 | Clark |
| 5,313,282 A | 5/1994 | Hayashi |
| 5,315,392 A | 5/1994 | Ishikawa et al. |
| 5,317,403 A | 5/1994 | Keenan |
| 5,319,445 A | 6/1994 | Fitts |
| 5,323,234 A | 6/1994 | Kawasaki |
| 5,323,240 A | 6/1994 | Amano et al. |
| 5,325,183 A | 6/1994 | Rhee |
| 5,325,423 A | 6/1994 | Lewis |
| 5,335,277 A | 8/1994 | Harvey et al. |
| 5,343,239 A | 8/1994 | Lappington et al. |
| 5,345,430 A | 9/1994 | Moe |
| 5,347,167 A | 9/1994 | Singh |
| 5,347,632 A | 9/1994 | Filepp et al. |
| 5,351,075 A | 9/1994 | Herz et al. |
| 5,353,121 A | 10/1994 | Young et al. |
| 5,355,162 A | 10/1994 | Yazolino et al. |
| 5,357,276 A | 10/1994 | Banker et al. |
| 5,359,367 A | 10/1994 | Stockill |
| 5,359,601 A | 10/1994 | Wasilewski et al. |
| 5,365,282 A | 11/1994 | Levine |
| 5,367,316 A | 11/1994 | Ikezaki |
| 5,367,330 A | 11/1994 | Haave et al. |
| 5,371,551 A | 12/1994 | Logan et al. |
| 5,373,288 A | 12/1994 | Blahut |
| 5,374,942 A | 12/1994 | Gilligan et al. |
| 5,374,951 A | 12/1994 | Welsh |
| 5,377,317 A | 12/1994 | Bates et al. |
| 5,377,319 A | 12/1994 | Kitahara et al. |
| 5,382,983 A | 1/1995 | Kwoh et al. |
| 5,384,910 A | 1/1995 | Torres |
| 5,387,945 A | 2/1995 | Takeuchi |
| 5,389,964 A | 2/1995 | Oberle et al. |
| 5,390,027 A | 2/1995 | Henmi et al. |
| 5,398,074 A | 3/1995 | Duffield et al. |
| 5,404,393 A | 4/1995 | Remillard |
| 5,410,326 A | 4/1995 | Goldstein |
| 5,410,343 A | 4/1995 | Coddington et al. |
| 5,410,344 A | 4/1995 | Graves et al. |
| 5,410,367 A | 4/1995 | Zahavi et al. |
| 5,412,720 A | 5/1995 | Hoarty |
| 5,416,508 A | 5/1995 | Sakuma et al. |
| 5,422,389 A | 6/1995 | Trepka et al. |
| 5,424,770 A | 6/1995 | Schmelzer et al. |
| 5,425,101 A | 6/1995 | Woo et al. |
| 5,428,406 A | 6/1995 | Terasawa |
| 5,432,561 A | 7/1995 | Strubbe |
| 5,434,625 A | 7/1995 | Willis |
| 5,434,626 A | 7/1995 | Hayashi et al. |
| 5,434,678 A | 7/1995 | Abecassis |
| 5,436,676 A | 7/1995 | Pint et al. |
| 5,438,355 A | 8/1995 | Palmer |
| 5,438,372 A | 8/1995 | Tsumori et al. |
| 5,440,678 A | 8/1995 | Eisen et al. |
| 5,442,389 A | 8/1995 | Blahut et al. |
| 5,444,499 A | 8/1995 | Saitoh |
| 5,446,919 A | 8/1995 | Wilkins |
| 5,452,012 A | 9/1995 | Saitoh |
| 5,453,146 A | 9/1995 | Kemper |
| 5,453,796 A | 9/1995 | Duffield et al. |
| 5,457,478 A | 10/1995 | Frank |
| 5,459,522 A | 10/1995 | Pint |
| 5,461,415 A | 10/1995 | Wolf et al. |
| 5,465,113 A | 11/1995 | Gilboy |
| 5,465,385 A | 11/1995 | Ohga et al. |
| 5,469,206 A | 11/1995 | Strubbe et al. |
| 5,473,442 A | 12/1995 | Kim et al. |
| 5,477,262 A | 12/1995 | Banker et al. |
| 5,479,266 A | 12/1995 | Young et al. |
| 5,479,268 A | 12/1995 | Young et al. |
| 5,479,302 A | 12/1995 | Haines |
| 5,479,497 A | 12/1995 | Kovarik |
| 5,481,296 A | 1/1996 | Cragun et al. |
| 5,483,278 A | 1/1996 | Strubbe et al. |
| 5,485,197 A | 1/1996 | Hoarty |
| 5,485,219 A | 1/1996 | Woo |
| 5,485,221 A | 1/1996 | Banker et al. |
| 5,485,518 A | 1/1996 | Hunter et al. |
| 5,488,409 A | 1/1996 | Yuen et al. |
| 5,495,295 A | 2/1996 | Long |
| 5,502,504 A | 3/1996 | Marshall et al. |
| 5,515,098 A | 5/1996 | Caries |
| 5,515,106 A | 5/1996 | Chaney et al. |
| 5,515,511 A | 5/1996 | Nguyen et al. |
| 5,517,254 A | 5/1996 | Monta et al. |
| 5,517,257 A | 5/1996 | Dunn et al. |
| 5,521,589 A | 5/1996 | Mondrosch et al. |
| 5,523,791 A | 6/1996 | Berman |
| 5,523,794 A | 6/1996 | Mankovitz et al. |
| 5,523,795 A | 6/1996 | Ueda |
| 5,523,796 A | 6/1996 | Marshall et al. |
| 5,524,195 A | 6/1996 | Clanton, III et al. |
| 5,525,795 A | 6/1996 | MacGregor et al. |
| 5,526,034 A | 6/1996 | Hoarty et al. |
| 5,527,257 A | 6/1996 | Piramoon |
| 5,528,304 A | 6/1996 | Cherrick et al. |
| 5,532,735 A | 7/1996 | Blahut et al. |
| 5,532,754 A | 7/1996 | Young et al. |
| 5,534,911 A | 7/1996 | Levitan |
| 5,537,141 A | 7/1996 | Harper et al. |
| 5,539,449 A | 7/1996 | Blahut et al. |
| 5,539,479 A | 7/1996 | Bertram |
| 5,539,822 A | 7/1996 | Lett |
| 5,541,662 A | 7/1996 | Adams et al. |
| 5,541,738 A | 7/1996 | Mankovitz |
| 5,543,933 A | 8/1996 | Kang et al. |
| 5,544,321 A | 8/1996 | Theimer et al. |
| 5,546,521 A | 8/1996 | Martinez |
| 5,550,576 A | 8/1996 | Klosterman |
| 5,557,338 A | 9/1996 | Maze et al. |
| 5,557,721 A | 9/1996 | Fite et al. |
| 5,557,724 A | 9/1996 | Sampat et al. |
| 5,559,548 A | 9/1996 | Davis et al. |
| 5,559,549 A | 9/1996 | Hendricks et al. |
| 5,559,550 A | 9/1996 | Mankovitz |
| 5,559,942 A | 9/1996 | Gough et al. |
| 5,561,471 A | 10/1996 | Kim |

(56) References Cited

U.S. PATENT DOCUMENTS

| | | |
|---|---|---|
| 5,561,709 A | 10/1996 | Remillard |
| 5,563,665 A | 10/1996 | Chang |
| 5,568,272 A | 10/1996 | Levine |
| 5,570,295 A | 10/1996 | Isenberg et al. |
| 5,572,442 A | 11/1996 | Schulhof et al. |
| 5,574,962 A | 11/1996 | Fardeau et al. |
| 5,576,755 A | 11/1996 | Davis et al. |
| 5,576,951 A | 11/1996 | Lockwood |
| 5,579,055 A | 11/1996 | Hamilton et al. |
| 5,581,479 A | 12/1996 | McLaughlin et al. |
| 5,582,364 A | 12/1996 | Trulin et al. |
| 5,583,560 A | 12/1996 | Florin et al. |
| 5,583,561 A | 12/1996 | Baker et al. |
| 5,583,563 A | 12/1996 | Wanderscheid et al. |
| 5,583,576 A | 12/1996 | Perlman et al. |
| 5,583,653 A | 12/1996 | Timmermans et al. |
| 5,584,025 A | 12/1996 | Keithley et al. |
| 5,585,838 A | 12/1996 | Lawler et al. |
| 5,585,858 A | 12/1996 | Harper et al. |
| 5,585,865 A | 12/1996 | Amano et al. |
| 5,585,866 A | 12/1996 | Miller et al. |
| 5,589,892 A | 12/1996 | Knee et al. |
| 5,592,551 A | 1/1997 | Lett et al. |
| 5,594,490 A | 1/1997 | Dawson et al. |
| 5,594,491 A | 1/1997 | Hodge et al. |
| 5,594,492 A | 1/1997 | O'Callaghan et al. |
| 5,594,509 A | 1/1997 | Florin et al. |
| 5,594,661 A | 1/1997 | Bruner et al. |
| 5,596,373 A | 1/1997 | White et al. |
| 5,598,523 A | 1/1997 | Fujita |
| 5,600,364 A | 2/1997 | Hendricks et al. |
| 5,600,365 A | 2/1997 | Kondo et al. |
| 5,600,366 A | 2/1997 | Schulman |
| 5,600,573 A | 2/1997 | Hendricks et al. |
| 5,602,582 A | 2/1997 | Wanderscheid et al. |
| 5,602,596 A | 2/1997 | Claussen et al. |
| 5,602,597 A | 2/1997 | Bertram |
| 5,602,598 A | 2/1997 | Shintani |
| 5,602,600 A | 2/1997 | Queinnec |
| 5,604,542 A | 2/1997 | Dedrick |
| 5,606,374 A | 2/1997 | Bertram |
| 5,608,448 A | 3/1997 | Smoral et al. |
| 5,610,653 A | 3/1997 | Abecassis |
| 5,610,664 A | 3/1997 | Bobert |
| 5,617,565 A | 4/1997 | Augenbraun et al. |
| 5,619,247 A | 4/1997 | Russo |
| 5,619,249 A | 4/1997 | Billock et al. |
| 5,619,274 A | 4/1997 | Roop et al. |
| 5,621,456 A | 4/1997 | Florin et al. |
| 5,621,579 A | 4/1997 | Yuen |
| 5,623,613 A | 4/1997 | Rowe et al. |
| 5,625,406 A | 4/1997 | Newberry et al. |
| 5,625,464 A | 4/1997 | Compoint et al. |
| 5,627,940 A | 5/1997 | Rohra et al. |
| 5,629,733 A | 5/1997 | Youman et al. |
| 5,630,119 A | 5/1997 | Aristides et al. |
| 5,631,995 A | 5/1997 | Weissensteiner et al. |
| 5,632,007 A | 5/1997 | Freeman |
| 5,633,683 A | 5/1997 | Rosengren et al. |
| 5,634,051 A | 5/1997 | Thomson |
| 5,635,978 A | 6/1997 | Alten et al. |
| 5,635,979 A | 6/1997 | Kostreski et al. |
| 5,635,989 A | 6/1997 | Rothmuller |
| 5,636,346 A | 6/1997 | Saxe |
| 5,640,501 A | 6/1997 | Turpin |
| 5,640,577 A | 6/1997 | Scharmer |
| 5,642,153 A | 6/1997 | Chaney et al. |
| 5,648,813 A | 7/1997 | Tanigawa et al. |
| 5,648,824 A | 7/1997 | Dunn et al. |
| 5,650,826 A | 7/1997 | Eitz |
| 5,650,831 A | 7/1997 | Farwell |
| 5,652,613 A | 7/1997 | Lazarus et al. |
| 5,652,615 A | 7/1997 | Bryant et al. |
| 5,654,748 A | 8/1997 | Matthews, III |
| 5,654,886 A | 8/1997 | Zereski, Jr. et al. |
| 5,657,072 A | 8/1997 | Aristides et al. |
| 5,657,091 A | 8/1997 | Bertram |
| 5,657,414 A | 8/1997 | Lett et al. |
| 5,659,350 A | 8/1997 | Hendricks et al. |
| 5,659,366 A | 8/1997 | Kerman |
| 5,659,367 A | 8/1997 | Yuen |
| 5,661,516 A | 8/1997 | Caries |
| 5,661,517 A | 8/1997 | Budow et al. |
| 5,663,757 A | 9/1997 | Morales |
| 5,664,111 A | 9/1997 | Nahan et al. |
| 5,666,293 A | 9/1997 | Metz et al. |
| 5,666,498 A | 9/1997 | Amro |
| 5,666,645 A | 9/1997 | Thomas et al. |
| 5,671,276 A | 9/1997 | Eyer et al. |
| 5,671,411 A | 9/1997 | Watts et al. |
| 5,671,607 A | 9/1997 | Clemens et al. |
| 5,675,390 A | 10/1997 | Schindler et al. |
| 5,675,752 A | 10/1997 | Scott et al. |
| 5,677,708 A | 10/1997 | Matthews, III et al. |
| 5,677,981 A | 10/1997 | Kato et al. |
| 5,682,195 A | 10/1997 | Hendricks et al. |
| 5,682,206 A | 10/1997 | Wehmeyer et al. |
| 5,684,525 A | 11/1997 | Klosterman |
| 5,686,954 A | 11/1997 | Yoshinobu et al. |
| 5,687,331 A | 11/1997 | Volk et al. |
| 5,689,648 A | 11/1997 | Diaz et al. |
| 5,689,666 A | 11/1997 | Berquist et al. |
| 5,692,214 A | 11/1997 | Levine |
| 5,692,335 A | 12/1997 | Magnuson |
| 5,694,163 A | 12/1997 | Harrison |
| 5,694,176 A | 12/1997 | Bruette et al. |
| 5,694,381 A | 12/1997 | Sako |
| 5,696,905 A | 12/1997 | Reimer et al. |
| 5,699,107 A | 12/1997 | Lawler et al. |
| 5,699,125 A | 12/1997 | Rzeszewski et al. |
| 5,699,528 A | 12/1997 | Hogan |
| 5,703,604 A | 12/1997 | McCutchen |
| 5,708,478 A | 1/1998 | Tognazzini |
| 5,710,601 A | 1/1998 | Marshall et al. |
| 5,710,815 A | 1/1998 | Ming et al. |
| 5,710,884 A | 1/1998 | Dedrick |
| 5,715,314 A | 2/1998 | Payne et al. |
| 5,715,399 A | 2/1998 | Bezos |
| 5,717,452 A | 2/1998 | Janin et al. |
| 5,717,923 A | 2/1998 | Dedrick |
| 5,721,829 A | 2/1998 | Dunn et al. |
| 5,722,041 A | 2/1998 | Freadman |
| 5,724,091 A | 3/1998 | Freeman et al. |
| 5,724,103 A | 3/1998 | Batchelor |
| 5,724,521 A | 3/1998 | Dedrick |
| 5,724,525 A | 3/1998 | Beyers, II et al. |
| 5,724,567 A | 3/1998 | Rose et al. |
| 5,727,060 A | 3/1998 | Young |
| 5,727,163 A | 3/1998 | Bezos |
| 5,731,844 A | 3/1998 | Rauch et al. |
| 5,732,216 A | 3/1998 | Logan et al. |
| 5,734,444 A | 3/1998 | Yoshinobu |
| 5,734,720 A | 3/1998 | Salganicoff |
| 5,734,853 A | 3/1998 | Hendricks et al. |
| 5,734,893 A | 3/1998 | Li et al. |
| 5,737,028 A | 4/1998 | Bertram et al. |
| 5,737,029 A | 4/1998 | Ohkura et al. |
| 5,737,030 A | 4/1998 | Hong et al. |
| 5,737,552 A | 4/1998 | Lavallee et al. |
| 5,740,231 A | 4/1998 | Cohn et al. |
| 5,740,549 A | 4/1998 | Reilly et al. |
| 5,745,710 A | 4/1998 | Clanton, III et al. |
| 5,749,043 A | 5/1998 | Worthy |
| 5,749,081 A | 5/1998 | Whiteis |
| 5,751,282 A | 5/1998 | Girard et al. |
| 5,752,159 A | 5/1998 | Faust et al. |
| 5,752,160 A | 5/1998 | Dunn |
| 5,754,258 A | 5/1998 | Hanaya et al. |
| 5,754,771 A | 5/1998 | Epperson et al. |
| 5,754,939 A | 5/1998 | Herz et al. |
| 5,757,417 A | 5/1998 | Aras et al. |
| 5,758,257 A | 5/1998 | Herz et al. |
| 5,758,258 A | 5/1998 | Shoff et al. |
| 5,758,259 A | 5/1998 | Lawler |

(56) References Cited

U.S. PATENT DOCUMENTS

| | | |
|---|---|---|
| 5,760,821 A | 6/1998 | Ellis et al. |
| 5,761,372 A | 6/1998 | Yoshinobu et al. |
| 5,761,601 A | 6/1998 | Nemirofsky et al. |
| 5,761,606 A | 6/1998 | Wolzien |
| 5,761,607 A | 6/1998 | Gudesen et al. |
| 5,768,528 A | 6/1998 | Stumm |
| 5,771,354 A | 6/1998 | Crawford |
| 5,774,170 A | 6/1998 | Hite et al. |
| 5,774,357 A | 6/1998 | Hoffberg et al. |
| 5,774,534 A | 6/1998 | Mayer |
| 5,774,664 A | 6/1998 | Hidary et al. |
| 5,774,887 A | 6/1998 | Wolff et al. |
| 5,778,181 A | 7/1998 | Hidary et al. |
| 5,778,182 A | 7/1998 | Cathey et al. |
| 5,781,226 A | 7/1998 | Sheehan |
| 5,781,228 A | 7/1998 | Sposato |
| 5,781,245 A | 7/1998 | Van Der Weij et al. |
| 5,781,246 A | 7/1998 | Alten et al. |
| 5,781,734 A | 7/1998 | Ohno et al. |
| 5,784,258 A | 7/1998 | Quinn |
| 5,790,198 A | 8/1998 | Roop et al. |
| 5,790,201 A | 8/1998 | Antos |
| 5,790,202 A | 8/1998 | Kummer et al. |
| 5,790,426 A | 8/1998 | Robinson |
| 5,790,753 A | 8/1998 | Krishnamoorthy et al. |
| 5,790,835 A | 8/1998 | Case et al. |
| 5,790,935 A | 8/1998 | Payton |
| 5,793,364 A | 8/1998 | Bolanos et al. |
| 5,793,409 A | 8/1998 | Tetsumura |
| 5,793,438 A | 8/1998 | Bedard |
| 5,793,964 A | 8/1998 | Rogers et al. |
| 5,793,972 A | 8/1998 | Shane et al. |
| 5,796,952 A | 8/1998 | Davis et al. |
| 5,797,011 A | 8/1998 | Kroll et al. |
| 5,798,785 A | 8/1998 | Hendricks et al. |
| 5,801,747 A | 9/1998 | Bedard |
| 5,801,785 A | 9/1998 | Crump et al. |
| 5,801,787 A | 9/1998 | Schein et al. |
| 5,802,284 A | 9/1998 | Karlton et al. |
| 5,805,154 A | 9/1998 | Brown |
| 5,805,155 A | 9/1998 | Allibhoy et al. |
| 5,805,167 A | 9/1998 | van Cruyningen |
| 5,805,235 A | 9/1998 | Bedard |
| 5,805,763 A | 9/1998 | Lawler et al. |
| 5,805,804 A | 9/1998 | Laursen et al. |
| 5,808,608 A | 9/1998 | Young et al. |
| 5,808,694 A | 9/1998 | Usui et al. |
| 5,809,204 A | 9/1998 | Young et al. |
| 5,809,242 A | 9/1998 | Shaw et al. |
| 5,812,123 A | 9/1998 | Rowe et al. |
| 5,812,124 A | 9/1998 | Eick et al. |
| 5,812,205 A | 9/1998 | Milnes et al. |
| 5,812,937 A | 9/1998 | Takahisa et al. |
| 5,815,145 A | 9/1998 | Matthews, III |
| 5,815,671 A | 9/1998 | Morrison |
| 5,818,438 A | 10/1998 | Howe et al. |
| 5,818,439 A | 10/1998 | Nagasaka et al. |
| 5,818,441 A | 10/1998 | Throckmorton et al. |
| 5,818,511 A | 10/1998 | Farry et al. |
| 5,818,541 A | 10/1998 | Matsuura et al. |
| 5,818,935 A | 10/1998 | Maa |
| 5,819,019 A | 10/1998 | Nelson |
| 5,819,156 A | 10/1998 | Belmont |
| 5,819,284 A | 10/1998 | Farber et al. |
| 5,822,123 A | 10/1998 | Davis et al. |
| 5,825,407 A | 10/1998 | Cowe et al. |
| 5,828,402 A | 10/1998 | Collings |
| 5,828,419 A | 10/1998 | Bruette et al. |
| 5,828,420 A | 10/1998 | Marshall et al. |
| 5,828,839 A | 10/1998 | Moncreiff |
| 5,828,945 A | 10/1998 | Klosterman |
| 5,830,068 A | 11/1998 | Brenner et al. |
| 5,832,223 A | 11/1998 | Hara et al. |
| 5,833,468 A | 11/1998 | Guy et al. |
| 5,835,717 A | 11/1998 | Karlton et al. |
| 5,838,314 A | 11/1998 | Neel et al. |
| 5,838,383 A | 11/1998 | Chimoto et al. |
| 5,838,419 A | 11/1998 | Holland |
| 5,842,010 A | 11/1998 | Jain et al. |
| 5,842,199 A | 11/1998 | Miller et al. |
| 5,844,620 A | 12/1998 | Coleman et al. |
| 5,848,352 A | 12/1998 | Dougherty et al. |
| 5,848,396 A | 12/1998 | Gerace |
| 5,848,397 A | 12/1998 | Marsh et al. |
| 5,850,218 A | 12/1998 | LaJoie et al. |
| 5,851,149 A | 12/1998 | Xidos et al. |
| 5,852,437 A | 12/1998 | Wugofski et al. |
| 5,861,881 A | 1/1999 | Freeman et al. |
| 5,861,906 A | 1/1999 | Dunn et al. |
| 5,862,292 A | 1/1999 | Kubota et al. |
| 5,864,823 A | 1/1999 | Levitan |
| 5,867,226 A | 2/1999 | Wehmeyer et al. |
| 5,867,227 A | 2/1999 | Yamaguchi |
| 5,867,228 A | 2/1999 | Miki et al. |
| 5,870,543 A | 2/1999 | Ronning |
| 5,872,588 A | 2/1999 | Aras et al. |
| 5,873,660 A | 2/1999 | Walsh et al. |
| 5,874,985 A | 2/1999 | Matthews, III |
| 5,875,108 A | 2/1999 | Hoffberg et al. |
| 5,877,906 A | 3/1999 | Nagasawa et al. |
| 5,880,768 A | 3/1999 | Lemmons et al. |
| 5,883,621 A | 3/1999 | Iwamura |
| 5,883,677 A | 3/1999 | Hofmann |
| 5,886,691 A | 3/1999 | Furuya et al. |
| 5,886,731 A | 3/1999 | Ebisawa |
| 5,889,950 A | 3/1999 | Kuzma |
| 5,892,498 A | 4/1999 | Marshall et al. |
| 5,892,535 A | 4/1999 | Allen et al. |
| 5,892,536 A | 4/1999 | Logan et al. |
| 5,892,767 A | 4/1999 | Bell et al. |
| 5,895,474 A | 4/1999 | Maarek et al. |
| 5,899,920 A | 5/1999 | DeSatnick et al. |
| 5,900,867 A | 5/1999 | Schindler et al. |
| 5,900,905 A | 5/1999 | Shoff et al. |
| 5,903,314 A | 5/1999 | Niijima et al. |
| 5,903,545 A | 5/1999 | Sabourin et al. |
| 5,903,816 A | 5/1999 | Broadwin et al. |
| 5,905,497 A | 5/1999 | Vaughan et al. |
| 5,907,322 A | 5/1999 | Kelly et al. |
| 5,907,323 A | 5/1999 | Lawler et al. |
| 5,907,366 A | 5/1999 | Farmer et al. |
| 5,912,664 A | 6/1999 | Eick et al. |
| 5,914,712 A | 6/1999 | Sartain et al. |
| 5,914,746 A | 6/1999 | Matthews, III et al. |
| 5,915,243 A | 6/1999 | Smolen |
| 5,917,481 A | 6/1999 | Rzeszewski et al. |
| 5,917,830 A | 6/1999 | Chen et al. |
| 5,918,014 A | 6/1999 | Robinson |
| 5,920,700 A | 7/1999 | Gordon et al. |
| 5,923,848 A | 7/1999 | Goodhand et al. |
| 5,929,849 A | 7/1999 | Kikinis |
| 5,929,850 A | 7/1999 | Broadwin et al. |
| 5,929,932 A | 7/1999 | Otsuki et al. |
| 5,930,493 A | 7/1999 | Ottesen et al. |
| 5,931,905 A | 8/1999 | Hashimoto et al. |
| 5,936,614 A | 8/1999 | An et al. |
| 5,936,679 A | 8/1999 | Kasahara et al. |
| 5,937,160 A | 8/1999 | Davis et al. |
| 5,937,397 A | 8/1999 | Callaghan |
| 5,940,073 A | 8/1999 | Klosterman et al. |
| 5,940,572 A | 8/1999 | Balaban et al. |
| 5,940,614 A | 8/1999 | Allen et al. |
| 5,945,988 A | 8/1999 | Williams et al. |
| 5,946,386 A | 8/1999 | Rogers et al. |
| 5,946,678 A | 8/1999 | Aalbersberq |
| 5,947,867 A | 9/1999 | Gierer et al. |
| 5,949,954 A | 9/1999 | Young et al. |
| 5,951,642 A | 9/1999 | Onoe et al. |
| 5,953,005 A | 9/1999 | Liu |
| 5,955,988 A | 9/1999 | Blonstein et al. |
| 5,959,592 A | 9/1999 | Petruzzelli |
| 5,959,688 A | 9/1999 | Schein et al. |
| 5,960,411 A | 9/1999 | Hartman et al. |
| 5,963,264 A | 10/1999 | Jackson |

(56) References Cited

U.S. PATENT DOCUMENTS

| | | |
|---|---|---|
| 5,963,645 A | 10/1999 | Kigawa et al. |
| 5,969,748 A | 10/1999 | Casement et al. |
| 5,970,486 A | 10/1999 | Yoshida et al. |
| 5,973,683 A | 10/1999 | Cragun et al. |
| 5,974,222 A | 10/1999 | Yuen et al. |
| 5,977,964 A | 11/1999 | Williams et al. |
| 5,978,044 A | 11/1999 | Choi |
| 5,986,650 A | 11/1999 | Ellis et al. |
| 5,987,213 A | 11/1999 | Mankovitz et al. |
| 5,987,509 A | 11/1999 | Portuesi |
| 5,987,621 A | 11/1999 | Duso et al. |
| 5,988,078 A | 11/1999 | Levine |
| 5,990,890 A | 11/1999 | Etheredge |
| 5,990,927 A | 11/1999 | Hendricks et al. |
| 5,991,498 A | 11/1999 | Young |
| 5,991,799 A | 11/1999 | Yen et al. |
| 5,995,155 A | 11/1999 | Schindler et al. |
| 5,997,964 A | 12/1999 | Klima, Jr. |
| 5,999,912 A | 12/1999 | Wodarz et al. |
| 6,002,393 A | 12/1999 | Hite et al. |
| 6,002,394 A | 12/1999 | Schein et al. |
| 6,002,444 A | 12/1999 | Marshall et al. |
| 6,005,561 A | 12/1999 | Hawkins et al. |
| 6,005,562 A | 12/1999 | Shiga et al. |
| 6,005,563 A | 12/1999 | White et al. |
| 6,005,565 A | 12/1999 | Legall et al. |
| 6,005,566 A | 12/1999 | Jones et al. |
| 6,005,597 A | 12/1999 | Barrett et al. |
| 6,005,631 A | 12/1999 | Anderson et al. |
| 6,006,218 A | 12/1999 | Breese et al. |
| 6,006,257 A | 12/1999 | Slezak |
| 6,008,802 A | 12/1999 | Iki et al. |
| 6,008,803 A | 12/1999 | Rowe et al. |
| 6,011,546 A | 1/2000 | Bertram |
| 6,014,137 A | 1/2000 | Burns |
| 6,014,184 A | 1/2000 | Knee et al. |
| 6,014,502 A | 1/2000 | Moraes |
| 6,014,638 A | 1/2000 | Burge et al. |
| 6,016,141 A | 1/2000 | Knudson et al. |
| 6,018,372 A | 1/2000 | Etheredge |
| 6,018,768 A | 1/2000 | Ullman et al. |
| 6,020,880 A | 2/2000 | Naimpally |
| 6,020,883 A | 2/2000 | Herz et al. |
| 6,020,929 A | 2/2000 | Marshall et al. |
| 6,023,267 A | 2/2000 | Chapuis et al. |
| 6,025,837 A | 2/2000 | Matthews, III et al. |
| 6,025,886 A | 2/2000 | Koda |
| 6,028,599 A | 2/2000 | Yuen et al. |
| 6,028,600 A | 2/2000 | Rosin et al. |
| 6,029,045 A | 2/2000 | Picco et al. |
| 6,029,176 A | 2/2000 | Cannon |
| 6,029,195 A | 2/2000 | Herz |
| 6,031,806 A | 2/2000 | Tomita |
| 6,035,091 A | 3/2000 | Kazo |
| 6,035,304 A | 3/2000 | MacHida et al. |
| 6,037,933 A | 3/2000 | Blonstein et al. |
| 6,038,367 A | 3/2000 | Abecassis |
| 6,047,317 A | 4/2000 | Bisdikian et al. |
| 6,049,824 A | 4/2000 | Simonin |
| 6,052,145 A | 4/2000 | MacRae et al. |
| 6,057,872 A | 5/2000 | Candelore |
| 6,057,890 A | 5/2000 | Virden et al. |
| 6,061,060 A | 5/2000 | Berry et al. |
| 6,061,082 A | 5/2000 | Park |
| 6,061,097 A | 5/2000 | Satterfield |
| 6,064,376 A | 5/2000 | Berezowski et al. |
| 6,064,980 A | 5/2000 | Jacobi et al. |
| 6,067,303 A | 5/2000 | Aaker et al. |
| 6,067,561 A | 5/2000 | Dillon |
| 6,072,460 A | 6/2000 | Marshall et al. |
| 6,072,982 A | 6/2000 | Haddad |
| 6,075,526 A | 6/2000 | Rothmuller |
| 6,075,551 A | 6/2000 | Berezowski et al. |
| 6,075,575 A | 6/2000 | Schein et al. |
| 6,078,348 A | 6/2000 | Klosterman et al. |
| 6,081,291 A | 6/2000 | Ludwig, Jr. |
| 6,081,750 A | 6/2000 | Hoffberg et al. |
| 6,081,830 A | 6/2000 | Schindler |
| 6,088,722 A | 7/2000 | Herz et al. |
| 6,088,945 A | 7/2000 | Sanderfoot |
| 6,091,883 A | 7/2000 | Artigalas et al. |
| 6,091,884 A | 7/2000 | Yuen et al. |
| RE36,801 E | 8/2000 | Logan et al. |
| 6,098,065 A | 8/2000 | Skillen et al. |
| 6,104,705 A | 8/2000 | Ismail et al. |
| 6,108,042 A | 8/2000 | Adams et al. |
| 6,111,614 A | 8/2000 | Mugura et al. |
| 6,112,186 A | 8/2000 | Bergh et al. |
| 6,115,057 A | 9/2000 | Kwoh et al. |
| 6,118,492 A | 9/2000 | Milnes et al. |
| 6,119,098 A | 9/2000 | Guyot et al. |
| 6,119,101 A | 9/2000 | Peckover |
| 6,122,011 A | 9/2000 | Dias et al. |
| 6,124,854 A | 9/2000 | Sartain et al. |
| 6,125,230 A | 9/2000 | Yaginuma |
| 6,130,726 A | 10/2000 | Darbee et al. |
| 6,133,909 A | 10/2000 | Schein et al. |
| 6,133,910 A | 10/2000 | Stinebruner |
| 6,139,177 A | 10/2000 | Venkatraman et al. |
| 6,141,003 A | 10/2000 | Chor et al. |
| 6,141,488 A | 10/2000 | Knudson et al. |
| 6,147,714 A | 11/2000 | Terasawa et al. |
| 6,147,715 A | 11/2000 | Yuen et al. |
| 6,151,059 A | 11/2000 | Schein et al. |
| 6,151,643 A | 11/2000 | Cheng et al. |
| 6,154,203 A | 11/2000 | Yuen et al. |
| 6,154,752 A | 11/2000 | Ryan |
| 6,154,771 A | 11/2000 | Rangan et al. |
| 6,155,001 A | 12/2000 | Marin |
| 6,157,411 A | 12/2000 | Williams et al. |
| 6,157,413 A | 12/2000 | Hanafee et al. |
| 6,160,545 A | 12/2000 | Eyer et al. |
| 6,160,546 A | 12/2000 | Thompson et al. |
| 6,160,570 A | 12/2000 | Sitnik |
| 6,160,989 A | 12/2000 | Hendricks et al. |
| 6,163,316 A | 12/2000 | Killian |
| 6,163,345 A | 12/2000 | Noguchi et al. |
| 6,166,778 A | 12/2000 | Yamamoto et al. |
| 6,167,188 A | 12/2000 | Young et al. |
| 6,169,542 B1 | 1/2001 | Hooks et al. |
| 6,172,674 B1 | 1/2001 | Etheredge |
| 6,172,677 B1 | 1/2001 | Stautner et al. |
| 6,173,271 B1 | 1/2001 | Goodman et al. |
| 6,175,362 B1 | 1/2001 | Harms et al. |
| 6,177,931 B1 | 1/2001 | Alexander et al. |
| 6,178,446 B1 | 1/2001 | Gerszberg et al. |
| 6,181,335 B1 | 1/2001 | Hendricks et al. |
| 6,184,877 B1 | 2/2001 | Dodson et al. |
| 6,185,360 B1 | 2/2001 | Inoue et al. |
| 6,186,287 B1 | 2/2001 | Heidenreich et al. |
| 6,186,443 B1 | 2/2001 | Shaffer |
| 6,191,780 B1 | 2/2001 | Martin et al. |
| 6,195,501 B1 | 2/2001 | Perry et al. |
| 6,201,536 B1 | 3/2001 | Hendricks et al. |
| 6,202,023 B1 | 3/2001 | Hancock et al. |
| 6,202,058 B1 | 3/2001 | Rose et al. |
| 6,202,212 B1 | 3/2001 | Sturgeon et al. |
| 6,208,335 B1 | 3/2001 | Gordon et al. |
| 6,208,799 B1 | 3/2001 | Marsh et al. |
| 6,209,129 B1 | 3/2001 | Carr et al. |
| 6,209,130 B1 | 3/2001 | Rector, Jr. et al. |
| 6,212,553 B1 | 4/2001 | Lee et al. |
| 6,216,264 B1 | 4/2001 | Maze et al. |
| 6,219,839 B1 | 4/2001 | Sampsell |
| 6,226,447 B1 | 5/2001 | Sasaki et al. |
| 6,233,389 B1 | 5/2001 | Barton et al. |
| 6,237,145 B1 | 5/2001 | Narasimhan et al. |
| 6,237,146 B1 | 5/2001 | Richards et al. |
| 6,239,794 B1 | 5/2001 | Yuen et al. |
| 6,240,555 B1 | 5/2001 | Shoff et al. |
| 6,253,203 B1 | 6/2001 | O'Flaherty et al. |
| 6,256,071 B1 | 7/2001 | Hiroi |
| 6,256,785 B1 | 7/2001 | Klappert et al. |
| 6,257,268 B1 | 7/2001 | Hope et al. |

(56) References Cited

U.S. PATENT DOCUMENTS

| | | | |
|---|---|---|---|
| 6,262,721 B1 | 7/2001 | Tsukidate et al. |
| 6,262,772 B1 | 7/2001 | Shen et al. |
| 6,263,501 B1 | 7/2001 | Schein et al. |
| 6,263,507 B1 | 7/2001 | Ahmad et al. |
| 6,268,849 B1 | 7/2001 | Boyer et al. |
| 6,275,268 B1 | 8/2001 | Ellis et al. |
| 6,275,648 B1 | 8/2001 | Knudson et al. |
| 6,279,157 B1 | 8/2001 | Takasu |
| 6,282,713 B1 | 8/2001 | Kitsukawa et al. |
| 6,285,713 B1 | 9/2001 | Nakaya et al. |
| 6,286,140 B1 | 9/2001 | Ivanyi |
| 6,289,346 B1 | 9/2001 | Milewski et al. |
| 6,298,482 B1 | 10/2001 | Seidman et al. |
| 6,311,877 B1 | 11/2001 | Yang |
| 6,312,336 B1 | 11/2001 | Handelman et al. |
| 6,317,885 B1 | 11/2001 | Fries |
| 6,320,588 B1 | 11/2001 | Palmer et al. |
| 6,323,911 B1 | 11/2001 | Schein et al. |
| 6,323,931 B1 | 11/2001 | Fujita et al. |
| 6,324,338 B1 | 11/2001 | Wood et al. |
| 6,326,982 B1 | 12/2001 | Wu et al. |
| 6,327,418 B1 | 12/2001 | Barton |
| 6,331,877 B1 | 12/2001 | Bennington et al. |
| 6,334,022 B1 | 12/2001 | Ohba et al. |
| 6,335,722 B1 | 1/2002 | Tani et al. |
| 6,335,963 B1 | 1/2002 | Bosco |
| 6,341,195 B1 | 1/2002 | Mankovitz et al. |
| 6,341,374 B2 | 1/2002 | Schein et al. |
| 6,342,926 B1 | 1/2002 | Hanafee et al. |
| 6,357,042 B2 | 3/2002 | Srinivasan et al. |
| 6,357,043 B1 | 3/2002 | Ellis et al. |
| 6,359,636 B1 | 3/2002 | Schindler et al. |
| 6,363,525 B1 | 3/2002 | Dougherty et al. |
| 6,366,890 B1 | 4/2002 | Usrey |
| 6,370,526 B1 | 4/2002 | Agrawal et al. |
| 6,373,528 B1 | 4/2002 | Bennington et al. |
| 6,381,582 B1 | 4/2002 | Walker et al. |
| 6,388,714 B1 | 5/2002 | Schein et al. |
| 6,389,593 B1 | 5/2002 | Yamagishi |
| 6,392,710 B1 | 5/2002 | Gonsalves et al. |
| 6,396,546 B1 | 5/2002 | Alten et al. |
| 6,400,407 B1 | 6/2002 | Zigmond et al. |
| 6,405,371 B1 | 6/2002 | Oosterhout et al. |
| 6,408,437 B1 | 6/2002 | Hendricks et al. |
| 6,411,308 B1 | 6/2002 | Blonstein et al. |
| 6,411,696 B1 | 6/2002 | Iverson et al. |
| 6,412,110 B1 | 6/2002 | Schein et al. |
| 6,418,556 B1 | 7/2002 | Bennington et al. |
| 6,421,067 B1 | 7/2002 | Kamen et al. |
| 6,426,779 B1 | 7/2002 | Noguchi et al. |
| 6,437,836 B1 | 8/2002 | Huang et al. |
| 6,438,579 B1 | 8/2002 | Hosken |
| 6,438,752 B1 | 8/2002 | McClard |
| 6,441,832 B1 | 8/2002 | Tao et al. |
| 6,442,332 B1 | 8/2002 | Knudson et al. |
| 6,446,261 B1 | 9/2002 | Rosser |
| 6,453,471 B1 | 9/2002 | Klosterman |
| RE37,881 E | 10/2002 | Haines |
| 6,463,585 B1 | 10/2002 | Hendricks et al. |
| 6,469,753 B1 | 10/2002 | Klosterman et al. |
| 6,470,497 B1 | 10/2002 | Ellis et al. |
| 6,473,559 B1 | 10/2002 | Knudson et al. |
| 6,477,579 B1 | 11/2002 | Kunkel et al. |
| 6,477,705 B1 | 11/2002 | Yuen et al. |
| 6,480,667 B1 | 11/2002 | O'Connor |
| 6,486,892 B1 | 11/2002 | Stern |
| 6,486,920 B2 | 11/2002 | Arai et al. |
| 6,487,362 B1 | 11/2002 | Yuen et al. |
| 6,487,541 B1 | 11/2002 | Aggarwal et al. |
| 6,493,876 B1 | 12/2002 | DeFreese et al. |
| 6,498,895 B2 | 12/2002 | Young et al. |
| 6,499,138 B1 | 12/2002 | Swix et al. |
| 6,505,348 B1 | 1/2003 | Knowles et al. |
| 6,507,953 B1 | 1/2003 | Horlander et al. |
| 6,515,680 B1 | 2/2003 | Hendricks et al. |
| 6,516,323 B1 | 2/2003 | Kamba |
| 6,530,082 B1 | 3/2003 | Del Sesto et al. |
| 6,539,548 B1 | 3/2003 | Hendricks et al. |
| 6,542,169 B1 | 4/2003 | Marshall et al. |
| 6,545,722 B1 | 4/2003 | Schultheiss et al. |
| 6,546,556 B1 | 4/2003 | Kataoka et al. |
| 6,564,005 B1 | 5/2003 | Berstis |
| 6,564,170 B2 | 5/2003 | Halabieh |
| 6,564,213 B1 * | 5/2003 | Ortega ............... G06F 17/3064 |
| 6,564,378 B1 | 5/2003 | Satterfield et al. |
| 6,564,379 B1 | 5/2003 | Knudson et al. |
| 6,567,892 B1 | 5/2003 | Horst et al. |
| 6,567,982 B1 | 5/2003 | Howe et al. |
| 6,571,390 B1 | 5/2003 | Dunn et al. |
| 6,574,424 B1 | 6/2003 | Dimitri et al. |
| 6,588,013 B1 | 7/2003 | Lumley et al. |
| 6,600,364 B1 | 7/2003 | Liang et al. |
| 6,600,503 B2 | 7/2003 | Stautner et al. |
| 6,601,074 B1 | 7/2003 | Liebenow |
| 6,606,128 B2 | 8/2003 | Hanafee et al. |
| 6,611,842 B1 | 8/2003 | Brown |
| 6,611,958 B1 | 8/2003 | Shintani et al. |
| 6,614,987 B1 | 9/2003 | Ismail et al. |
| 6,622,304 B1 | 9/2003 | Carhart |
| 6,622,306 B1 | 9/2003 | Kamada |
| 6,631,523 B1 | 10/2003 | Matthews, III et al. |
| 6,637,029 B1 | 10/2003 | Maissel et al. |
| 6,640,337 B1 | 10/2003 | Lu |
| 6,651,251 B1 | 11/2003 | Shoff et al. |
| 6,660,503 B2 | 12/2003 | Kierulff |
| 6,661,468 B2 | 12/2003 | Alten et al. |
| 6,665,869 B1 | 12/2003 | Ellis et al. |
| 6,670,971 B1 | 12/2003 | Oral et al. |
| 6,675,386 B1 | 1/2004 | Hendricks et al. |
| 6,678,706 B1 | 1/2004 | Fishel |
| 6,681,396 B1 | 1/2004 | Bates et al. |
| 6,687,906 B1 | 2/2004 | Yuen et al. |
| 6,698,020 B1 | 2/2004 | Zigmond et al. |
| 6,704,931 B1 | 3/2004 | Schaffer et al. |
| 6,714,917 B1 | 3/2004 | Eldering et al. |
| 6,718,324 B2 | 4/2004 | Edlund et al. |
| 6,718,551 B1 | 4/2004 | Swix et al. |
| 6,721,954 B1 | 4/2004 | Nickum |
| 6,727,914 B1 | 4/2004 | Gutta |
| 6,728,967 B2 | 4/2004 | Bennington et al. |
| 6,732,369 B1 | 5/2004 | Schein et al. |
| 6,738,978 B1 | 5/2004 | Hendricks et al. |
| 6,742,183 B1 | 5/2004 | Reynolds et al. |
| 6,744,967 B2 | 6/2004 | Kaminski et al. |
| 6,751,800 B1 | 6/2004 | Fukuda et al. |
| 6,754,904 B1 | 6/2004 | Cooper et al. |
| 6,756,987 B2 | 6/2004 | Goyins et al. |
| 6,756,997 B1 | 6/2004 | Ward, III et al. |
| 6,757,906 B1 | 6/2004 | Look et al. |
| 6,760,537 B2 | 7/2004 | Mankovitz |
| 6,760,538 B1 | 7/2004 | Bumgardner et al. |
| 6,766,100 B1 | 7/2004 | Komar et al. |
| 6,771,317 B2 | 8/2004 | Ellis et al. |
| 6,771,886 B1 | 8/2004 | Mendelsohn |
| 6,788,882 B1 | 9/2004 | Geer et al. |
| 6,792,618 B1 | 9/2004 | Bendinelli et al. |
| 6,799,326 B2 | 9/2004 | Boylan, III et al. |
| 6,799,327 B1 | 9/2004 | Reynolds et al. |
| 6,820,278 B1 | 11/2004 | Ellis |
| 6,828,993 B1 | 12/2004 | Hendricks et al. |
| 6,837,791 B1 | 1/2005 | McNutt et al. |
| 6,847,387 B2 | 1/2005 | Roth |
| 6,850,693 B2 | 2/2005 | Young et al. |
| 6,857,131 B1 | 2/2005 | Yagawa et al. |
| 6,865,746 B1 | 3/2005 | Herrington et al. |
| 6,868,551 B1 | 3/2005 | Lawler et al. |
| 6,898,762 B1 | 5/2005 | Ellis et al. |
| 6,920,278 B1 | 7/2005 | Yano et al. |
| 6,920,281 B1 | 7/2005 | Agnibotri et al. |
| 6,925,035 B2 | 8/2005 | Ueki |
| 6,934,964 B1 | 8/2005 | Schaffer et al. |
| 6,938,208 B2 | 8/2005 | Reichardt |
| 6,947,922 B1 | 9/2005 | Glance |
| 6,973,621 B2 | 12/2005 | Sie et al. |

(56) References Cited

U.S. PATENT DOCUMENTS

| | | |
|---|---|---|
| 6,973,665 B2 | 12/2005 | Dudkiewicz et al. |
| 6,973,669 B2 | 12/2005 | Daniels |
| 6,981,040 B1 | 12/2005 | Konig et al. |
| 6,983,478 B1 | 1/2006 | Grauch et al. |
| 6,985,188 B1 | 1/2006 | Hurst, Jr. |
| 7,003,792 B1 | 2/2006 | Yuen |
| 7,007,294 B1 | 2/2006 | Kurapati |
| 7,017,118 B1 | 3/2006 | Carroll |
| 7,017,179 B1 | 3/2006 | Asamoto et al. |
| 7,024,424 B1 | 4/2006 | Platt et al. |
| 7,027,716 B1 | 4/2006 | Boyle et al. |
| 7,028,326 B1 | 4/2006 | Westlake et al. |
| 7,029,935 B2 | 4/2006 | Negley et al. |
| 7,039,935 B2 | 5/2006 | Knudson et al. |
| 7,047,550 B1 | 5/2006 | Yasukawa et al. |
| 7,058,635 B1 | 6/2006 | Shah-Nazaroff et al. |
| 7,065,709 B2 | 6/2006 | Ellis et al. |
| 7,069,576 B1 | 6/2006 | Knudson et al. |
| 7,073,187 B1 | 7/2006 | Hendricks et al. |
| 7,088,910 B2 | 8/2006 | Potrebic et al. |
| 7,096,486 B1 | 8/2006 | Ukai et al. |
| 7,100,185 B2 | 8/2006 | Bennington et al. |
| 7,117,518 B1 | 10/2006 | Takahashi et al. |
| 7,143,430 B1 | 11/2006 | Fingerman et al. |
| 7,165,098 B1 | 1/2007 | Boyer et al. |
| 7,181,128 B1 | 2/2007 | Wada et al. |
| 7,185,355 B1 | 2/2007 | Ellis et al. |
| 7,187,847 B2 | 3/2007 | Young et al. |
| 7,200,859 B1 | 4/2007 | Perlman et al. |
| 7,209,640 B2 | 4/2007 | Young et al. |
| 7,209,915 B1 | 4/2007 | Taboada et al. |
| 7,218,839 B2 | 5/2007 | Plourde, Jr. et al. |
| 7,229,012 B1 | 6/2007 | Enright et al. |
| 7,229,354 B2 | 6/2007 | McNutt et al. |
| 7,243,139 B2 | 7/2007 | Ullman et al. |
| 7,266,833 B2 | 9/2007 | Ward, III et al. |
| 7,287,267 B2 | 10/2007 | Knudson et al. |
| 7,293,276 B2 | 11/2007 | Phillips et al. |
| 7,328,450 B2 | 2/2008 | Macrae et al. |
| 7,356,246 B1 | 4/2008 | Kobb |
| 7,369,749 B2 | 5/2008 | Ichioka et al. |
| 7,369,750 B2 | 5/2008 | Cheng et al. |
| 7,370,342 B2 | 5/2008 | Ismail et al. |
| 7,392,532 B2 | 6/2008 | White et al. |
| 7,398,541 B2 | 7/2008 | Bennington et al. |
| 7,403,935 B2 | 7/2008 | Horvitz et al. |
| 7,412,441 B2 | 8/2008 | Scott, III et al. |
| 7,424,510 B2 | 9/2008 | Gross et al. |
| 7,437,751 B2 | 10/2008 | Daniels |
| 7,440,677 B2 | 10/2008 | Strasser |
| 7,454,515 B2 | 11/2008 | Lamkin et al. |
| 7,454,772 B2 | 11/2008 | Fellenstein et al. |
| 7,467,398 B2 | 12/2008 | Fellenstein et al. |
| 7,477,832 B2 | 1/2009 | Young et al. |
| 7,480,929 B2 | 1/2009 | Klosterman et al. |
| 7,487,528 B2 | 2/2009 | Satterfield et al. |
| 7,487,529 B1 | 2/2009 | Orlick |
| 7,493,641 B2 | 2/2009 | Klosterman et al. |
| 7,503,055 B2 | 3/2009 | Reynolds et al. |
| 7,506,350 B2 | 3/2009 | Johnson |
| 7,519,268 B2 | 4/2009 | Juen et al. |
| 7,540,010 B2 | 5/2009 | Hanaya et al. |
| 7,574,382 B1 | 8/2009 | Hubert |
| 7,577,336 B2 | 8/2009 | Srinivasan et al. |
| 7,590,993 B1 | 9/2009 | Hendricks et al. |
| 7,599,753 B2 | 10/2009 | Taylor et al. |
| 7,603,685 B2 | 10/2009 | Knudson et al. |
| 7,634,786 B2 | 12/2009 | Knee et al. |
| 7,644,054 B2 | 1/2010 | Garg et al. |
| 7,657,563 B2 | 2/2010 | Kim et al. |
| 7,664,746 B2 | 2/2010 | Majumder |
| 7,665,109 B2 | 2/2010 | Matthews, III et al. |
| 7,685,620 B2 | 3/2010 | Fellenstein et al. |
| 7,689,995 B1 | 3/2010 | Francis et al. |
| 7,693,827 B2 | 4/2010 | Zamir et al. |
| 7,707,617 B2 | 4/2010 | Birleson |
| 7,725,467 B2 | 5/2010 | Yamamoto et al. |
| 7,770,196 B1 | 8/2010 | Hendricks |
| 7,774,335 B1 | 8/2010 | Scofield et al. |
| 7,778,158 B2 | 8/2010 | Vogel et al. |
| 7,779,437 B2 | 8/2010 | Barton |
| 7,793,326 B2 | 9/2010 | McCoskey et al. |
| 7,801,888 B2 | 9/2010 | Rao et al. |
| 7,823,055 B2 | 10/2010 | Sull et al. |
| 7,840,577 B2 | 11/2010 | Ortega et al. |
| 7,859,571 B1 | 12/2010 | Brown et al. |
| 7,882,520 B2 | 2/2011 | Beach et al. |
| 7,895,218 B2 | 2/2011 | Venkataraman et al. |
| 7,925,141 B2 | 4/2011 | Geer et al. |
| 7,996,864 B2 | 8/2011 | Yuen et al. |
| 8,051,450 B2 | 11/2011 | Robarts et al. |
| 8,065,702 B2 | 11/2011 | Goldberg et al. |
| 8,078,751 B2 | 12/2011 | Janik et al. |
| 8,087,050 B2 | 12/2011 | Ellis et al. |
| 8,230,343 B2 | 7/2012 | Logan et al. |
| 8,265,458 B2 | 9/2012 | Helmstetter |
| 8,275,764 B2 | 9/2012 | Jeon et al. |
| 8,363,679 B2 | 1/2013 | Sorenson et al. |
| 8,478,750 B2 | 7/2013 | Rao et al. |
| 8,515,954 B2 | 8/2013 | Gibbs et al. |
| 8,613,020 B2 | 12/2013 | Knudson et al. |
| 8,635,649 B2 | 1/2014 | Ward, III et al. |
| 8,707,366 B2 | 4/2014 | Wong et al. |
| RE44,966 E | 6/2014 | Flinn et al. |
| 9,075,882 B1 | 7/2015 | Ward et al. |
| 9,256,685 B2 | 2/2016 | Zamir et al. |
| 2001/0001160 A1 | 5/2001 | Shoff et al. |
| 2001/0013009 A1 | 8/2001 | Greening et al. |
| 2001/0013122 A1 | 8/2001 | Hirata |
| 2001/0013123 A1 | 8/2001 | Freeman et al. |
| 2001/0025375 A1 | 9/2001 | Ahmad et al. |
| 2001/0027555 A1 | 10/2001 | Franken et al. |
| 2001/0027562 A1 | 10/2001 | Schein et al. |
| 2001/0028782 A1 | 10/2001 | Ohno et al. |
| 2001/0029610 A1 | 10/2001 | Corvin et al. |
| 2001/0034237 A1 | 10/2001 | Garahi |
| 2001/0042246 A1 | 11/2001 | Yuen et al. |
| 2001/0043795 A1 | 11/2001 | Wood et al. |
| 2001/0047298 A1 | 11/2001 | Moore et al. |
| 2001/0049820 A1 | 12/2001 | Barton |
| 2001/0054181 A1 | 12/2001 | Corvin |
| 2002/0009283 A1 | 1/2002 | Ichioka et al. |
| 2002/0019882 A1 | 2/2002 | Soejima et al. |
| 2002/0026496 A1 | 2/2002 | Boyer et al. |
| 2002/0035573 A1 | 3/2002 | Black et al. |
| 2002/0042913 A1 | 4/2002 | Ellis et al. |
| 2002/0042914 A1 | 4/2002 | Walker et al. |
| 2002/0042918 A1 | 4/2002 | Townsend et al. |
| 2002/0048448 A1 | 4/2002 | Daniels |
| 2002/0049973 A1 | 4/2002 | Alten et al. |
| 2002/0053078 A1 | 5/2002 | Holtz et al. |
| 2002/0056098 A1 | 5/2002 | White |
| 2002/0057893 A1 | 5/2002 | Wood et al. |
| 2002/0059599 A1 | 5/2002 | Schein et al. |
| 2002/0059602 A1 | 5/2002 | MacRae et al. |
| 2002/0073424 A1 | 6/2002 | Ward et al. |
| 2002/0078450 A1 | 6/2002 | Bennington et al. |
| 2002/0083439 A1 | 6/2002 | Eldering |
| 2002/0090203 A1 | 7/2002 | Mankovitz |
| 2002/0092017 A1 | 7/2002 | Klosterman et al. |
| 2002/0095676 A1 | 7/2002 | Knee et al. |
| 2002/0107853 A1 | 8/2002 | Hofmann et al. |
| 2002/0110353 A1 | 8/2002 | Potrebic et al. |
| 2002/0112249 A1 | 8/2002 | Hendricks et al. |
| 2002/0120925 A1 | 8/2002 | Logan |
| 2002/0120933 A1 | 8/2002 | Knudson et al. |
| 2002/0124249 A1 | 9/2002 | Shintani et al. |
| 2002/0129368 A1 | 9/2002 | Schlack et al. |
| 2002/0138840 A1 | 9/2002 | Schein et al. |
| 2002/0144279 A1 | 10/2002 | Zhou |
| 2002/0147976 A1 | 10/2002 | Yuen et al. |
| 2002/0147977 A1 | 10/2002 | Hammett et al. |
| 2002/0154888 A1 | 10/2002 | Allen et al. |
| 2002/0166119 A1 | 11/2002 | Cristofalo |

(56) References Cited

U.S. PATENT DOCUMENTS

| | | |
|---|---|---|
| 2002/0174230 A1 | 11/2002 | Gudorf et al. |
| 2002/0174424 A1 | 11/2002 | Chang et al. |
| 2002/0174430 A1 | 11/2002 | Ellis et al. |
| 2002/0174433 A1 | 11/2002 | Baumgartner et al. |
| 2002/0191954 A1 | 12/2002 | Beach et al. |
| 2002/0194596 A1 | 12/2002 | Srivastava |
| 2002/0198762 A1 | 12/2002 | Donato |
| 2002/0199185 A1 | 12/2002 | Kaminski et al. |
| 2003/0005432 A1 | 1/2003 | Ellis et al. |
| 2003/0005445 A1 | 1/2003 | Schein et al. |
| 2003/0009766 A1 | 1/2003 | Marolda |
| 2003/0067554 A1 | 4/2003 | Klarfeld et al. |
| 2003/0088873 A1 | 5/2003 | McCoy et al. |
| 2003/0093792 A1 | 5/2003 | Labeeb et al. |
| 2003/0098891 A1 | 5/2003 | Molander |
| 2003/0103088 A1 | 6/2003 | Dresti et al. |
| 2003/0110056 A1 | 6/2003 | Berghofer et al. |
| 2003/0110494 A1 | 6/2003 | Bennington et al. |
| 2003/0110495 A1 | 6/2003 | Bennington et al. |
| 2003/0110499 A1 | 6/2003 | Knudson et al. |
| 2003/0110500 A1 | 6/2003 | Rodriguez |
| 2003/0115599 A1 | 6/2003 | Bennington et al. |
| 2003/0115602 A1 | 6/2003 | Knee et al. |
| 2003/0118323 A1 | 6/2003 | Ismail et al. |
| 2003/0126607 A1 | 7/2003 | Phillips et al. |
| 2003/0135490 A1 | 7/2003 | Barrett et al. |
| 2003/0145323 A1 | 7/2003 | Hendricks et al. |
| 2003/0149988 A1 | 8/2003 | Ellis et al. |
| 2003/0163813 A1 | 8/2003 | Klosterman et al. |
| 2003/0164858 A1 | 9/2003 | Klosterman et al. |
| 2003/0188310 A1 | 10/2003 | Klosterman et al. |
| 2003/0188311 A1 | 10/2003 | Yuen et al. |
| 2003/0192050 A1 | 10/2003 | Fellenstein et al. |
| 2003/0196201 A1 | 10/2003 | Schein et al. |
| 2003/0196203 A1 | 10/2003 | Ellis et al. |
| 2003/0198462 A1 | 10/2003 | Bumgardner et al. |
| 2003/0204847 A1 | 10/2003 | Ellis et al. |
| 2003/0206719 A1 | 11/2003 | Kilonoardner et al. |
| 2003/0208756 A1 | 11/2003 | Macrae et al. |
| 2003/0208758 A1 | 11/2003 | Schein et al. |
| 2003/0208759 A1 | 11/2003 | Gordon et al. |
| 2003/0210898 A1 | 11/2003 | Juen et al. |
| 2003/0212996 A1 | 11/2003 | Wolzien |
| 2003/0226144 A1 | 12/2003 | Thurston et al. |
| 2004/0003097 A1 | 1/2004 | Willis |
| 2004/0003405 A1 | 1/2004 | Boston et al. |
| 2004/0003407 A1 | 1/2004 | Hanafee et al. |
| 2004/0015397 A1 | 1/2004 | Barry et al. |
| 2004/0019907 A1 | 1/2004 | Li et al. |
| 2004/0049787 A1 | 3/2004 | Maissel et al. |
| 2004/0049794 A1 | 3/2004 | Shao et al. |
| 2004/0060063 A1 | 3/2004 | Russ et al. |
| 2004/0070594 A1 | 4/2004 | Burke |
| 2004/0073918 A1 | 4/2004 | Ferman et al. |
| 2004/0073923 A1 | 4/2004 | Wasserman |
| 2004/0073924 A1 | 4/2004 | Pendakur |
| 2004/0078809 A1 | 4/2004 | Drazin |
| 2004/0078814 A1 | 4/2004 | Allen |
| 2004/0078815 A1 | 4/2004 | Lemmons et al. |
| 2004/0088729 A1 | 5/2004 | Petrovic et al. |
| 2004/0098744 A1 | 5/2004 | Gutta |
| 2004/0103092 A1 | 5/2004 | Tuzhilin et al. |
| 2004/0103434 A1 | 5/2004 | Ellis |
| 2004/0111742 A1 | 6/2004 | Hendricks et al. |
| 2004/0111745 A1 | 6/2004 | Schein et al. |
| 2004/0128686 A1 | 7/2004 | Boyer et al. |
| 2004/0133910 A1 | 7/2004 | Gordon et al. |
| 2004/0139465 A1 | 7/2004 | Matthews et al. |
| 2004/0156614 A1 | 8/2004 | Bumgardner et al. |
| 2004/0160862 A1 | 8/2004 | Ueki |
| 2004/0168189 A1 | 8/2004 | Reynolds et al. |
| 2004/0181814 A1 | 9/2004 | Ellis et al. |
| 2004/0187164 A1 | 9/2004 | Kandasamy et al. |
| 2004/0194131 A1 | 9/2004 | Ellis et al. |
| 2004/0194138 A1 | 9/2004 | Boylan et al. |
| 2004/0194141 A1 | 9/2004 | Sanders |
| 2004/0210932 A1 | 10/2004 | Mori et al. |
| 2004/0210935 A1 | 10/2004 | Schein et al. |
| 2004/0221310 A1 | 11/2004 | Herrington et al. |
| 2004/0255321 A1 | 12/2004 | Matz |
| 2004/0264920 A1 | 12/2004 | Helmstetter |
| 2005/0010949 A1 | 1/2005 | Ward et al. |
| 2005/0015804 A1 | 1/2005 | LaJoie et al. |
| 2005/0015815 A1 | 1/2005 | Shoff et al. |
| 2005/0028218 A1 | 2/2005 | Blake |
| 2005/0097622 A1 | 5/2005 | Zigmond et al. |
| 2005/0125240 A9 | 6/2005 | Speiser et al. |
| 2005/0129049 A1 | 6/2005 | Srinivasan et al. |
| 2005/0132264 A1 | 6/2005 | Joshi et al. |
| 2005/0138659 A1 | 6/2005 | Boccon-Gibod et al. |
| 2005/0138660 A1 | 6/2005 | Boyer et al. |
| 2005/0154640 A1 | 7/2005 | Kolluri et al. |
| 2005/0155056 A1 | 7/2005 | Knee et al. |
| 2005/0157217 A1 | 7/2005 | Hendricks |
| 2005/0183123 A1 | 8/2005 | Lee et al. |
| 2005/0188402 A1 | 8/2005 | de Andrade et al. |
| 2005/0193015 A1 | 9/2005 | Logston et al. |
| 2005/0198668 A1 | 9/2005 | Yuen et al. |
| 2005/0204382 A1 | 9/2005 | Ellis |
| 2005/0204388 A1 | 9/2005 | Knudson et al. |
| 2005/0216936 A1 | 9/2005 | Knudson et al. |
| 2005/0229214 A1 | 10/2005 | Young et al. |
| 2005/0229215 A1 | 10/2005 | Schein et al. |
| 2005/0234880 A1 | 10/2005 | Zeng et al. |
| 2005/0235320 A1 | 10/2005 | Maze et al. |
| 2005/0235323 A1 | 10/2005 | Ellis et al. |
| 2005/0240962 A1 | 10/2005 | Cooper et al. |
| 2005/0240968 A1 | 10/2005 | Knudson et al. |
| 2005/0244138 A1 | 11/2005 | O'Connor et al. |
| 2005/0251827 A1 | 11/2005 | Ellis et al. |
| 2005/0267994 A1* | 12/2005 | Wong ................... H04N 5/765 |
| | | 709/246 |
| 2005/0273377 A1 | 12/2005 | Ouimet et al. |
| 2005/0273819 A1 | 12/2005 | Knudson et al. |
| 2005/0278741 A1 | 12/2005 | Robarts et al. |
| 2005/0283796 A1 | 12/2005 | Flickinger |
| 2005/0283800 A1 | 12/2005 | Ellis et al. |
| 2006/0037044 A1 | 2/2006 | Daniels |
| 2006/0041548 A1 | 2/2006 | Parsons et al. |
| 2006/0083484 A1 | 4/2006 | Wada et al. |
| 2006/0101490 A1 | 5/2006 | Leurs |
| 2006/0123448 A1 | 6/2006 | Ma et al. |
| 2006/0140584 A1 | 6/2006 | Ellis et al. |
| 2006/0150216 A1 | 7/2006 | Herz et al. |
| 2006/0155764 A1 | 7/2006 | Tao |
| 2006/0156329 A1 | 7/2006 | Treese |
| 2006/0161952 A1 | 7/2006 | Herz et al. |
| 2006/0184558 A1 | 8/2006 | Martin et al. |
| 2006/0204142 A1 | 9/2006 | West et al. |
| 2006/0212900 A1 | 9/2006 | Ismail et al. |
| 2006/0248555 A1 | 11/2006 | Eldering |
| 2006/0277271 A1* | 12/2006 | Morse ................... H04L 67/306 |
| | | 709/217 |
| 2007/0005526 A1 | 1/2007 | Whitney et al. |
| 2007/0005653 A1 | 1/2007 | Marsh |
| 2007/0016926 A1 | 1/2007 | Ward et al. |
| 2007/0028266 A1 | 2/2007 | Trajkovic et al. |
| 2007/0033224 A1 | 2/2007 | Allen et al. |
| 2007/0033613 A1 | 2/2007 | Ward et al. |
| 2007/0038672 A1 | 2/2007 | Plastina et al. |
| 2007/0050352 A1* | 3/2007 | Kim ..................... G06F 17/2223 |
| 2007/0094067 A1 | 4/2007 | Kumar et al. |
| 2007/0118498 A1 | 5/2007 | Song et al. |
| 2007/0136751 A1 | 6/2007 | Garbow et al. |
| 2007/0157242 A1 | 7/2007 | Cordray et al. |
| 2007/0162934 A1 | 7/2007 | Roop et al. |
| 2007/0186240 A1 | 8/2007 | Ward et al. |
| 2007/0204308 A1 | 8/2007 | Nicholas et al. |
| 2007/0208718 A1 | 9/2007 | Javid et al. |
| 2007/0214480 A1 | 9/2007 | Kamen |
| 2007/0234393 A1 | 10/2007 | Walker et al. |
| 2007/0244902 A1 | 10/2007 | Seide et al. |
| 2007/0255693 A1 | 11/2007 | Ramaswamy et al. |
| 2007/0271582 A1 | 11/2007 | Ellis et al. |

(56) References Cited

U.S. PATENT DOCUMENTS

| | | | |
|---|---|---|---|
| 2007/0288961 | A1 | 12/2007 | Guldi et al. |
| 2008/0004989 | A1 | 1/2008 | Yi |
| 2008/0066111 | A1 | 3/2008 | Ellis et al. |
| 2008/0077575 | A1 | 3/2008 | Tateno et al. |
| 2008/0080774 | A1 | 4/2008 | Jacobs et al. |
| 2008/0092155 | A1 | 4/2008 | Ferrone et al. |
| 2008/0115169 | A1 | 5/2008 | Ellis et al. |
| 2008/0126303 | A1 | 5/2008 | Park et al. |
| 2008/0127265 | A1 | 5/2008 | Ward et al. |
| 2008/0127266 | A1 | 5/2008 | Ward et al. |
| 2008/0178216 | A1 | 7/2008 | Bennington et al. |
| 2008/0178221 | A1 | 7/2008 | Schein et al. |
| 2008/0178222 | A1 | 7/2008 | Bennington et al. |
| 2008/0178223 | A1 | 7/2008 | Kwoh et al. |
| 2008/0184286 | A1 | 7/2008 | Kwoh et al. |
| 2008/0184305 | A1 | 7/2008 | Schein et al. |
| 2008/0184308 | A1 | 7/2008 | Herrington et al. |
| 2008/0184312 | A1 | 7/2008 | Schein et al. |
| 2008/0184315 | A1 | 7/2008 | Ellis et al. |
| 2008/0189744 | A1 | 8/2008 | Schein et al. |
| 2008/0222106 | A1 | 9/2008 | Rao et al. |
| 2008/0235725 | A1 | 9/2008 | Hendricks |
| 2008/0270561 | A1 | 10/2008 | Tang et al. |
| 2008/0281689 | A1 | 11/2008 | Blinnikka et al. |
| 2008/0288980 | A1 | 11/2008 | Schein et al. |
| 2009/0025033 | A1 | 1/2009 | Stautner et al. |
| 2009/0049481 | A1 | 2/2009 | Fellenstein et al. |
| 2009/0055390 | A1 | 2/2009 | Maeda et al. |
| 2009/0070817 | A1 | 3/2009 | Ellis et al. |
| 2009/0119723 | A1 | 5/2009 | Tinsman |
| 2009/0150219 | A1 | 6/2009 | Headings et al. |
| 2009/0193458 | A1 | 7/2009 | Finseth et al. |
| 2009/0234878 | A1 | 9/2009 | Herz et al. |
| 2010/0115541 | A1 | 5/2010 | Schein et al. |
| 2010/0146543 | A1 | 6/2010 | Knee et al. |
| 2010/0175078 | A1 | 7/2010 | Knudson et al. |
| 2010/0247065 | A1 | 9/2010 | Cooper et al. |
| 2010/0275230 | A1 | 10/2010 | Yuen et al. |
| 2010/0299692 | A1 | 11/2010 | Rao et al. |
| 2010/0319013 | A1 | 12/2010 | Knudson et al. |
| 2011/0013885 | A1 | 1/2011 | Wong et al. |
| 2011/0035771 | A1 | 2/2011 | Ward, III et al. |
| 2011/0131601 | A1 | 6/2011 | Alten et al. |
| 2011/0138417 | A1 | 6/2011 | Klappert |
| 2011/0167451 | A1 | 7/2011 | Yuen et al. |
| 2011/0185387 | A1 | 7/2011 | Schein et al. |
| 2011/0209170 | A1 | 8/2011 | Schein et al. |
| 2011/0276995 | A1 | 11/2011 | Alten et al. |
| 2012/0079539 | A1 | 3/2012 | Schein et al. |
| 2012/0095834 | A1 | 4/2012 | Doig et al. |
| 2012/0102523 | A1 | 4/2012 | Herz et al. |
| 2012/0185901 | A1 | 7/2012 | Macrae et al. |
| 2012/0272270 | A1 | 10/2012 | Boyer et al. |
| 2013/0031582 | A1 | 1/2013 | Tinsman et al. |
| 2014/0149434 | A1 | 5/2014 | Aravamudan et al. |
| 2017/0262437 | A1 | 9/2017 | Raichelgauz et al. |

FOREIGN PATENT DOCUMENTS

| | | |
|---|---|---|
| AU | 733993 B2 | 5/2001 |
| AU | 749209 B2 | 6/2002 |
| AU | 760568 B2 | 5/2003 |
| AU | 765648 B2 | 9/2003 |
| AU | 2008201306 A1 | 4/2008 |
| CA | 1030505 A1 | 5/1978 |
| CA | 1187197 A1 | 5/1985 |
| CA | 1188811 A1 | 6/1985 |
| CA | 1196082 A1 | 10/1985 |
| CA | 1200911 A1 | 2/1986 |
| CA | 1203625 A1 | 4/1986 |
| CA | 2151458 A1 | 6/1994 |
| CA | 2164608 A1 | 12/1994 |
| CA | 2285645 A1 | 7/1998 |
| CA | 2297039 A1 | 1/1999 |
| CA | 2312326 A1 | 6/1999 |
| CA | 2322217 A1 | 9/1999 |
| CA | 2324278 A1 | 11/1999 |
| CA | 2513282 A1 | 11/1999 |
| CN | 1200221 A | 11/1998 |
| CN | 1226030 | 8/1999 |
| CN | 1555191 | 12/2004 |
| CN | 1567986 | 1/2005 |
| DE | 29 18 846 | 11/1980 |
| DE | 3246225 A1 | 6/1984 |
| DE | 3337204 | 4/1985 |
| DE | 36 21 263 A1 | 1/1988 |
| DE | 3640436 A1 | 6/1988 |
| DE | 3702220 A1 | 8/1988 |
| DE | 3909334 A1 | 9/1990 |
| DE | 41 43 074 A1 | 7/1992 |
| DE | 4201031 A1 | 7/1993 |
| DE | 4217246 A1 | 12/1993 |
| DE | 4240187 A1 | 6/1994 |
| DE | 4407701 A1 | 9/1995 |
| DE | 4440419 A1 | 5/1996 |
| DE | 19 531 121 A1 | 2/1997 |
| DE | 19 740 079 A1 | 3/1999 |
| DE | 19 931 046 A1 | 1/2001 |
| DE | 42 90 947 B4 | 11/2006 |
| EP | 0 072 153 A2 | 2/1983 |
| EP | 0 148 733 A1 | 7/1985 |
| EP | 0 222 025 A1 | 5/1987 |
| EP | 0 229 526 A2 | 7/1987 |
| EP | 0 239 884 A1 | 10/1987 |
| EP | 0 276425 A2 | 8/1988 |
| EP | 0337336 A2 | 10/1989 |
| EP | 0339675 | 11/1989 |
| EP | 0 363 847 A1 | 4/1990 |
| EP | 0 393 555 | 10/1990 |
| EP | 0396062 A2 | 11/1990 |
| EP | 0 401 015 A2 | 12/1990 |
| EP | 0401930 | 12/1990 |
| EP | 0408892 A1 | 1/1991 |
| EP | 0420123 A2 | 4/1991 |
| EP | 0424648 A2 | 5/1991 |
| EP | 0444496 | 9/1991 |
| EP | 0447968 A2 | 9/1991 |
| EP | 0 463 451 A2 | 1/1992 |
| EP | 0 477 754 A2 | 4/1992 |
| EP | 0477756 A2 | 4/1992 |
| EP | 0 489 387 A2 | 6/1992 |
| EP | 0488379 | 6/1992 |
| EP | 0 492 853 A2 | 7/1992 |
| EP | 497 235 | 8/1992 |
| EP | 0532322 A2 | 3/1993 |
| EP | 0536901 A2 | 4/1993 |
| EP | 0550911 A1 | 7/1993 |
| EP | 0 560 593 | 9/1993 |
| EP | 0 572 090 | 12/1993 |
| EP | 0 575 956 A2 | 12/1993 |
| EP | 0617563 A1 | 9/1994 |
| EP | 0 620 689 A1 | 10/1994 |
| EP | 0624039 A2 | 11/1994 |
| EP | 0 644 689 A2 | 3/1995 |
| EP | 0 650 114 A2 | 4/1995 |
| EP | 0 658 048 A1 | 6/1995 |
| EP | 0 669 760 | 8/1995 |
| EP | 0 673 164 A1 | 9/1995 |
| EP | 0 682 452 A2 | 11/1995 |
| EP | 0 723369 A1 | 7/1996 |
| EP | 0721253 A2 | 7/1996 |
| EP | 0725539 A2 | 8/1996 |
| EP | 0 742669 | 11/1996 |
| EP | 0752767 A2 | 1/1997 |
| EP | 0753964 | 1/1997 |
| EP | 0762751 A2 | 3/1997 |
| EP | 0762756 A2 | 3/1997 |
| EP | 0772360 | 5/1997 |
| EP | 0774866 A2 | 5/1997 |
| EP | 0775417 A1 | 5/1997 |
| EP | 0784405 | 7/1997 |
| EP | 0 789 488 | 8/1997 |
| EP | 0797355 | 9/1997 |
| EP | 0 804 028 A1 | 10/1997 |

(56) References Cited

FOREIGN PATENT DOCUMENTS

| | | |
|---|---|---|
| EP | 0 805 590 A2 | 11/1997 |
| EP | 0 806 111 A1 | 11/1997 |
| EP | 0805594 A2 | 11/1997 |
| EP | 0822718 | 2/1998 |
| EP | 0827340 A2 | 3/1998 |
| EP | 0 836 320 | 4/1998 |
| EP | 0 836 321 | 4/1998 |
| EP | 0 837599 A2 | 4/1998 |
| EP | 0834798 | 4/1998 |
| EP | 0843468 | 5/1998 |
| EP | 0848554 A2 | 6/1998 |
| EP | 0849948 | 6/1998 |
| EP | 0 852 361 A2 | 7/1998 |
| EP | 0 854 645 | 7/1998 |
| EP | 0851681 | 7/1998 |
| EP | 0852442 A1 | 7/1998 |
| EP | 0854654 | 7/1998 |
| EP | 0880856 A1 | 12/1998 |
| EP | 0 892 554 A2 | 1/1999 |
| EP | 0905985 A2 | 3/1999 |
| EP | 0 921 682 A2 | 6/1999 |
| EP | 0924927 | 6/1999 |
| EP | 0935393 A2 | 8/1999 |
| EP | 0 940 983 | 9/1999 |
| EP | 0 945003 B1 | 9/1999 |
| EP | 0940985 | 9/1999 |
| EP | 0944253 A1 | 9/1999 |
| EP | 0963119 A1 | 12/1999 |
| EP | 0988876 A1 | 3/2000 |
| EP | 1014715 A2 | 6/2000 |
| EP | 1 058 999 A1 | 12/2000 |
| EP | 1 059 749 | 12/2000 |
| EP | 1067792 A2 | 1/2001 |
| EP | 1 093 305 A2 | 4/2001 |
| EP | 1095504 A2 | 5/2001 |
| EP | 1135929 A1 | 9/2001 |
| EP | 0 856 847 | 11/2001 |
| EP | 1213919 A2 | 6/2002 |
| EP | 1036466 | 3/2003 |
| EP | 0936811 B1 | 5/2003 |
| EP | 1763234 A2 | 3/2007 |
| FR | 2662895 A1 | 12/1991 |
| GB | 1 554 411 | 10/1979 |
| GB | 2034995 A | 6/1980 |
| GB | 2126002 A | 3/1984 |
| GB | 2185670 A | 7/1987 |
| GB | 2217144 A | 10/1989 |
| GB | 2 227 622 | 8/1990 |
| GB | 2 229 595 | 9/1990 |
| GB | 2256546 A | 12/1992 |
| GB | 2264409 A | 8/1993 |
| GB | 2 275 585 A | 8/1994 |
| GB | 2305049 A | 3/1997 |
| GB | 2309134 A | 7/1997 |
| GB | 2325537 A | 11/1998 |
| GB | 2 346 251 | 8/2000 |
| GB | 2377578 | 1/2003 |
| HK | 1035285 | 3/2005 |
| JP | 58137334 A | 8/1983 |
| JP | 58137344 A | 8/1983 |
| JP | 58196738 A | 11/1983 |
| JP | 58210776 A | 12/1983 |
| JP | 59141878 A | 8/1984 |
| JP | 61050470 A | 3/1986 |
| JP | 61074476 A | 4/1986 |
| JP | 62-060370 | 3/1987 |
| JP | 62060372 | 3/1987 |
| JP | 62060384 A | 3/1987 |
| JP | 06392177 | 4/1988 |
| JP | 63234679 A | 9/1988 |
| JP | 01307944 A | 12/1989 |
| JP | 02048879 A | 2/1990 |
| JP | 02-119307 A | 5/1990 |
| JP | 06-141250 | 5/1990 |
| JP | 2189753 A | 7/1990 |
| JP | 10-234007 | 9/1990 |
| JP | 03-022770 | 1/1991 |
| JP | 03063990 A | 3/1991 |
| JP | 03-167975 A | 7/1991 |
| JP | 3178278 A | 8/1991 |
| JP | 03-214919 A | 9/1991 |
| JP | 03-243076 A | 10/1991 |
| JP | 09-009244 | 1/1992 |
| JP | 04-44475 | 2/1992 |
| JP | 04079053 | 3/1992 |
| JP | 04-162889 A | 6/1992 |
| JP | 04-180480 A | 6/1992 |
| JP | 04227380 | 8/1992 |
| JP | 04250760 A | 9/1992 |
| JP | 04-335395 A | 11/1992 |
| JP | 4340258 A | 11/1992 |
| JP | 05-103281 | 4/1993 |
| JP | 05-122692 A | 5/1993 |
| JP | 05-183826 | 7/1993 |
| JP | 05284437 A | 10/1993 |
| JP | 05-339100 A | 12/1993 |
| JP | 06021907 | 1/1994 |
| JP | 06038165 | 2/1994 |
| JP | 06-90408 | 3/1994 |
| JP | 60-61935 A | 3/1994 |
| JP | 06111413 | 4/1994 |
| JP | 06-124309 | 5/1994 |
| JP | 06-133235 A | 5/1994 |
| JP | 06504165 | 5/1994 |
| JP | 06-164973 | 6/1994 |
| JP | 06243539 | 9/1994 |
| JP | 06-295312 A | 10/1994 |
| JP | 06303541 | 10/1994 |
| JP | 0723356 | 1/1995 |
| JP | 07020254 A | 1/1995 |
| JP | 07-050259 | 2/1995 |
| JP | 07-076592 | 3/1995 |
| JP | 07-135621 A | 5/1995 |
| JP | 07123326 | 5/1995 |
| JP | 07-162776 | 6/1995 |
| JP | 07147657 A | 6/1995 |
| JP | 07160732 | 6/1995 |
| JP | 07193762 A | 7/1995 |
| JP | 7-262200 A | 10/1995 |
| JP | 7-284033 A | 10/1995 |
| JP | 07-288759 | 10/1995 |
| JP | 07-321748 | 12/1995 |
| JP | 08-32528 | 2/1996 |
| JP | 08-056352 | 2/1996 |
| JP | 0832538 | 2/1996 |
| JP | 08-137334 A | 5/1996 |
| JP | 08125497 | 5/1996 |
| JP | 08130517 A | 5/1996 |
| JP | 8-506469 | 7/1996 |
| JP | 08506941 | 7/1996 |
| JP | 08-196738 A | 8/1996 |
| JP | 08-234709 | 9/1996 |
| JP | 08251122 | 9/1996 |
| JP | 08275077 | 10/1996 |
| JP | 08289281 A | 11/1996 |
| JP | 08-331546 A | 12/1996 |
| JP | 09-37168 | 2/1997 |
| JP | 09037151 A | 2/1997 |
| JP | 09037171 | 2/1997 |
| JP | 09037172 A | 2/1997 |
| JP | 9-65321 | 3/1997 |
| JP | 09-070020 | 3/1997 |
| JP | 09083888 A | 3/1997 |
| JP | 09-102827 A | 4/1997 |
| JP | 09-114781 | 5/1997 |
| JP | 09 162818 | 6/1997 |
| JP | 09-162821 | 6/1997 |
| JP | 09-247565 A | 9/1997 |
| JP | 092-44475 A | 9/1997 |
| JP | 09-261609 A | 10/1997 |
| JP | 09-270965 A | 10/1997 |
| JP | 09289630 | 11/1997 |
| JP | 09322213 | 12/1997 |
| JP | 10-042235 | 2/1998 |

(56) References Cited

FOREIGN PATENT DOCUMENTS

| | | |
|---|---|---|
| JP | 10-501936 | 2/1998 |
| JP | 10042218 | 2/1998 |
| JP | 10-093933 | 4/1998 |
| JP | 10-143340 | 5/1998 |
| JP | 10-143349 | 5/1998 |
| JP | 10-228500 | 8/1998 |
| JP | 10228687 | 8/1998 |
| JP | 10257400 A | 9/1998 |
| JP | 10-289205 | 10/1998 |
| JP | 2838892 | 10/1998 |
| JP | 10-512420 | 11/1998 |
| JP | 11008810 | 1/1999 |
| JP | 11-136615 A | 5/1999 |
| JP | 11-136658 | 5/1999 |
| JP | 11177962 A | 7/1999 |
| JP | 11261917 A | 9/1999 |
| JP | 11-313280 A | 11/1999 |
| JP | 11308561 A | 11/1999 |
| JP | 2000-013708 | 1/2000 |
| JP | 2000-138886 | 5/2000 |
| JP | 2000-224533 | 8/2000 |
| JP | 2000-235546 | 8/2000 |
| JP | 2000216845 A | 8/2000 |
| JP | 2000-261750 A | 9/2000 |
| JP | 2000-287179 A | 10/2000 |
| JP | 2000-306314 | 11/2000 |
| JP | 2000-312333 A | 11/2000 |
| JP | 2000-339931 A | 12/2000 |
| JP | 2001-022282 A | 1/2001 |
| JP | 2001-086423 A | 3/2001 |
| JP | 2001-088372 | 4/2001 |
| JP | 2001-165669 | 6/2001 |
| JP | 2001-167522 | 6/2001 |
| JP | 2001-213595 | 8/2001 |
| JP | 2001-257950 | 9/2001 |
| JP | 2001-513595 | 9/2001 |
| JP | 2002506328 | 2/2002 |
| JP | 2002-279969 | 9/2002 |
| JP | 2003-018668 A | 1/2003 |
| JP | 2003-189200 A | 7/2003 |
| JP | 2003-199004 A | 7/2003 |
| JP | 2004-007592 A | 1/2004 |
| JP | 2004-023326 A | 1/2004 |
| JP | 2006-186513 A | 7/2006 |
| JP | 2006-340396 | 12/2006 |
| JP | 4062577 | 3/2008 |
| JP | 2010-119149 A | 5/2010 |
| JP | 5053378 B2 | 10/2012 |
| TW | O247388 | 10/1994 |
| WO | WO-86/01359 A1 | 2/1986 |
| WO | WO-86/01962 | 3/1986 |
| WO | WO-87/03766 | 6/1987 |
| WO | WO-88/04057 A1 | 6/1988 |
| WO | WO-88/04507 | 6/1988 |
| WO | WO-8902682 A1 | 3/1989 |
| WO | WO-89/03085 | 4/1989 |
| WO | WO-89/12370 | 12/1989 |
| WO | WO-90/00847 A1 | 1/1990 |
| WO | WO-90/01243 A1 | 2/1990 |
| WO | WO-90/15507 | 12/1990 |
| WO | WO-9100670 | 1/1991 |
| WO | WO-91/05436 A1 | 4/1991 |
| WO | WO-91/06367 A2 | 5/1991 |
| WO | WO-91/06912 A1 | 5/1991 |
| WO | WO-91/18476 A1 | 11/1991 |
| WO | WO-92/04801 | 3/1992 |
| WO | WO-9222983 A2 | 12/1992 |
| WO | WO-9304473 | 3/1993 |
| WO | WO-9305452 A1 | 3/1993 |
| WO | WO-93/11638 | 6/1993 |
| WO | WO-93/11639 | 6/1993 |
| WO | WO-93/11640 | 6/1993 |
| WO | WO-93/23957 A1 | 11/1993 |
| WO | WO-94/13107 | 6/1994 |
| WO | WO-94/14281 A1 | 6/1994 |
| WO | WO-94/14282 A1 | 6/1994 |
| WO | WO-94/14283 A1 | 6/1994 |
| WO | WO-94/14284 A1 | 6/1994 |
| WO | WO-94/16441 A1 | 7/1994 |
| WO | WO-9421085 A1 | 9/1994 |
| WO | WO-94/23383 A1 | 10/1994 |
| WO | WO-94/29811 A1 | 12/1994 |
| WO | WO-95/01056 | 1/1995 |
| WO | WO-95/01057 A1 | 1/1995 |
| WO | WO-95/01058 A1 | 1/1995 |
| WO | WO-95/01059 A1 | 1/1995 |
| WO | WO-95/02945 A1 | 1/1995 |
| WO | WO-95/04431 A2 | 2/1995 |
| WO | WO-95/06389 A1 | 3/1995 |
| WO | WO-95/07003 | 3/1995 |
| WO | WO-95/10910 | 4/1995 |
| WO | WO-95/15658 A1 | 6/1995 |
| WO | WO-95/16568 A1 | 6/1995 |
| WO | WO-9515649 A1 | 6/1995 |
| WO | WO-9515657 A1 | 6/1995 |
| WO | WO-95/19092 A1 | 7/1995 |
| WO | WO-95/26095 A2 | 9/1995 |
| WO | WO-95/26608 A1 | 10/1995 |
| WO | WO-95/28055 A1 | 10/1995 |
| WO | WO-95/28799 A1 | 10/1995 |
| WO | WO-95/30961 A1 | 11/1995 |
| WO | WO-95/32585 | 11/1995 |
| WO | WO-95/32587 | 11/1995 |
| WO | WO-9531069 | 11/1995 |
| WO | WO-9532583 A1 | 11/1995 |
| WO | WO-1995030302 A1 | 11/1995 |
| WO | WO-96/07270 A1 | 3/1996 |
| WO | WO-96/08109 A1 | 3/1996 |
| WO | WO-96/08923 A1 | 3/1996 |
| WO | WO-96/09721 A1 | 3/1996 |
| WO | WO-9608113 A1 | 3/1996 |
| WO | WO-96/13932 A1 | 5/1996 |
| WO | WO-9613935 A1 | 5/1996 |
| WO | WO-96/17467 A2 | 6/1996 |
| WO | WO-9617473 | 6/1996 |
| WO | WO-9621990 A2 | 7/1996 |
| WO | WO-96/26605 | 8/1996 |
| WO | WO-9627270 A1 | 9/1996 |
| WO | WO-9627982 | 9/1996 |
| WO | WO-9627989 | 9/1996 |
| WO | WO-96/31980 A1 | 10/1996 |
| WO | WO-96/34467 A1 | 10/1996 |
| WO | WO-96/34486 A1 | 10/1996 |
| WO | WO-96/34491 A1 | 10/1996 |
| WO | WO-96/36172 | 11/1996 |
| WO | WO-96/37075 | 11/1996 |
| WO | WO-9637996 A1 | 11/1996 |
| WO | WO-96/38799 A1 | 12/1996 |
| WO | WO-96/41477 A1 | 12/1996 |
| WO | WO-96/41478 | 12/1996 |
| WO | WO-9638962 | 12/1996 |
| WO | WO-9641470 A1 | 12/1996 |
| WO | WO-9641471 A1 | 12/1996 |
| WO | WO-97/02702 A2 | 1/1997 |
| WO | WO-97/04595 A1 | 2/1997 |
| WO | WO-9707656 | 3/1997 |
| WO | WO-97/12486 | 4/1997 |
| WO | WO-97/13368 | 4/1997 |
| WO | WO-97/17774 A1 | 5/1997 |
| WO | WO-97/18675 | 5/1997 |
| WO | WO-97/19555 A1 | 5/1997 |
| WO | WO-97/26612 A1 | 7/1997 |
| WO | WO-97/29458 A1 | 8/1997 |
| WO | WO-97/31480 | 8/1997 |
| WO | WO-97/34413 | 9/1997 |
| WO | WO-9734414 | 9/1997 |
| WO | WO-9740623 | 10/1997 |
| WO | WO-97/41673 A2 | 11/1997 |
| WO | WO-97/42763 | 11/1997 |
| WO | WO-97/46943 A1 | 12/1997 |
| WO | WO-97/47124 | 12/1997 |
| WO | WO-97/48230 | 12/1997 |
| WO | WO-97/49237 | 12/1997 |
| WO | WO-97/49241 | 12/1997 |

(56) References Cited

FOREIGN PATENT DOCUMENTS

| | | |
|---|---|---|
| WO | WO-97/49242 | 12/1997 |
| WO | WO-97/50251 | 12/1997 |
| WO | WO-9745786 | 12/1997 |
| WO | WO-9748228 A1 | 12/1997 |
| WO | WO-1997047135 A1 | 12/1997 |
| WO | WO-1998/00975 A1 | 1/1998 |
| WO | WO-1998/00976 | 1/1998 |
| WO | WO-98/06219 | 2/1998 |
| WO | WO-98/10589 A1 | 3/1998 |
| WO | WO-98/14009 A1 | 4/1998 |
| WO | WO-98/16062 | 4/1998 |
| WO | WO-98/17063 A1 | 4/1998 |
| WO | WO-98/17064 A1 | 4/1998 |
| WO | WO-98/20675 A1 | 5/1998 |
| WO | WO-9821664 A1 | 5/1998 |
| WO | WO-9821877 | 5/1998 |
| WO | WO-98/26584 | 6/1998 |
| WO | WO-98/27723 | 6/1998 |
| WO | WO-9826569 A2 | 6/1998 |
| WO | WO-98/28906 A2 | 7/1998 |
| WO | WO-98/31148 A1 | 7/1998 |
| WO | WO-98/37695 | 8/1998 |
| WO | WO-98/39893 A2 | 9/1998 |
| WO | WO-98/41020 A1 | 9/1998 |
| WO | WO-98/43183 A1 | 10/1998 |
| WO | WO-98/43406 A1 | 10/1998 |
| WO | WO-98/47279 | 10/1998 |
| WO | WO-98/47290 A1 | 10/1998 |
| WO | WO-98/48566 A2 | 10/1998 |
| WO | WO-9847283 | 10/1998 |
| WO | WO-98/56172 A1 | 12/1998 |
| WO | WO-98/56173 A1 | 12/1998 |
| WO | WO-98/56712 A1 | 12/1998 |
| WO | WO-99/01984 A1 | 1/1999 |
| WO | WO-99/03267 A1 | 1/1999 |
| WO | WO-99/04561 | 1/1999 |
| WO | WO-99/07142 A1 | 2/1999 |
| WO | WO-99/14947 A1 | 3/1999 |
| WO | WO-9918722 | 4/1999 |
| WO | WO-199918721 A1 | 4/1999 |
| WO | WO-99/22502 A1 | 5/1999 |
| WO | WO-99/29109 A1 | 6/1999 |
| WO | WO-99/30491 A1 | 6/1999 |
| WO | WO-99/31480 A1 | 6/1999 |
| WO | WO-99/33265 A1 | 7/1999 |
| WO | WO-99/38092 A1 | 7/1999 |
| WO | WO-9935827 A1 | 7/1999 |
| WO | WO-9937045 A1 | 7/1999 |
| WO | WO-9939280 | 8/1999 |
| WO | WO-99/45700 | 9/1999 |
| WO | WO-99/45701 A1 | 9/1999 |
| WO | WO-99/45702 | 9/1999 |
| WO | WO-99/52279 | 10/1999 |
| WO | WO-99/52285 A1 | 10/1999 |
| WO | WO-99/56466 | 11/1999 |
| WO | WO-99/56473 A1 | 11/1999 |
| WO | WO-99/57837 A2 | 11/1999 |
| WO | WO-99/57839 | 11/1999 |
| WO | WO-99/60493 A1 | 11/1999 |
| WO | WO-99/60783 | 11/1999 |
| WO | WO-99/60789 | 11/1999 |
| WO | WO-9960790 | 11/1999 |
| WO | WO-99/66725 | 12/1999 |
| WO | WO-9965237 A1 | 12/1999 |
| WO | WO-00/04706 A2 | 1/2000 |
| WO | WO-00/04708 A1 | 1/2000 |
| WO | WO-00/04709 A1 | 1/2000 |
| WO | WO-0002380 A2 | 1/2000 |
| WO | WO-00/07368 | 2/2000 |
| WO | WO-00/08850 | 2/2000 |
| WO | WO-00/08851 | 2/2000 |
| WO | WO-00/08852 | 2/2000 |
| WO | WO-0005889 A1 | 2/2000 |
| WO | WO-00/11865 A1 | 3/2000 |
| WO | WO-00/13415 A2 | 3/2000 |
| WO | WO-00/16548 | 3/2000 |
| WO | WO-2000/14951 A1 | 3/2000 |
| WO | WO-0011869 A1 | 3/2000 |
| WO | WO-0013416 A1 | 3/2000 |
| WO | WO-0016336 A1 | 3/2000 |
| WO | WO-00/28734 | 5/2000 |
| WO | WO-00/28739 | 5/2000 |
| WO | WO-0027122 A1 | 5/2000 |
| WO | WO 00/33560 A2 | 6/2000 |
| WO | WO-00/33573 A1 | 6/2000 |
| WO | WO-00/33578 A1 | 6/2000 |
| WO | WO-0033160 A2 | 6/2000 |
| WO | WO-0033224 A1 | 6/2000 |
| WO | WO-2000033233 A1 | 6/2000 |
| WO | WO-00/040014 A1 | 7/2000 |
| WO | WO-00/40025 A1 | 7/2000 |
| WO | WO-00/49801 A1 | 8/2000 |
| WO | WO-00/51310 A1 | 8/2000 |
| WO | WO-00/57645 A1 | 9/2000 |
| WO | WO-00/58833 | 10/2000 |
| WO | WO-00/58967 | 10/2000 |
| WO | WO-00/59214 A1 | 10/2000 |
| WO | WO-00/59220 A1 | 10/2000 |
| WO | WO-00/59223 | 10/2000 |
| WO | WO-00/62298 | 10/2000 |
| WO | WO-00/62299 | 10/2000 |
| WO | WO-00/62533 | 10/2000 |
| WO | WO-00/67475 | 11/2000 |
| WO | WO-200070505 A1 | 11/2000 |
| WO | WO-2000079798 A1 | 12/2000 |
| WO | WO-01/01677 A1 | 1/2001 |
| WO | WO-01/06784 A2 | 1/2001 |
| WO | WO-0110126 A1 | 2/2001 |
| WO | WO-0110128 A1 | 2/2001 |
| WO | WO-0111865 A1 | 2/2001 |
| WO | WO-01/15438 A1 | 3/2001 |
| WO | WO-01/22729 | 3/2001 |
| WO | WO-0119086 | 3/2001 |
| WO | WO-01/35662 A1 | 5/2001 |
| WO | WO-01-46843 A2 | 6/2001 |
| WO | WO-01/47238 | 6/2001 |
| WO | WO-01/47249 | 6/2001 |
| WO | WO-01/47257 | 6/2001 |
| WO | WO-01/47273 | 6/2001 |
| WO | WO-01/47279 | 6/2001 |
| WO | WO-0146869 | 6/2001 |
| WO | WO-0150743 | 7/2001 |
| WO | WO-0158158 | 8/2001 |
| WO | WO-01/75649 A2 | 10/2001 |
| WO | WO-01/76239 | 10/2001 |
| WO | WO-01/76248 A2 | 10/2001 |
| WO | WO-01/76704 A2 | 10/2001 |
| WO | WO-01/89213 A1 | 11/2001 |
| WO | WO-0182600 A2 | 11/2001 |
| WO | WO-02/31731 A2 | 4/2002 |
| WO | WO-02/078317 A2 | 10/2002 |
| WO | WO-02/84992 A2 | 10/2002 |
| WO | WO-03/05712 A1 | 1/2003 |
| WO | WO-2004004341 A1 | 1/2004 |
| WO | WO-04/066180 A1 | 8/2004 |
| WO | WO-06/079977 A2 | 8/2006 |
| WO | PCT/US2007063417 | 3/2007 |
| WO | WO-2008/042280 A2 | 4/2008 |

OTHER PUBLICATIONS

U.S. Appl. No. 11/682,533, filed Mar. 6, 2007.
U.S. Appl. No. 13/768,450, filed Feb. 15, 2013.
U.S. Appl. No. 11/682,588, filed Mar. 6, 2007.
U.S. Appl. No. 12/882,451, filed Sep. 15, 2010.
U.S. Appl. No. 13/021,086, filed Feb. 4, 2011.
U.S. Appl. No. 13/959,289, filed Aug. 5, 2013.
U.S. Appl. No. 11/682,596, filed Mar. 6, 2007.
U.S. Appl. No. 12/435,899, filed May 5, 2009.
U.S. Appl. No. 13/296,490, filed Nov. 15, 2011.
U.S. Appl. No. 13/296,477, filed Nov. 15, 2011.
U.S. Appl. No. 13/296,486, filed Nov. 15, 2011.
U.S. Appl. No. 11/682,599, filed Mar. 6, 2007.

(56) References Cited

OTHER PUBLICATIONS

U.S. Appl. No. 12/873,622, filed Sep. 1, 2010.
U.S. Appl. No. 13/788,265, filed Mar. 7, 2013.
U.S. Appl. No. 11/682,689, filed Mar. 6, 2007.
U.S. Appl. No. 12/692,896, filed Jan. 25, 2010.
U.S. Appl. No. 13/788,274, filed Mar. 7, 2013.
U.S. Appl. No. 11/682,693, filed Mar. 6, 2007.
U.S. Appl. No. 12/843,577, filed Jul. 26, 2010.
U.S. Appl. No. 13/035,162, filed Feb. 25, 2011.
U.S. Appl. No. 14/077,538, filed Nov. 12, 2013.
U.S. Appl. No. 11/682,695, filed Mar. 6, 2007.
U.S. Appl. No. 12/795,303, filed Jun. 7, 2010.
U.S. Appl. No. 11/682,700, filed Mar. 6, 2007.
U.S. Appl. No. 12/844,366, filed Jul. 27, 2010.
U.S. Appl. No. 13/442,436, filed Apr. 9, 2012.
U.S. Appl. No. 13/887,514, filed May 6, 2013.
U.S. Appl. No. 60/834,966, filed Aug. 2, 2006.
U.S. Appl. No. 60/796,614, filed May 1, 2006.
U.S. Appl. No. 60/784,027, filed Mar. 20, 2006.
U.S. Appl. No. 60/779,547, filed Mar. 6, 2006.
U.S. Appl. No. 09/330,792, filed Jun. 11, 1999, Knudson et al.
U.S. Appl. No. 09/332,244, filed Jun. 11, 1999, Ellis.
U.S. Appl. No. 09/356,268, filed Jul. 16, 1999, Rudnick et al.
"A New Approach to Addressability," CableData Brochure, 9 pages, undated.
"Generative Models for Cold-Start Recommendations," Schein et al, SIGR-2001, http://www.cis.upenn.edu/~popescul/Publications/schein01generative.pdf, last accessed Oct. 24, 2006, 9 pgs.
"Methods and Metrics for cold-Start Recommendations," Schein et al, SIGIR'02, Aug. 11-15, 2002, Tampere, Finland.
"OpenTV(R) and Interactive Channel Form Strategic Alliance to Deliver Interactive Programming to Satellite Television Subscribers", from the Internet at http://www.opentv.com/news/interactivechannelfinal.htm, printed on Jun. 8, 1999.
"Probabilistic Models for Unified Collaborative and Content-Based Recommendation in Sparse-Data Environments", Popescul et al, Proceedings of the Seventeenth Conference on Uncertainty in Artificial Intelligence (UAI-2001), to appear, Morgan Kaufmann, San Francisco, 2001.
"Prodigy Launches Interactive TV Listing", Apr. 22, 1994 public Broadcasting Report.
"SWAMI: A Framework for Collaborative Filtering Algorithm Development and Evaluation", Fisher et al., http://www.cs.berkeley.edu/~richie/swami/sigir00-final/report.pdf, last accessed on Oct. 24, 2006, 3 pgs.
"Social Information Filtering: Algorithms for automating "Word of Mouth"", Shardanand et al., http://www.cs.ubc.cal/~conati/532b/papers/chi-95-paper.pdf, last accessed Oct. 24, 2006, 8 pgs.
"StarSight Interactive Television Program Guide III" Jim Leftwich and Steve Schein, Functional/Interactional Architecture Specification Document, Orbit Interaction, Palo alto, California, Published before Apr. 19, 1995.
"StarSight Interactive Television Program Guide IV" Jim Leftwich and Steve Schein, Functional/Interactional Architecture Specification Document, Orbit Interaction, Palo Alto, California, Published before Apr. 19, 1995.
"StarSight Interactive Television Program Guide" Jim Leftwich, Willy Lai & Steve Schein Published before Apr. 19, 1995.
"TV Guide Online Set for Fall", Entertainment Marketing Letter, Aug. 1994.
"Utilizing Popularity Characteristics for Product Recommendation", Hyung Jun Ahn, International Journal of Electronic Commerce/Winter Jul. 2006, vol. 11, No. 2, pp. 59-80.
272OR Satellite Receiver User's Guide, General Instrument, 1991, pp. 58-61.
A Financial Times Survey: Viewdata (Advertisement), Financial Times, May 20, 1979, 1 page.
ACM Multimedia 93 Proceedings, A Digital On-Demand Video Service Suporting Content-Based Queries, Little et al. pp. 427-436, Jul. 1993.
Addressable Converters: A New Development at CableData, Via Cable, vol. 1, No. 12, Dec. 1981, 11 pages.
Advanced Analog Systems—Addressable Terminals, General Instrument Corp. of Horsham, Pennsylvania (URL:http--www.gi.com-BUSAREA-ANALOG-TERMINALWATCH-watch.html) Printed from the Internet on Mar. 4, 1999.
Advertisement for "TV Decisions," Cable Vision, Aug. 4, 1986, 3 pages.
Alexander "Visualizing cleared-off desktops," Computerworld, May 6, 1991, 1 page.
Anderson et al., UNIX Communications and the Internet (3d ed. 1995).
Antonoff, "Interactive Television," Popular Science, Nov. 1992, pp. 92-128.
Antonoff, "Stay Tuned for Smart TV," Popular Science, Nov. 1990, pp. 62-65.
Armstrong, "Channel-Surfing's next wave: Henry Yuen's interactive TV guide takes on TCI and Viacom," BusinessWeek, Jul. 31, 1995, 3 pages.
Arnold, "Britain to get wired city—via telephone," Electronics, Mar. 4, 1976, at 76, 3 pages.
Bach, U. et al., "Multimedia TV Set, Part 2 and Conclusion," Radio-Fernsehen Elektronik (RFE), Oct. 1996, pp. 38-40. (English language translation attached.).
Bach, et al., "Multimedia TV Set, Part 1" Radio-Fernsehen Elektronik (RFE), Sep. 1996, pp. 28, 30, 31, 12 pages (English language translation attached).
Baer, "Innovative Add-On TV Products," IEEE Transactions on Consumer Electronics, vol. CE-25, Nov. 1979, pp. 765-771.
Beddow, "The Virtual Channels Subscriber Interface," Communications Technology, Apr. 30, 1992.
Bell Atlantic Buys Cable TV Company for $22bn, Financial Times (London), Oct. 14, 1993 p. 65.
Bensch, "VPV Videotext Programs Videorecorder," IEEE Paper, Jun. 1988, pp. 788-792.
Berniker, "TV Guide going online", Broadcasting & Cable, pp. 49-52, Jun. 13, 1994.
Bertuch, "New Realities for PCs: Multimedia between aspiration and commerce," (translation), Exhibit NK 12 of TechniSat's nullity action against EP'111, Issue 10, pp. 40-46 (1991).
Bestler, Caitlin "Flexible Data Structures and Interface Rituals for Rapid Development of OSD Applications," Proceedings from the Eleven Technical Sessions, 42nd Annual Convention and Exposition and Exploration of the NCTA, San Francisco, CA Jun. 6-9, 1993, pp. 223-236. Jun. 6, 1993.
Blahut et al., "Interactive Television," Proceedings of the IEEE, pp. 1071-1085, Jul. 1995.
Boyd-Merritt, "Television wires two-way video," Electronic Engineering Times, Apr. 25, 1994, 3 pages.
Brochure, "Weststar and Videotoken Network Present the CableComputer," Revised Aug. 15, 1985 (Plaintiff's 334).
Brochure, Time Inc., "Now, Through the Advances of the Computer Age, You Can Get the Information You Want, When You Want It. Instantly and Conveniently, on Your Home TV Screen, "Time Teletext, Time Video Information Services, Inc., 9 pages, undated (V 79167-79175).
Brochure, VTN "*Videotoken Network, New Dimension Television,*" Dec. 1985 (Plaintiff's Exhibit 313).
Brugliera, "Digital On-Screen Display—A New Technology for the Consumer Interface," Symposium Record Cable TV Sessions of the 18th International Television Symposium & Technical Exhibition—Montreux, Switzerland, Jun. 10-15, 1993, pp. 571-586.
CNN Tech: Sonicblue revives ReplayTV, articles cnn.com, Sep. 10, 2001, retrieved from the internet: http://articles.cnn.com/2001-09-10/tech/replay.tv.idg_1_replaytv-sonicblue-digital-video?_s=PM:TECH, 2 pages.
*Cable Computer User's Guide*, Rev. 1, Dec. 1985 (Plaintiff's Exhibit 289).
Cable Television Equipment, Jerrold Communications Publication, dated 1992 and 1993, pp. 8-2.1 to 8-6 and 8-14.1 to 8-14.3.
CableData, Roseville Consumer Presentation, Mar. 1985 12 pages.
Cameron et al., Learning GNU Emacs (2d ed. 1996).

(56) References Cited

OTHER PUBLICATIONS

Carne, E.B., "The Wired Household,"*IEEE Spectrum*, vol. 16 No. 10, Oct. 1979, pp. 61-66.
Cascading Style Sheets, level 1, W3C Recommendation (Dec. 17, 1996), available at http://www.w3.org/TR/REC-CSS1-961217#anchor-pseudo-classes.
Case 4:11-cv-06591-PJH, Complaint for Declaratory Relief (plaintiff), dated Dec. 21, 2011, 16 pages.
Chan, "Learning Considerations in User Interface Design: The Room Model," Publication of the Software Portability Laboratory, University of Waterloo, Ontario, Canada, Jul. 1984, 52 pages.
Chang et al., "An Open-Systems Approach to Video on Demand," IEEE Communications Magazine, May 1994, pp. 68-80.
Chen et al., "Real Time video and Audio in the World Wide Web," Proc. 4th World Wide Web Conference, 1995, 15 pages.
Cherrick et al., "An Individually Addressable TV Receiver With Interactive Channel Guide Display, VCR, and Cable Box Control", IEEE Transactions on Consumer Electronics, vol. 4:3 (Aug. 1994), pp. 317-28.
Christodoulakis, Steven and Graham, Stephen "Browsing Within Time-Driven Multimedia Documents," *publication of the Institute for Computer Research*, University of Waterloo, Waterloo, Ontario, Canada Jul. 1988 pp. 219-227.
Communication of a Notice of Opposition, European Patent Application No. 08103167.6, Jan. 11, 2012, 24 pages.
Computer Network: Current Status and Outlook on Leading Science and Technology, Bureau of Science & Technology (Japan), vol. 1, Dec. 1986, 326 pages.
Contents of the website of StarSight Telecast, Inc. (http://www.StarSight.com) as of Apr. 21, 2004.
U.S. Appl. No. 60/179,548, filed Feb. 1, 2000.
Cox, J. et al, "Extended Services in a Digital Compression System," Proceedings from Eleven Technical Sessions: 42nd Annual Convention and Exposition of the National Cable Television Association, Jun. 1993, pp. 185-191.
Creation/Modification of the Audio Signal Processor Setup for a PC Audio Editor, IBM Technical Disclosure Bulletin, vol. 30, No. 10, Mar. 1988, pp. 367-376.
D2B-Home Bus Fur Audio and Video, Selektor, Apr. 1990, pp. 10, 12.
DAVIC Digital Audio-Visual Council, DAVIC 1.5 Specification, Baseline Document 1, Revised 4.0, Applications for Home Storage and Internet Based Systems, Published by Digital Audio-Visual Council 1995-1999.
DIRECTV Digital Satellite Receiver—Operating Instructions, Sony Electronics Inc. (2001).
DIRECTV Plus2 System, Thompson Consumer Electronics, Inc. (1999), 2 pages.
DIRECTV Receiver—Owner's Manual, Samsung, DIRECTV, Inc. (2002).
DIRECTV Receiver with TiVo Digital Satellite Receiver/Recorder SAT-T60—Installation Guide, Sony Electronics Inc. (2000).
DIRECTV Receiver with TiVo Installation Guide, Philips, TiVo Inc. (2000).
DIRECTV Receiver with TiVo Viewer's Guide, TiVo Inc., Sony Corp. (1999, 2000).
Daily, Mack, "Addressable Decoder with Downloadable Operation," Proceedings from the Eleven Technical Sessions, 42nd Annual Convention and Exposition of the NCTA, Jun. 6-9, 1993, pp. 82-89.
Damouny, "Teletext Decoders-Keeping Up With the Latest Advances," IEEE Transactions on Consumer Electronics, vol. CE-30, No. 3, Aug. 1984, pp. 429-435.
Das, D. and ter Horst, H., Recommender Systems for TV, Technical Report WS-98-08—Papers from the AAAI Workshop, Madison, WI (1998), 2 pages.
Davis, TV Guide on Screen, "Violence on Television", House of Representatives, Committee on Energy and Commerce, Subcommittee on Telecommunications and Finance, pp. 93-163, Jun. 25, 1993.
Day, "The Great PC/TV Debate," OEM Magazine, Jul. 1, 1996, 6 pages.
Dec., Presenting JAVA, "Understanding the Potential of Java and the Web", pp. 1-208, © 1995 by Sams.net Publishing.
Declaration Under 37 C.F.R. § 1.132 of Richard E. Glassberg, signed Oct. 20, 2006, filed Oct. 24, 2006, from U.S. Appl. No. 10/346,266, 5 pages.
DiRosa, S. "BIGSURF Netguide", Jul. 1995, vol. 3.1 (Sections 18,21, and 28—renumbered as pp. 1-27).
Dial M for Movie, Funkschau Nov. 1994 Perspektiven, Video on Demand, vol. Nov. 1994, pp. 78-79. (English language translation attached).
Dialing the printed page, ITT in Europe Profile, 11/Spring 1977, 2 pages.
Digital TV—at a price, New Scientist, Sep. 15, 1983, vol. 99. No. 1375, p. 770.
Digital Video Video Broadcasting (DVB); DVB specification for data broadcasting, European Telecommunication Standards Institute, Draft EN 301 192 V1.2.1 (Jan. 1999).
Dinwiddle et al., "Combined-User Interface for Computers, Televison, Video Recorders, and Telephone, etc." IBM Technical Disclosure Bulletin, vol. 33(36), pp. 116-118 (1990).
DishPro Satellite System—User's Guide, Dish Network (Sep. 1, 2001).
Does NBC Get It, Aug. 14, 1995, retrieved from the internet at http://www.open4success.org/db/bin19/019687.html, retrieved on Dec. 11, 2013, 1 page.
Dr. Dobb's, "Implementing a Web Shopping Cart," from the internet at https://www.drdobbs.com/article/print?articleId=184409959&siteSect . . . , Sep. 1, 1996, printed from the internet on Sep. 13, 2012, 15 pages.
Draft Grounds of Invalidity for EP (UK) 0 880 856 (Trial B), No. HC11 C 04556, between Starsight Telecast and United Video Properties (Claimants) and Virgin Media, Virgin Media Payments, and TiVo (Defendants), 7 pgs., Oct. 2013.
Duck Tales, (1987)[TV Series 1987-1990], Internet Movie Database (IMDB) [Retrieved on Apr. 7, 2007], 5 pages.
Eckhoff, "TV Listing Star on the Computer", Central Penn Business Journal/High Beam Research, pp. 1-4, Mar. 15, 1996.
Edwardson, "CEEFAX: A Proposed New Broadcasting Service," Journal of the SMPTE, Jan. 1974, vol. 83 No. 1, pp. 14-19.
Ehrmantraut et al., "The Personal Electronic Program Guide—Towards the Pre-Selection of Individual TV Programs," CIKM 96, Rockville, MD., Dec. 31, 1996, pp. 243-250.
Eitz et al., "Videotext Programmiert Videoheimgerate," Rundfunktech Mitteilungen, Jahrg. 30, H.5, 1986, S. 223 bis 229 (English translation attached).
Eitz, Gerhard, "Zukünftige Informations-und Datenangebote beim digitalen Femsehen-EPG Und 'Lesezeichen'," RTM Rundfunktechnische Mitteilungen, Jun. 1997, vol. 41, pp. 67-72.
Electronic Program Guide via Internet, Research Disclosure, Kenneth Mason Publications, Hampshire, GB vol. 385(2) (May 1996) p. 276, ISSN:0374-4353.
Email from Iain Lea to Kent Landfield, comp.sources.misc, vol. 29, Issue 19 (Mar. 27, 1992, 03:28:12 GMT), available at https://groups.google.com/group/comp.sources.misc/msg/2e79d4c058a8a4fe?dmode=source&output=gplain&noredirect&pli=1.
Enhanced Content Specification, ATVEF, from the internet at http://www.atvetcomilibraryispec.html, printed Aug. 22, 2001, the document bears a Copyright date of 1998, 1999, 2000, 41 pages.
Ernst & Young "On track: A primer on media asset identification" May 2011 ,retrieved from the internet May 29, 2014. URL http://www.ey.com/Publication/vwLUAssets/Media_asset_identification_primer/$FILE/Media_Entertainment.pdf.
European Search Report dated Nov. 19, 2002 from European Application No. 989446111.7, 3 pages.
European Search Report dated Oct. 24, 2006 from European Application No. 06076553, 7 pages.
European Telecommunication Standard, "Electronic Programme Guide (EPG); Protocol for a TV Guide using electronic data transmission," 89 pages, sections 1-11.12.7 and annex A-P, bearing a date of May 1997.

(56) References Cited

OTHER PUBLICATIONS

European Telecommunications Standards: Digital Broadcasting Systems for Television Sound and Data Services; Specification for Service Information (SI) in Digital Video Broadcasting (DVB) Systems, European Telecommunications Standards Institute, Dec. 1994, 64 pages.

Extended European Search Report for EP10183222 dated Jun. 20, 2011.

Fuller, C., Streaming gijutsu no genzai Web video system no gaiyou [Current Streaming Technology, Outline of Web Video System], UNIX Magazine, Japan, ASCII K.K., Mar. 1, 2000, vol. 15, No. 3, p. 65-72.

Facsimile Transmission, NHK Research Monthly Report, Dec. 1987(Unknown author).

Fall 2001 TiVo Service Update with Dual Tuner!, TiVo Inc. (2001).

Fry et al., "Delivering QoS Controlled Continuous Media on the World Wide Web," Proceedings of the 4th International IFIP Workshop on QoS, Paris, Mar. 6-8, 1996, 12 pages.

GameSpot's Downloads for Allied General, accessed from the internet at http://web.archive.org/web/19970205060703/http://www.gamespot.com/strategy/allie . . . , copyright 1997, printed on Sep. 19, 2013, 1 page.

Gateway Destination: The PC for the Office and the Family Room, PC Magazine, First Looks section, pp. 39-41, Jun. 11, 1996, 3 pages.

Gavron, Jacquelyn, Moran, Joseph, How to Use Microsoft Windows NT 4 Workstation, 1996, entire document, 5 pages.

Getting Started Installation Guide, Using StarSight 1 Manual, and Remote Control Quick Reference Guide, copywright 1994, 93 pages.

Growing US interest in the impact of viewdata, Computing Weekly, Jul. 20, 1978, 1 page.

Gutta, et al., "TV Content Recommender System", *Proceedings of the Seventeenth National Conference on Artificial Intelligence and Twelfth Conference on Innovative Applications of Artificial Intelligence*, (Jul. 30, 2000), 2 pages.

Hallenbeck, P., Developing an interactive television system that works, R&D Magazine, vol. 39:7, Jun. 1997, p. 54.

Hartwig et al. "Broadcasting and Processing of Program Guides for Digital TV," SMPTE Journal, pp. 727-732, Oct. 1997.

Hedger, "Telesoftware: Home Computing Via Broadcast Teletext," IEEE Transactions on Consumer Electronics, vol. CE-25, No. 3, Jul. 1979, pp. 279-287.

Hendrix, "A Natural Language Interface Facility", Artificial Intelligence Center, Stanford Research Institute, SIGART Newsletter, No. 61, Feb. 1977, 2 pages.

Hill, et al., "Recommending and Evaluating Choices in a Virtual Community of Use" CHI '95 Mosaic of Creativity, pp. 194-201 (1995).

Hiroshi Ishii et al, "Clearface: Translucent Multiuser Interface for TeamWorkStation," *ECSCW*, Sep. 1991, pp. 6-10.

Hiroshi Ishii et al, "Toward an Open Shared Workspace: Computer and Video Fusion Approach of Team Workstation," *Communications of the ACM*, Dec. 1991, vol. 34 No. 12, pp. 37-50.

Hirotada Ueda et al, "Impact: An Interactive Natural-Motion-Picture Dedicated Multi-Media Authoring System," Communications of the ACM, Mar. 1991, pp. 343-350.

Hitachi Consumer Electronics Co., Ltd., Certification of market introduction in 1993 of Hitachi Projection TV Model 55EX7K, Dec. 17, 2012, 1 page.

Hitachi Projection Color TV Operating Guide, for Models 55EX7K, 50EX6K, 50ES1B/K, and 46EX3B/4K, 38 pages, undated.

Hitachi Service Manual, No. 0021, Projection Color Television, Models 55EX7K, 50EX6K, 50ES1B/K, 46EX3B/4K, and 46EX3BS/4KS, Aug. 1993, 1 page.

Hoarty, "Multimedia on Cable Television Systems," Symposium Record Table TV Sessions, 18th International Television Symposium and Technical Exhibition, Montreux, Switzerland, Jun. 10, 1993, pp. 555-567.

Hobbes' Internet Timeline 10.2, by Robert H'obbes' Zakon, from the internet at http://www.zakon.org/robert/internet/timeline/, printed from the internet on Sep. 13, 2012, 29 pages.

Hofmann, Neumann, Oberlies & Schadwinkel, "Videotext Programmiert Videorecorder," Rundfunktechnischen Mitteilungen, (*Broadcast Engineering Reports*), vol. 26 No. 6, pp. 254-257, Nov.-Dec. 1982.

Holland, "NAPLPS standard defines graphics and text communications," EDN, Jan. 10, 1985, pp. 179-192.

IPG Attitude and Usage Study, prepared by Lieberman Research Worldwide for Gemstar—TV Guide International, Oct. 2002.

ITC Inv. No. 337-TA-845: Commission Opinion dated Dec. 11, 2013, 27 pages.

ITC Investigation of Certain Products Containing Interactive Program Guide and Parental Control TRechnology, Investigation No. 3376-TA-845, "Final Initial Determination" Jun. 7, 2013, 375 pages.

Imike, S., Interactive Video Management and Production, Educational Technology Publications, May 1991, http://www.amazon.com/Interactive-Video-Management-Production-Steven/dp/0877782334/ref=sr_1_1?ie=UTF8&qid=1416426739&sr=8-1&keywords=interactive+video+management+and+production&pebp=1416426742553, 2 pages.

Instruction Manual, "Using StarSight 2," StarSight Telecast, Inc., 1994, 27 pages.

Instructional Manual, "Sonic the Hed ehog," Sega of America, 1992, 11 pages.

Interactive Computer Conference Server, IBM Technical Bulletin, vol. 34, No. 7A, Dec. 1991, pp. 375-377.

Interface Device for Conventional TVs to Improve Functionality, IBM Technical Disclosure Bulletin, vol. 36, No. 7, Jul. 1993, pp. 53-54.

International Search Report for PCT/US95/11173 dated Dec. 14, 1995.

International Search Report for PCT/US99/04163 dated Jun. 23, 1999.

International Search Report for PCT/US99/08842 dated Jul. 7, 1999.

Internet User Forecast by Country, Computer Industry Almanac—Press Release, from the internet at http://www.c-i-a.com/internetusersexec.html, printed from the internet on Sep. 13, 2012, 3 pages.

Irven, "Multi-Media Information Services: A Laboratory Study," IEEE Communications Magazine, vol. 26, No. 6, Jun. 1988, pp. 27-33 and 36-44.

JVC Service Manual, 27" Color Monitor/Receiver, Model AV-2771S (U.S.), Jul. 1991, 89 pages.

James Sorce, David Fay, Brian Raila and Robert Virzi, Designing a Broadband Residential Entertainment Service: A Case Study, GTE Laboratories Incorporated, undated, pp. 141-148.

James, "Oracle—Broadcasting the Written Word," Wireless World, Jul. 1973, vol. 79 No. 1453, pp. 314-316.

Judice, "Move Over Cable, Here Comes Video Via Voice Lines," Network World, Sep. 1986, p. 26.

Kai et al., Development of a Simulation System for Integrated Services Television, Report from Information Processing Society of Japan, Japan, Sep. 13, 1996, vol. 96, No. 90 p. 13-20.

Karstad., "Microprocessor Control for Color-TV Receivers," IEEE Transactions on Consumer Electronics, vol. CE-26, May 1980, pp. 149-155.

Kojima, Akira et al., "Implementation Measures to Expand Metadata Application Services", http://www/ntt.co.jp/tr/0306/files/ntr200306051.pdf, (Jun. 2003), 6 pages.

Komarinski, Anonymous FTP p. 1, May 1, 1995 Linux Journal, 5 pages.

Kornhaas, "Von der Textprogrammierung uber TOP zum Archivsystem," Radio Fernsehen Elektronik, vol. 40, No. 8, Aug. 30, 1991, pp. 465-468, XP 000240875 Veb Verlag Technik. Berlin, DE ISSN: 1436-1574.

Large, "Throw away the books—Viewdata's coming," Guardian, Jan. 10, 1978, 1 page.

(56) References Cited

OTHER PUBLICATIONS

Large, "Viewdata, the invention that brings boundless advice and information to the home, also sets a test for the Post Office," Financial Guardian, Jun. 20, 1978, 3 pages.
Lee, Hee-Kyung et al., "Personalized Contents Guide and Browsing based on User Preference", http://vega.icu.ac.kr/~mccb-lab/publications/Paper/PersonalizedTV(2002).pdf, (2002), 10 pages.
Letter from StarSight Telecast, Inc. to a StarSight Ipg subscriber (with subscriber name, address and account number redacted) notifying the subscriber of termination of the StarSight IPG, 2003.
*Listing of computer code for Video HTU Program* (Plaintiff's Exhibit 299).
*Listing of computer code for operating system within the Cable Computer in 1985* (Plaintiff's Exhibit 298).
Lists> What's on Tonite! TV Listings (fwd), Internet article (On line), Jan. 28, 1995, XP 002378869 Retrieved from the Internet: URL: www.scout.wisc.edu/Projects/PastProjects/NH/95-01-31/0018.html> [Retrieved on Apr. 28, 2006]. The whole document, 4 pages.
Lloyd, "Impact of technology," Financial Times, Jul. 1978, 2 pages.
Lowenstein, R.L. and Aller, H.E., "The Inevitable March of Videotex," Technology Review, vol. 88, Oct. 1985, p. 22-29.
Lynch, Keith, timeline of net related terms and concepts, Mar. 22, 2007, 8 pages.
M/A-COM, Inc., "*Videocipher II Satellite Descrambler Owner's Manual*," dated Prior Feb. 1986, pp. 1-17.
MSI Datacasting Systems, TV Communications Journal, Jan. 1973, 2 pages.
Make Room for POP, Popular Science, Jun. 1993, p. 4.
Mannes, "List-Mania, On-Screen, interactive TV guides that can program your VCR are just around the corner," Video Review, May 1992, pp. 34-36.
Mannes, "Smart Screens: Development of Personal Navigation Systems for TV Viewers," Video Magazine, Dec. 1993, 6 pages.
Mar. 19, 1985 letter from G. Knapp of CableData to R. Hansen of Weststar Communications, Inc. (Plaintiffs Exhibit 325).
Markowitz, A. "Companies Jump on Interactive Bandwagon," Discount Store News, Dec. 6, 1993, pp. 4 and 131.
McKenzie, G.A., "Oracle—An Information Broadcasting Service Using Data Transmission in the Vertical Interval," *Journal of the SMPTE*, Jan. 1974, vol. 83 No. 1, pp. 6-10.
Merrell, R.G., "Tac Timer," 1986 NCTA Technical Papers, pp. 203-206.
Miller, Matthew D., "A Scenario for the Deployment of Interactive Multimedia Cable Television Systems in the United States in the 1990's", Proceedings of the IEEE, vol. 82, pp. 585-589, Apr. 1994.
Minutes of Oral Proceeding in EP Application No. 04 075 205.7 dated Dec. 21, 2009.
Minutes of Oral Proceedings in EP Appeal No. T 1288/04 Held on May 3, 2004 for EP Application No. EP00200971.0, Applicant E-Guide, Inc.
Money, "Teletext and Viewdata," Butterworth & Co. Ltd., London, 1979, 159 pages.
Motohashi, Iizuka, Kuwana, Building Internet TV Guide Service 1 and 2, the 53rd National Conference Proceedings, Japan, Information Processing Society of Japan, Sep. 6, 1996, 5 pages [english translation].
Neumann, Andreas, "WDR Online Aufbau and Perspektiven Automatisierter Online Dienste im WDR," RTM Rundfunktechnische Mitteiluneen, vol. 41, Jun. 1997, pp. 56-66.
Nikkei Click, You can do it now with your existing computer, Nikkei Business Publications, Inc., 188 (No US Translation).
Oberlies, et al.; "VPS-Anzeige Und Uberwachungsgerat", Rundfunktechnische Mitteilungen, vol. 30, No. 1 Jan. 1986-Feb. 1986, Norderstedt (DE).
Open TV Launches OpenStreamer TM Technology for Broadcasters to Deliver First Ever Real-Time Digital Interactive Television, from the internet at http://www.opentv.corn/news/openstreamer_press_final.htm, printed on Jun. 28, 1999, the document bears a copyright date of 1999, 2 pages.

Open TV fur interaktives Fernsehen, Trend and Technik, 9-95 RFE, retrieved from the internet Sep. 2, 2006, 4 pages (English language translation attached).
Owen, "How dial-a-fact is coming closer to home," The Times, Sep. 30, 1977, 2 pages.
Owen, "Why the Post Office is so excited by its plans for a TV screen information service," The Times, Sep. 26, 1976, 2 pages.
PTV Recorder Setup Guide, Philips Electronics, TiVo Inc. (2000).
Panasonic TX-33A1G Operating Instructions (undated).
Partial European Search Report dated Feb. 22, 2010 from corresponding European Application No. EP 03 01 3370.
Patent Abstracts of Japan vol. 017, No. 494, Sep. 7, 1993 and JP 05 122692 A (Pioneer Electron Corp), May 18, 1993.
Patent Abstracts of Japan vol. 098, No. 001, Jan. 30, 1998 and JP 09 247565 A (Sony Corp), Sep. 19, 1997.
Pazzani et al., "Learning and Revising User Profiles: The Identification of Interesting Web Sites," 27 Machine Learning, pp. 313-331 (1997).
Peddicord, "New on TV: You Bet Your Horse," The Sun, Baltimore Maryland, Dec. 15, 1994, 1 page.
Pfister, Larry T., "Teletext: Its Time Has Come," Prepared for the IGC Videotext / Teletext Conference, Andover, Massachusetts, Dec. 14, 1982, pp. 1-11.
Philips TV Set, model No. 25 PT 910A, User Manual; 40 pages (undated).
Poole, "Demand for Viewdata grows," Sunday Times, Feb. 10, 1977, 3 pages.
Postel, J., Reynolds, J., Request for Comments: 959 File Transfer Protocol, Oct. 1985, 70 pages.
Prevue Guide Brochure, Spring 1984, 1 page.
Prevue Guide Brochure, Spring 1994, 22 pages.
Prevue Networks and OpenTV(R) Agree to Work Together on Deploying Interactive Program Guides Worldwide, from the internet at http://www.opentv.com/news/prevuefinal.htm, printed on Jun. 28, 1999, 2 pages.
Prevue Networks, Inc. Promotional Materials (undated).
Probe XL Brochure, Auto Tote Systems Inc., (Newark, Delaware) (undated) 59 pages.
Product Comparison—Group messaging software: Having the last word, InfoWorld, Nov. 6, 1995.
Qayyum, "Using IVDS and VBI for Interactive Television," IEEE, Jun. 10, 1996, 11 pages.
RCA Satellite Receiver User's Guide, Thomson Multimedia Inc. (2001).
Ramachandran, "Space-Time Memory: a parallel programming abstraction for interactive multimedia applications, SIGPLAN Notices", vol. 34:8 (Aug. 1999), pp. 183-192.
Raskutti et al., "A Feature-based Approach to Recommending Selections based on Past Preferences" 7 User Modeling and User-Adapted Interaction, pp. 179-218 (1997).
Rath et al., "Set-Top Box Control Software: A Key Component in Digital Video," Philips Journal of Research, vol. 50, No. 1/2 1996, pp. 185-189.
Rayers, D.J., "Telesoftware by Teletext," *1984 IEEE Conference Papers*, vol. 240, p. 323.
Revolution on the Screen, 2nd Ed. Verlag, Wilhelm Goldmann. 1979 (English Translation).
Rewind, reply and unwind with new high-tech TV devices, by Lawrence J. Magid, LA Times. This document was printed from the Internet on Jun. 6, 1999 and bears a date of May 19, 1999.
Robertson, "Reaching Through Technology," CHI '91 Conference Proceedings, Apr. 27-May 2, 1991, 15 pages.
Rogers, "Telcos vs. Cable TV : The Global View With Markets Converging and Regulatory Barriers Falling, Service Carriers Are Ready to Rumble," Data Communications, Sep. 21, 1995, vol. 24, No. 13, pp. 75-76, 78, 80, XP000526196.
Roizen, Joseph "Teletext in the USA," *Society of Motion Picture and Television Engineers Journal*, Jul. 1981, pp. 602-610.
Rosch, "New data and information system set for commercial market trial," Telephony, Mar. 20, 1978, pp. 98-102.
*Roseville City Council Presentation*, Mar. 13, 1985 (Defendant's Exhibit 226).

(56) References Cited

OTHER PUBLICATIONS

Ryan, "Interactive TV Takes a Corporte Twist," Electronic Engineering Times, Jul. 10, 1995, 3 pages.
Sato, T. et al., WWW jou no eizou browsing kikou no teian to Jitsugen [A Proposal for a Video Browsing Mechanism on World Wide Web and its Implementation], Japan Society for Software Science and Technology, collection of 14th convention articles, Japan, Japan Society for Software Science and Technology, Sep. 30, 1997, p. 193-196.
SONICblue Incorporated: ReplayTV 4000 User Guide 12.17, Chapter Five: Networking, Sep. 10, 2001, retrieved from the internet: http://www.digitalnetworksna.com/support/replayTV/downloads/ReplayTV4000UserGuide.12.17.pdf.
STORit, Report on the IBC'99 Demonstration, Deliverable #8 AC312/phi/prl/dslp/008b1 Oct. 1999.
Saito, Takeshi, et al., "Homenetwork Architecture Considering Digital Home Appliance," Technical Committee meeting of the Institute of Electronics, Information and Communication Engineers (IEICE), Japan, Nov. 6, 1997, vol. 97, No. 368, p. 57-64.
Sandringham, "Dress rehearsal for the PRESTEL show," New Scientist, Jun. 1, 1978, 9 pages.
Savage, "Internet's 'What's on Tonite!' Tells You Just That and More," The News, InfoWatch, May 29, 1995, 1 page.
Schauer, Tom, No subject, (tschauer@moscow.com) Thu, Sep. 28, 1995 16:46:48-700, XP-002378870 [Retrieved from the Internet Apr. 28, 2006].
Schlender, B.R., "Couch Potatoes! Now It's Smart TV," *Fortune*, Nov. 20, 1989, pp. 111-116.
Schmuckler, Eric "A marriage that's made in cyberspace (television networks pursue links with online information services)," May 16, 1994 MEDIAWEEK, vol. 4, No. 20, 5 pages.
Sealfon, Peggy, "High Tech TV," Photographic, Dec. 1984 2 pages.
Selected pages from the "BBC Online—Schedules" web page. This web page is located at http://www.bbc.co.uk/schedules/ (as printed from the Internet on Oct. 19, 1999 and being dated as early as May 24, 1997, 6 pages.
Sharpless et al., "An advanced home terminal for interactive data communication," Conf. Rec. Int. Conf. Commun. ICC '77, IEEE, Jun. 12-15, 1977, 6 pages.
Soin et al., "Analogue-Digital ASICs", Peter Peregrinus Limited, 1991, p. 239.
Split Personality, Popular Science, Jul. 1993, p. 52.
StarSight CB 1500 Customer Letter, 1994, 27 pages.
StarSight Operating Guide and Quick Reference, 19 sheets (undated).
StarSight Telecast, StarSight introduces TVGuide-like programmer for homes, 1994, 1 page.
Start Here, Sony, TiVo and DIRECTV (undated).
Statement in an Examination Report dated Aug. 2, 1999 for a counterpart foreign application filed in New Zealand in which the foreign Examiner alleges that he has used "the Internet to access television listings for BBC World television as far back as mid 1996 . . . ", 2 pages.
Stickland, D.C., "It's a common noun," The Economist, Jun. 5, 1978, 1 pages.
Stokes, "The viewdata age: Power to the People," Computing Weekly, Jan. 1979, 2 pages.
Sunada, et al, "Teletext Color Television Receiver Model C-29M950, C26M940," NEC Home Electronics, NEC Giho, 1987, 16 pages.
Super-TVs, Popular Science, Jul. 1985, p. 64.
SuperGuide on Screen Satellite Program Guide, User's Guide, Owner's Manual, and sales literature, 74 sheets (undated).
Supplementary European Search Report for Application No. EP 98 93 5889, completed on Sep. 28, 2001, 3 pages.
Sussman, "GTE Tunes in to Home TV Shopping," PC Week, vol. 5(26), Jun. 28, 1988, 2 pages.
Symposium Record Cable Sesssions, "Digital On-Screen Display of a New Technology for the Consumer Interface," Publication Date May 1993.
TV Guide movie database Internet web pages printed on Aug. 12, 1999. 9 pages.
TV Guide on Screen prior Use Transcript of Proceedings—"Violence on Television," House of Representatives, Committee on Energy and Commerce, Subcommittee on Telecommunications and Finance, Jun. 25, 1993, 36 pages.
TV Listings Functional Spec., Time Video Information Services, Inc., 11 pages, undated.
Tech Notes: Product Updates from M/A-COM Cable Home Group, "Videocipher Owners Manual Update," Issue No. 6, Feb. 1986, 19 pages.
Technical White Paper, "Open TV™ Operating Environment," (© 1998 OpenTV Inc.), pp. 1-12.
Technological Examination & Basic Investigative Research Report on Image Databases, Japan Mechanical Engineering Organization Int'l Society for the Advancement of Image Software, Japan, Mar. 1988, 127 pages.
Technology Overview for TV Guide on Screen Information Sheets, 8 Sheets (undated).
Technology: Turn on, tune in and print out—An experimental interactive television service is set to alter our viewing habits, Financial Times (London), Oct. 14, 1993, p. 11.
Teletext presents the alternative view, Financial Times, Oct. 24, 1977, 2 pages.
The Columbia House Video Club: Download Software, accessed from the internet at http://web.archive.org/web/19961223163101/http://www.columbiahouse.com/repl/vc . . ., copyright 1996, printed on Sep. 19, 2013, p. 1.
The New Media and Broadcast Policy: An Investigation & Research Conference Report on Broadcasting Diversification, Radio Regulatory Bureau, Japan Ministry of Posts & Telecommunications, Mar. 1982, 114 pages.
The television program guide website of Gist Communications, Inc. of New York, New York. This website is located at www.gist.com (as printed from the Internet on Aug. 14, 1997), 272 pages.
The television program guide website of TV Guide Entertainment Network. This website is located at www.tvguide.com (as printed from the Internet on Aug. 13-18, 1997) pp. 139.
Thomas, "Electronic Program Guide Applications—The Basics of System Design," NCTA Technical Papers, 1994, pp. 15-20.
Three men on a Viewdata bike, The Economist, Mar. 25, 1978, pp. 1-2.
Today's Stop: What's on Tonite, Oct. 3, 1995, retrieved from the internet at http://internettourbus.com/arch/1995/TB100395.TXT, 3 pages.
Tol, et al., "Requirements and Scenarios for the Bi-directional Transport of Metadata", TV Anytime Meeting, Version 1.0, Document TV150 (Aug. 2, 2002), 7 pages.
Transcript of the Deposition of John Roop, Jun. 2001, p. 608.
*Transcript of the Deposition of John Roop*, Oct. 1996, pp. 186-187.
Transcript of the testimony of Brian Klosterman, May 1997, pp. 1700-1981.
Transcript of the testimony of Michael Faber and Larry Wangberg, May 1996, pp. 554-743.
Trial testimony of Michael Axford, *Prevue Interactive, Inc. and United Video Satellite Group, Inc. v. StarSight Telecast, Inc.*, May 9, 1998, pp. 186-187, 295-315, and 352-357.
U.S. Appl. No. 10/453,388, Office Action dated Sep. 8, 2006.
UVSG Offers System-Specific Web Site Development for OPS, press release of United Video Satellite Group, Apr. 12, 1996, 2 pages.
UVSG Teams With Microsoft on Internet Information Server, press release of United Video Satellite Group, Feb. 22, 1996, 2 pages.
Ueda, Hirotada et al, "Impact: An Interactive Natural-Motion-Picture Dedicated Multi-Media Authoring System," Communications of the ACM, Mar. 1991, pp. 343-350.
Uniden, UST-4800 Super Integrated Receiver/Descrambler, Preliminary Reference Manual, 80 pages, Nov. 12, 1991.
Uniden, UST-4800, Integrated Receiver/Descrambler, Installation Guide, 60 pages, © 1990, Uniden America Corporation.
Uniden, UST-4800, Integrated Receiver/Descrambler, Operating Guide, 24 pages, © 1990, Uniden America Corporation.
User's Guide RCA Color TV with TV Plus + Guide, Thomson Consumer Electronics(1997).
Various publications of Insight Telecast, 1992 and 1993, 10 pages.

(56) References Cited

OTHER PUBLICATIONS

Veith, R.H., "Television's Teletext," Elsevier Science Publishing Co., Inc, 1983, pp. 13-20, 41-51.
Video Plus, Billboard, vol. 98, No. 4, Jan. 25, 1986, p. 25.
VideoGuide User's Manual, 14 sheets (undated).
VideoGuide, "VideoGuide User's Manual," pp. 1-28 (p. 11 is the most relevant).
Videocipher Stipulation, May 1996, 5 pages.
Viewdata and its potential impact in the USA: Final ReportNolume One, The UK Experience, Link and Butler Cox & Partners Limited, Oct. 1978, 129 pages.
Viewdata moves in US but GEC may lose out, Computing Weekly, Jan. 25, 1978, 1 page.
Vision/1 from Tecmar, IBM transforms PS/1 into a TV, Info World, vol. 14(9), Mar. 2, 1992, p. 34.
Web TV and Its Consumer Electronics Licenses debut First Internet Television Network and Set Top Box XP 002113265 Retrieved from the Internet: <URL http://www.webtv.net/company/news/archive/License.html> Jul. 10, 1996, 6 pages [retrieved on Dec. 1, 2005].
Welcome to Columbia House Online, accessed from the internet at http://web.archive.org/web/19961221085121/http://www.columbiahouse.com/, copyright 1996, printed on Sep. 19, 2013, 1 page.
Whitehorn, "Viewdata and you," Observer, Jul. 30, 1978, 1 page.
Wikipedia article on CompuServe, Mar. 22, 2007, 7 pages.
Wikipedia article, "Geschichte des Internets," from the internet at http://de.wikipedia.org/wiki/Geschichte_des_Internets, page last modified on Apr. 28, 2012, printed from the internet on May 18, 2012, 17 pages (Concise explanation included in IDS letter).
Wikipedia article, "Internet Explorer," from the internet at http://de.wikipedia.org/wiki/Internet_Explorer, page last modified on Sep. 9, 2012, printed from the internet on Sep. 13, 2012, 14 pages (Concise explanation included in IDS letter).
Wikipedia article, "MSN TV," from the internet at http://en.wikipedia.org/wiki/MSN_TV, page last modified on May 15, 2012, printed from the internet on Sep. 13, 2012.
Wikipedia article, "NCSA Mosaic," from the internet at http://de.wikipedia.org/wiki/NCSA_Mosaic, page last modified on Sep. 3, 2012, printed from the internet on Sep. 13, 2012, 2 pages (Concise explanation included in IDS letter).
Wikipedia-Teletext Excerpt (English Translation), printed from the internet Jul. 1, 2013, 18 pages.
Windows 98 Feature Combines TV, Terminal and the Internet, *New York Times*, Aug. 18, 1998.
Winkler, M., "Computer Cinema: Computer and video: from TV converter to TV studio," Computerkino, (translation) Exhibit NK 13 of TechniSat's nullity action against EP'111, Issue 10, pp. 100-107 (1992).
Wittig et al, "Intelligent Media Agents in Interactive Television Systems," Proceedings of the International Conference on Multimedia Computing and Systems, Los Alamitos, CA, US, May 1518, 1995, p. 182-189, XP 000603484.
Yoshida, "Interactive TV a Blur," Electronic Engineering Times, Jan. 30, 1995, 2 pages.

\* cited by examiner

METHODS AND SYSTEMS FOR SELECTING AND PRESENTING CONTENT ON A FIRST SYSTEM BASED ON USER PREFERENCES LEARNED ON A SECOND SYSTEM

CROSS-REFERENCE TO RELATED APPLICATIONS

This application is a continuation of U.S. patent application Ser. No. 13/959,289 entitled Methods and Systems For Selecting and Presenting Content On A First System Based On User Preferences Learned On A Second System, filed Aug. 5, 2013, now U.S. Pat. No. 8,825,576, which is a continuation of U.S. patent application Ser. No. 13/021,086, entitled Methods and Systems For Selecting and Presenting Content On A First System Based On User Preferences Learned On A Second System, filed Feb. 4, 2011, now U.S. Pat. No. 8,543,516, which is a continuation of U.S. patent application Ser. No. 12/882,451, entitled Methods and Systems For Selecting and Presenting Content On A First System Based On User Preferences Learned On A Second System, filed Sep. 15, 2010, now U.S. Pat. No. 7,885,904, which is a continuation of U.S. patent application Ser. No. 11/682,588, entitled Methods and Systems For Selecting and Presenting Content On A First System Based On User Preferences Learned On A Second System, filed Mar. 6, 2007, now U.S. Pat. No. 7,835,998, which claims the benefit of the following applications:

U.S. Provisional Application No. 60/779,547, entitled A Framework for Learning User Behavior With Stochastic Signatures, filed Mar. 6, 2006;

U.S. Provisional Application No. 60/784,027, entitled A System And Method For Service Solicitation Enhanced With Relevant Personal Context to Elicit Targeted Response, filed Mar. 20, 2006;

U.S. Provisional Application No. 60/796,614, entitled A Learning Model For Multiple Dataspaces With Applications To Mobile Environment, filed May 1, 2006; and U.S. Provisional Application No. 60/834,966, entitled Seminormalization Of Signatures For Reducing Truncation Errors And Stabilizing Relevance Promotion, filed Aug. 2, 2006, the contents of each of the above applications are incorporated by reference herein.

This application is related to the following applications, filed on Mar. 6, 2007:

U.S. patent application Ser. No. 11/682,693, entitled Methods and Systems For Selecting and Presenting Content Based On Learned Periodicity Of User Content Selection, now U.S. Pat. No. 7,774,294;

U.S. patent application Ser. No. 11/682,700, entitled Methods and Systems For Selecting and Presenting Content Based On Dynamically Identifying Microgenres Associated With The Content, now U.S. Pat. No. 7,774,341;

U.S. patent application Ser. No. 11/682,689, entitled Methods and Systems For Selecting and Presenting Content Based On Activity Level Spikes Associated With The Content, now U.S. Pat. No. 7,657,526;

U.S. patent application Ser. No. 11/682,695, entitled Methods and Systems For Selecting and Presenting Content Based On User Preference Information Extracted From An Aggregate Preference Signature, now U.S. Pat. No. 7,739,280;

U.S. patent application Ser. No. 11/682,533, entitled Methods and Systems For Selecting and Presenting Content Based On A Comparison Of Preference Signatures From Multiple Users, now U.S. Pat. No. 8,380,726;

U.S. patent application Ser. No. 11/682,596, entitled Methods and Systems For Segmenting Relative User Preferences Into Fine-Grain and Coarse-Grain Collections, now U.S. Pat. No. 7,529,741; and U.S. patent application Ser. No. 11/682,599, entitled Methods and Systems For Selecting and Presenting Content Based On Context Sensitive User Preferences, now U.S. Pat. No. 7,792,815.

BACKGROUND OF THE INVENTION

1. Field of Invention

This invention generally relates to learning user preferences and, more specifically, to using those preferences to personalize the user's interaction with various service providers and interactions with content query systems, e.g., to better find results to queries provided by the user and to ordering the results for presentation to the user.

2. Description of Related Art

Personalization strategies to improve user experience can be chronologically classified into two categories: (1) collaborative filtering and (2) content reordering. Each is summarized in turn.

Collaborative Filtering was used in the late 1990s to generate recommendations for users. The term collaborative filtering refers to clustering users with similar interests and offering recommendations to users in the cluster based on the habits of the other users. Two distinct filtering techniques—user based and item based—are used in filtering.

In U.S. Patent App. Pub. No. U.S. 2005/0240580, Zamir et al. describe a personalization approach for reordering search queries based on the user's preferences. The application describes a technique for learning the user's preferences and increasing the promotion level of a search result based on personalization. Zamir et al. create a user profile, which is a list of keywords and categories listing the user preferences. The profile is generated from multiple sources, such as (1) information provided by the user at the time the user registers a login, (2) information from queries that the user has submitted in the past, and (3) information from web pages the user has selected.

Some systems directed to reordering content in the context of television schedules define categories and sub-categories according to an accepted standard. User preferences are gathered using various models such as (1) user input, (2) stereotypical user models, and (3) unobtrusive observation of user viewing habits. In some implementations, these models operate in parallel and collect the user preference information.

In other systems, a set of fixed attributes is defined and all media content and all user preferences are classified using these attributes. A vector of attribute weights captures the media content and the user preferences. The systems then determine the vector product between the content vector and the user preferences vector. The system suggests content to users where the values of the vector products exceed a predetermined threshold.

BRIEF SUMMARY OF THE DISCLOSURE

The invention provides methods and systems for selecting and presenting content on a first system based on user preferences learned on a second system.

Under an aspect of the invention, a user-interface method of selecting and presenting a collection of content items of a first content system in which the presentation is ordered at least in part based on content preferences of the user learned from the user selecting content of a second content system includes receiving incremental input entered by the user for incrementally identifying desired content items of the second content system, wherein each content item has at least one associated descriptive term to describe the content item. The method also includes, in response to the incremental input entered by the user, presenting a subset of content items of the second content system and receiving selection actions of content items of the subset from the user. The method further includes analyzing the descriptive terms of the selected content items to learn the content preferences of the user for the content of the second content system and determining a relationship between the content items of the first content system and the content items of the second content system. The relationship defines which learned user content preferences are relevant to the content items of the first content system. The method includes, in response to receiving subsequent incremental input entered by the user for incrementally identifying desired content items of the first content system, selecting and ordering a collection of content items of the first content system based on the learned content preferences of the user determined to be relevant to the content items of the first content system.

Under another aspect of the invention, the relationship between the content items of the first content system and the content items of the second content system is determined prior to at least one of receiving selection actions from the user and receiving subsequent incremental input entered by the user.

Under a further aspect of the invention, subsequent incremental input entered by the user is the first interaction between the user and the first content system. Under yet another aspect of the invention, the first content system has not characterized the content preferences of the user.

Under an aspect of the invention, the method also includes recording information associated with at least one of the selection actions from the user and
including the information in the collection of content items.

Under a yet further aspect of the invention, the first content system and second content system are different systems. The first content system can be on a server system remote from the user and the second content system can be on a user client device. The second content system can be on a server system remote from the user and the first content system can be on a user client device.

Under an aspect of the invention, a user-interface method of selecting and presenting to a first user a collection of content items of a first content system in which the presentation is ordered at least in part based on content preferences of a second user learned from the second user selecting content of a second content system includes receiving incremental input entered by the second user for incrementally identifying desired content items of the second content system, wherein each content item has at least one associated descriptive term to describe the content item. The method also includes, in response to the incremental input entered by the second user, presenting a subset of content items of the second content system and receiving selection actions of content items of the subset from the second user. The method further includes analyzing the descriptive terms of the selected content items to learn the content preferences of the second user for the content of the second content system. The method includes determining a relationship between the content items of the first content system and the content items of the second content system. The relationship defines which learned user content preferences are relevant to the content items of the first content system. The method further includes, in response to receiving subsequent incremental input entered by the first user for incrementally identifying desired content items of the first content system, selecting and ordering a collection of content items of the first content system based on the learned content preferences of the second user determined to be relevant to the content items of the first content system.

Under another aspect of the invention, the relationship between the content items of the first content system and the content items of the second content system is determined prior to at least one of receiving selection actions from the user and receiving subsequent incremental input entered by the user.

Under a further aspect of the invention, subsequent incremental input entered by the first user is the first interaction between the first user and the first content system.

Under a yet further aspect of the invention, the first content system and second content system are the same systems.

Under yet another aspect of the invention, the selecting and ordering the collection of content items is further based on popularity values associated with the content items. Each popularity value indicates a relative measure of a likelihood that the corresponding content item is desired by the user.

Under a further aspect of the invention, the set of content items includes at least one of television program items, movie items, audio/video media items, music items, contact information items, personal schedule items, web content items, and purchasable product items. The descriptive terms can include at least one of title, cast, director, content description, and keywords associated with the content.

Under yet a further aspect of the invention, the set of content items is contained on at least one of a cable television system, a video-on-demand system, an IPTV system, and a personal video recorder.

These and other features will become readily apparent from the following detailed description wherein embodiments of the invention are shown and described by way of illustration.

BRIEF DESCRIPTION OF THE SEVERAL VIEWS OF THE DRAWINGS

For a more complete understanding of various embodiments of the present invention, reference is now made to the following descriptions taken in connection with the accompanying drawings in which.

DETAILED DESCRIPTION

Figure 1:
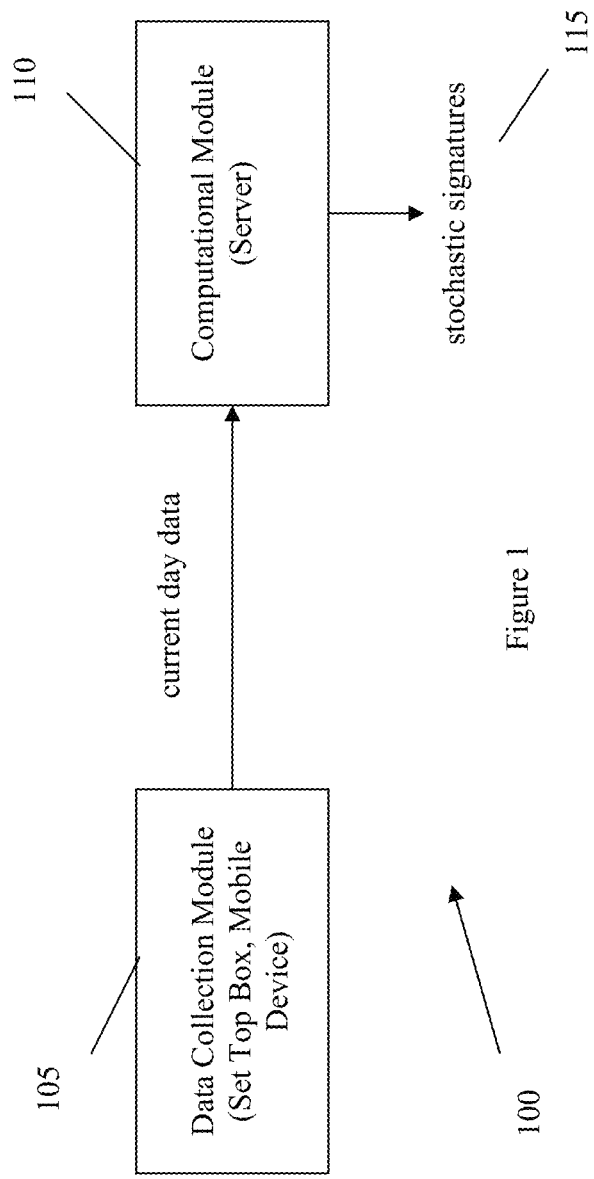
FIG. 1 illustrates two modules of a leaning engine.

Preferred embodiments of the invention capture user preferences for a single user or a family of users based on historical observations of the users' activities and by use of a statistical learning model (also referred to as a learning engine). In an illustrative embodiment, the users of the family are members of a household using a single interface device. The learning model identifies a signature, or set of signatures, for the entire household as a stochastic signature. This stochastic signature is used to predict future activities in which members of the family may engage. For the sake of simplicity, the description will refer to signatures and activities of a single user, when in fact, the same applies to a group of users using a single interface device.

One benefit of the learning engine is to enhance the user's experience by increasing the accuracy of the results of a user's query for content and organizing these results so as to put the most likely desired content items at the top of the results list. This increases the user's speed and efficiency in accessing the content he or she desires. In addition, the signatures can be used to identify clusters of users with similar interests for use with collaborative filtering techniques. The learning system can be one aspect of an overall system that provides content and selectable actions to the user, or the learning system can be a standalone system that monitors the user's actions across multiple systems and provides learned user preferences to external systems based on the context of the user's interaction with a particular external system.

Information Captured by Signatures

The stochastic signature is a probabilistic model, and it is an identity that can be used for validation, prediction, etc. While this type of signature can be used to identify a user according to his or her preference, it is distinguished from a unique signature that a user may employ to authenticate an item or guarantee the source of the item, for example. A stochastic signature may be created based on various types of activities, for example, watching television programs, dialing telephone numbers, listening to music, etc. Thus, embodiments of the invention are useful in a wide variety of contexts. In applications where there are multiple dataspaces to be searched, the system will use a collection of stochastic signatures related to that dataspace. For example, when searching a personal address book, calendar, or air-line schedules, the system can use the set of signatures related to that particular dataspace. In addition, the system can also learn correlated activities across dataspaces. This allows the system to learn how the user interacts with related dataspaces and use that learned behavior to personalize the presentation of content to the user. However, for the sake of simplicity, certain embodiments of the invention will be described with reference to a single dataspace interface, e.g., a television system interface.

In the context of a user device with limited input capability, for example, a television remote control, the stochastic signature is particularly useful because it can be difficult and/or time consuming to enter queries on such a limited input device. The stochastic signature increases the likelihood that the desired search results will be found based on limited query input. For example, if a particular household has generally watched a certain program at a given time in the past, stochastic signatures can be used to predict that the household will watch the program at the given time in the future. Thus, instead of requiring a member of the household to enter the title of the program, the learning system can predict that the member wishes to watch the program based on only a few button presses.

Embodiments of the present invention build on techniques, systems and methods disclosed in earlier filed applications, including but not limited to U.S. patent application Ser. No. 11/136,261, entitled Method and System For Performing Searches For Television Programming Using Reduced Text Input, filed on May 24, 2005, U.S. patent application Ser. No. 11/246,432, entitled Method And System For Incremental Search With Reduced Text Entry Where The Relevance Of Results Is A Dynamically Computed Function of User Input Search String Character Count, filed on Oct. 7, 2005, and U.S. patent application Ser. No. 11/235,928, entitled Method and System For Processing Ambiguous, Multiterm Search Queries, filed on Sep. 27, 2005, the contents of which are hereby incorporated by reference. Those applications taught specific ways to perform incremental searches using ambiguous text input and method of ordering the search results. The present techniques, however, are not limited to systems and methods disclosed in the incorporated patent applications. Thus, while reference to such systems and applications may be helpful, it is not believed necessary to understand the present embodiments or inventions.

FIG. 1 shows the architecture of an illustrative learning engine 100. There are two distinct modules to learning engine 100—a data collection module 105 and a signature computation module 110. Data collection module 105 monitors the user activity for channel tuning, DVR recording, etc. and captures the relevant statistics of the activity, for example, the duration a TV channel was watched, as well as the genres and microgenres (discussed below) of the program that was watched. In the case of a mobile device, additional information is collected, such as the type of dataspace being visited (e.g., phone book, calendar, and downloadable media content), geographic location of the mobile device, etc. Data collection module 105 can reside in a client device, where it gathers data about the users' activities and sends this data to signature computation module 110. In the alternative, data collection module 105 can reside on a remote server that serves content to the client device. In this case, the remote server collects data about the content requested by the users and passes this data to computation module 110.

As mentioned, the learning engine gathers information about channels, genres, and microgenres that the user has watched. Herein, the term "channel" refers to a tunable entity in a television system. A channel can be identified by its name (CBS, ABC, CNBC, etc.).

The term "genre" refers to the overall theme of an item. In some systems, every retrievable item is categorized into a genre. The collection of genres is system-definable, and can be as coarse or as fine-grained as necessary. In addition, the genres can be defined independent of the retrievable items and can be defined ahead of populating a content system with retrievable items. In one implementation, a function g(x) returns a subset of the set of genres for a given item. Thus, g(x) is a function with a domain space of a set of retrievable items and the range space of a set of all subsets of genres. This is so because any retrievable item may belong to more than one genre, e.g., a movie Sleepless in Seattle has a genre of movie and romance.

The term "microgenre" refers to a very refined, unambiguous theme of descriptor for a given item. For example, New England Patriots as a search item has a microgenre of NFL Football and genres of football and sports. As with genres, a search item can have multiple microgenres. While genres are "macro" themes, microgenres are "micro", unambiguous themes; these themes come from descriptive terms and metadata within the search items. Thus, the microgenres for New England Patriots also include Tom Brady. Microgenres are not limited to a set of predetermined descriptors, as are genres in the prior art, but can be any word that describes the item. Whether a particular theme is a genre or microgenre depends on the particular item with which the theme is associated and the configuration of the content system. Thus, microgenres are dynamic and generated "on-the-fly", while genres are static and system defined.

In dataspaces other than the television content space, the channel, genre, and microgenre approach to characterizing items is modified to reflect the attributes of the content items in that particular dataspace. Thus, for a telephone directory dataspace, the channel statistics are replaced with statistics related to the person or entity called. The genre statistics are replaced by statistics related to the type of entity called, for example, individual or business. While the microgenre statistics are replaced by statistics related to key secondary attributes of the item, such as home, office, and mobile telephone numbers as well as, for example, telephone numbers of persons related to the persons called.

Computational module 110 is sent the current day's data periodically and determines the users' signatures. In so doing, computational module 110 combines this current data with historical data using exponential smoothing or other smoothing techniques (discussed below) so that the signatures adapt over time to the users' changing preferences. Computational module 110 also performs other computations involving the signatures, for example, combining the individual signatures to obtain aggregate signatures that predict the viewing preferences of a large collection of individuals or creating signatures that capture the average activity level associated with a particular program (described in greater detail below). In one embodiment of the system, computational module 110 resides in one or more servers, to exploit the computational power of larger processors. However, in some implementations, e.g., where privacy is an issue, computational module 110 may reside in the client device.

A particular stochastic signature is a normalized vector of probabilities. The probabilities capture the historical patterns of the user's behavior with respect to a particular set of activities. An example of a signature for use with a television system is {(ABC 0.3), (CBS 0.2), (NBC 0.5)}. This signature captures that over a given time period, when the user was watching television, the user watched ABC 30% of the time, CBS 20% of the time, and NBC 50% of the time. The stochastic nature of the signature says that this is a historical average and not an exact number.

Because the system captures the user's behavior and preferences across multiple dataspaces, taking into account the geographic location of the user, or the user's client device, the multiple signatures can be represented as a set with three indices. Thus, the convention signature (t, g, s) represents a signature in geographic location g at time t for dataspace s. This allows the system to use difference subspace projections to utilize the information contained in the entire set. For example, the system may utilize the user's preferences based on activity across all geographic locations or based on a composite of multiple times for a given dataspace and given location. The composite signature is described in greater detail below.

Although time is obviously a continuous variable, for the purpose of learning the user's preferences and activities, a coarse, or discretized, view of time is used to capture all activity. Thus, the system divides time into discrete quantities and represents time as an integer from one to the number of discrete quantities in a day. For example, time can be divided into the number of minutes in a day, thereby representing time as a number 1 to 1440. In addition, this discrete representation of time can be further subdivided into time slots that encompass multiple minutes, as discussed below. The duration, and therefore the number, of time slots is selected based on the nature of the activity of the particular dataspace. For example, in the television dataspace it is appropriate to divide time into 30-minute time slots to correspond to the program boundaries. In other dataspaces, the coarseness can vary. Although it is not necessary to have the same time division in all dataspaces, the examples set forth below assume identical time slot durations for the sake of simplicity. Similarly, geographic location, though continuous, is discretized and represented by character strings. For example, the geographic location identifiers can be a postal code, a major metropolitan area, or an area of a given size with the latitude and longitude of its center being the location identifier.

Figure 2:
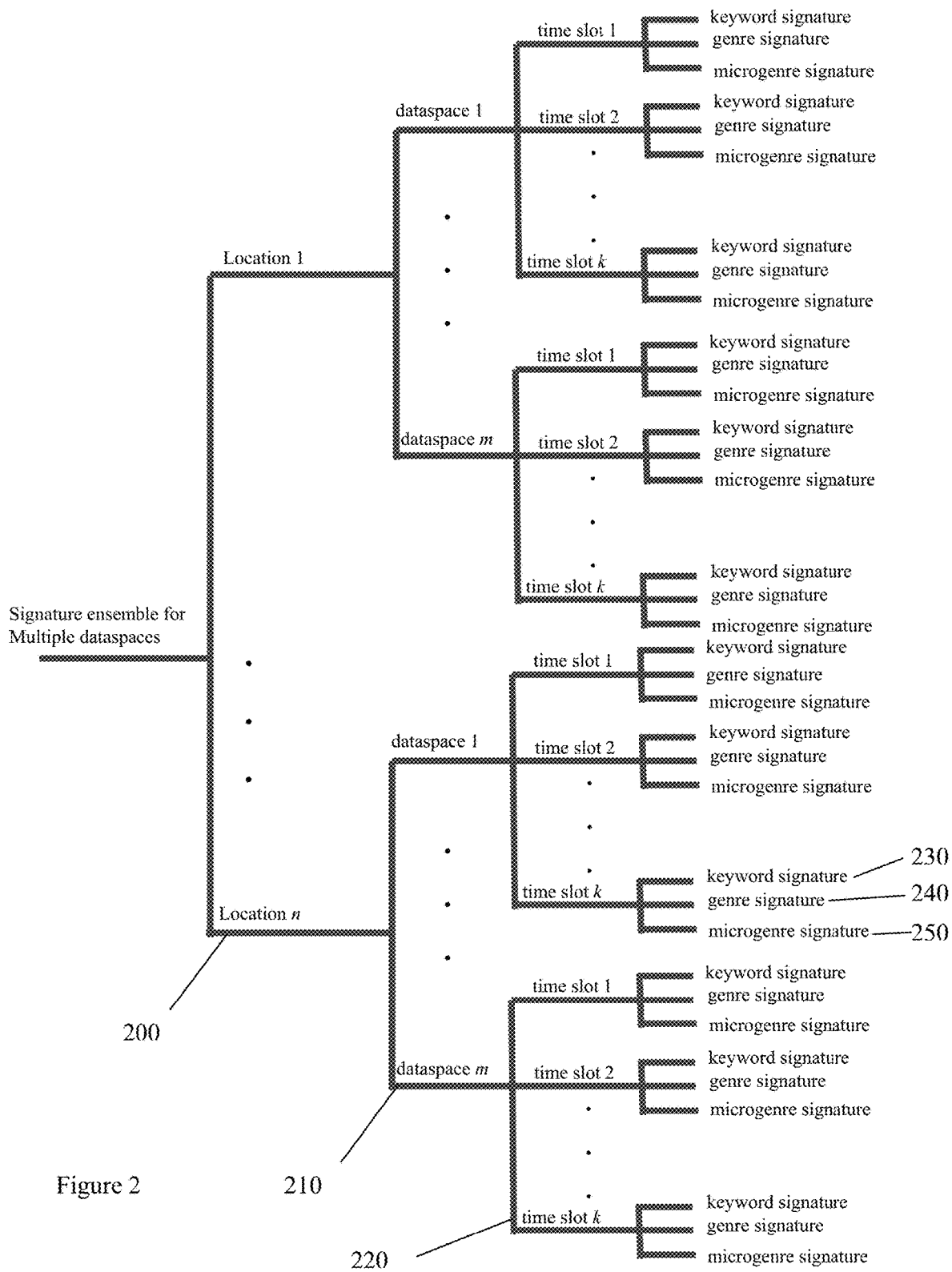
FIG. 2 illustrates a collections of signatures of a user.

There are many possible collections of signatures that capture the activities of the user or family of users at various levels of granularity. FIG. 2 shows a sample signature hierarchy for the multiple dataspace learning model, with n locations 200, m dataspaces 210, and k time slots 220. At the first level, the figure illustrates activities in each location 200. Within each location 200, the system captures dataspace-specific activities in individual signatures. Inside each dataspace 210, for each time slot 220, the system obtains a unique signature. Finally, the signature hierarchy captures the nature of the activity within the time slot by appropriate keyword 230, genre 240, and microgenre signatures 250 (or equivalent statistics depending on the dataspace, as described above). The illustrative learning system shown in the figure has 3 nmk signatures in the collection.

The timeslots shown in FIG. 2 can be further divided according to the particular needs of the learning system. Thus, a top-level time slot can have lower level time slots organized beneath the top-level time slot. For example, a top-level time slot can be a day organized into lower-level time slots of an hour or half-hour increments, each having its own collection of signatures. Similarly, the day time slot can have a collection of composite signatures beneath it that aggregate all of the information of the individual time slots for that given day into a single composite signature.

Figure 3:
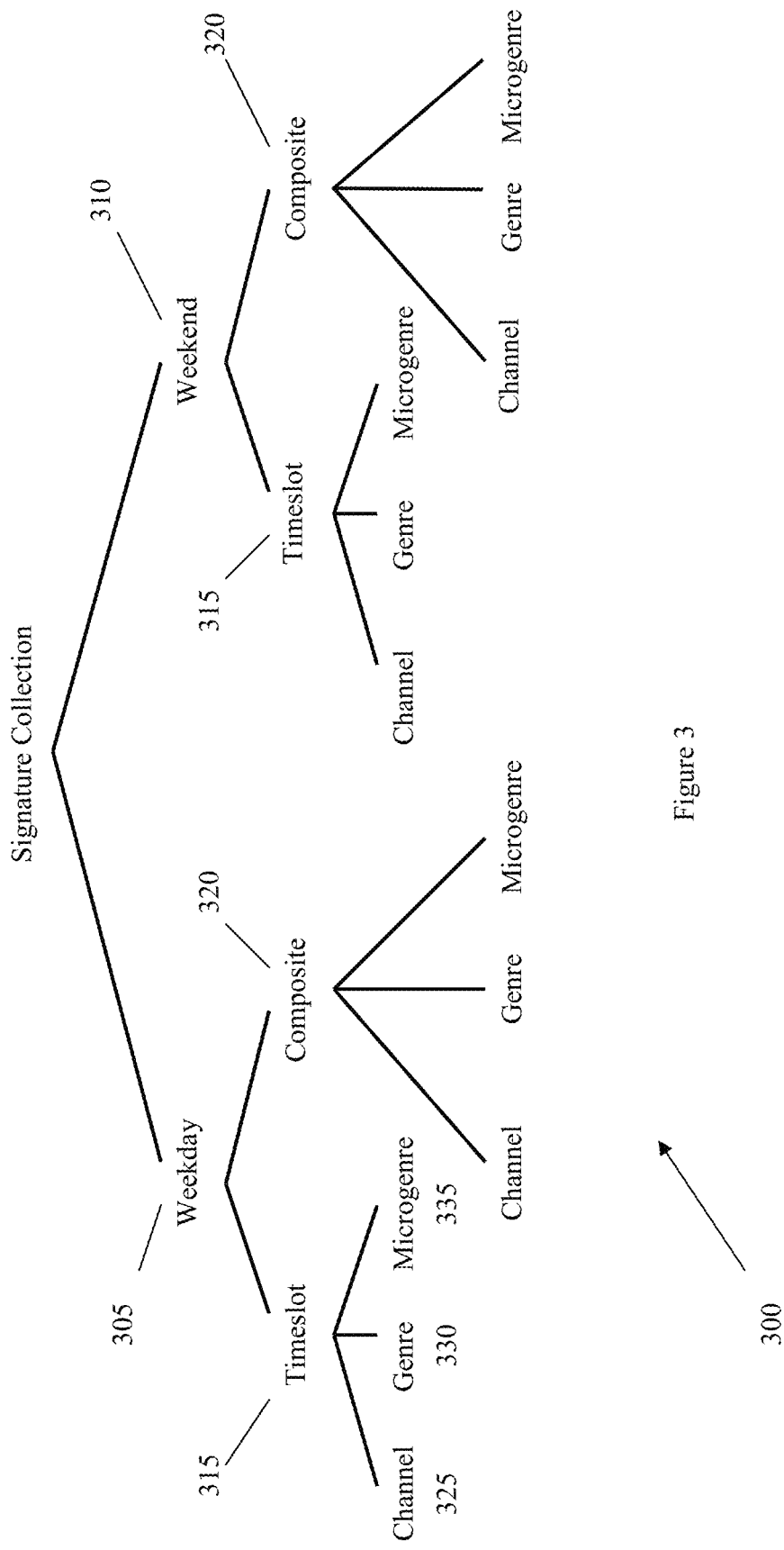
FIG. 3 illustrates a collection of signatures of a user for a single dataspace in a single location.

FIG. 3 shows an illustrative example of the organization of a signature collection 300 for the user in the television program dataspace at a single location. At the top level, the signatures are classified into various periodicities for the user, as discussed in greater detail below. The example in FIG. 3 shows a weekday periodicity 305 and a weekend periodicity 310. Within each periodicity, signature collection 300 is further divided into individual time slots 315 with a composite 320 for each day. Within each further division exists three types of signatures: channel 325, genre 330, and microgenre 335. Thus, there is one of each of these three types of signatures for every weekday time slot, weekend time slot, and one for each weekday composite and weekend composite. Therefore, the system captures the activities performed by the user in this single dataspace and at this single location as defined by the hierarchy present in signature collection 300.

Because activities vary widely in a multiple dataspace environment, the system can capture the user's activities, according to the signature hierarchy, as duration and/or count. In other words, the system can track the amount of time the user spent performing an activity, or the system can track the number of times the user preformed a particular activity, or the system can record both. For example, if the system is modeling a DVR recording activity or DVD ordering activity, there is no duration measure associated with it. Thus, in these cases, the system will capture the intensity of the activities by the count (frequencies) of the activities. However, other activities have duration as a natural measure of the intensity of the activities (e.g., watching a television program). While still other activities have both count and duration as a natural measure of intensity (e.g., placing a telephone call and conducting the call). To be inclusive of all activities, the system models every activity by both count and duration. Thus, there are two signatures for each keyword, genre, and microgenre division of the hierarchy. Likewise, there are two for each composite as well. For each time, location, and dataspace, a function $f$ defines the convolution of the two intensity measures into a single signature:

$$f_{tgs}:(count, duration) \rightarrow single\ measure \quad (Equation\ 1)$$

For the sake of simplicity, this description omits the adjective, count or duration, in referring to signatures, opting for disambiguation based on the context.

In one embodiment of the invention, signatures capture the television viewing activity of the family of users in a single geographic location, and these signatures are used to identify and organize television program search results. The learning engine divides a day into time slots. For the purposes of this example, there are 48 time slots in a 24-hour day. Thus, one time slot corresponds to the smallest length TV-program, i.e., 30 minutes. In other implementations, time slots may be larger or smaller, for example, in a system using stochastic signatures to identify a user's telephone calling preferences, the time slots may be two to three hours long. During each time slot, the user activity is recorded and the learning system creates a time slot signature for each time slot. In addition, at the end of each day, the learning system creates a composite signature based on the data collected across all time slots within the current day. The signature is said to be composite in that it represents a user's activity across multiple time slots. As discussed in greater detail below, the learning system uses smoothing techniques to create evolving signatures that retain activities in the distant past as well as the most recent activities.

The day is divided into time slots because each family of users has a recurring viewing behavior based on the time of day. Thus, the learning system learns television-viewing preferences from the past behavior during a given time slot. Any queries for television content that originate in that time slot on a later day can use these preferences to identify and organize content by using that time slot's signature.

For example, in an illustrative family of three—husband, wife, and a child—mornings and afternoons are taken up by soap operas and talk shows; afternoons are taken up by cartoons and children's programming; and evenings are taken up by business, movies, and prime time shows. During these periods, it is likely that queries for current television content also relate to the corresponding past viewing behavior. Thus, signatures that capture this past behavior are used to identify and organize content consistent with this past behavior. However, for more aggregate behavior, independent of time slots, it is desirable to have a coarse grain view of the day's activity in the household. The time slot activity is aggregated into a day's activity; this is the basis of the composite signature. Thus, at the end of each day, the system has collected and aggregated 49 different signatures, 48 individual time slot signatures and one composite signature.

Composite signatures serve two purposes. First, if the family of users has a slight time-drift in their behavior (e.g., some days a particular user watches a given program at 10:00 AM, while other days at 10:45 AM), the time slot signatures may get shifted by one slot. However, the composite will still capture the overall viewing behavior correctly. Second, a particular user may time-shift deliberately by many time slots. The composite signatures will also correctly capture this behavior.

User Periodicity

The above example implicitly assumes that the user has a recurring behavior with a periodicity of a day. However, the learning system may utilize other periodicities, as explained below. As mentioned above, one benefit of the learning system is to enhance the user's experience by increasing the accuracy of the results of a user's query for content and organizing these results so as to put the most likely desired content items at the top of the results list. This increases the user's speed and efficiency in accessing the content he or she desires.

Towards this end, the learning system infers periodicity of activities. For example, as discussed above, there is a daily periodicity of activities. However, the daily periodicity model may not always apply, as occurs during a weekend, during which time the users' activities can be quite different from those during the week. To capture this different behavior pattern, for example, the system will utilize two different periodicities. Thus the weekday periodicity will contain data for the days during the week, while the weekend periodicity will be empty for those days and vice versa. This is an example of orthogonal periodicity.

The term orthogonal refers to the fact that the periodicity waveforms are orthogonal; i.e., if f(x) is a periodicity function and g(x) is another periodicity function, then f(x) and g(x) have orthogonal periodicity if $$f(x)g(x)=0; 0 \leq x \leq \infty \quad (Equation\ 2)$$

Figure 4:
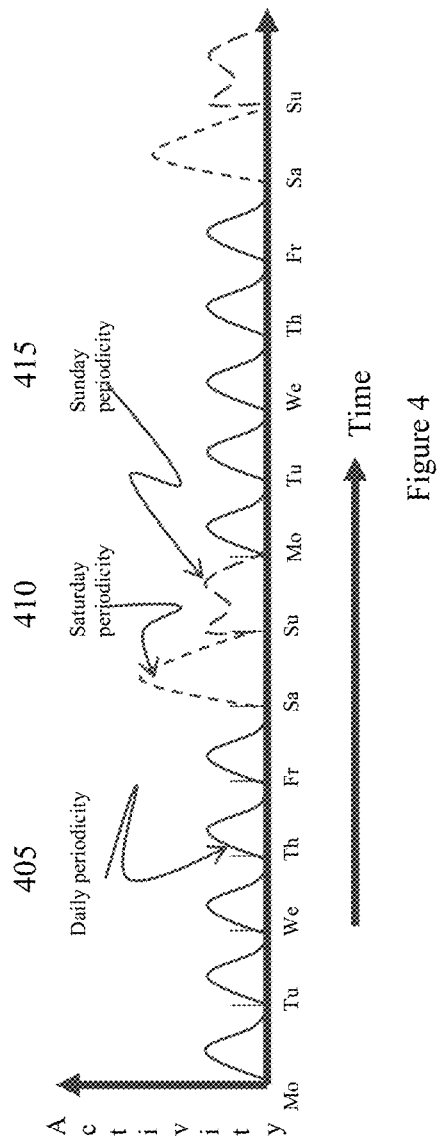
FIG. 4 illustrates orthogonal periodicities.

Equation 2 defines strong orthogonality, or pointwise-orthogonality, in contrast with the strict mathematical definition of orthogonality of functions (see F. B. Hildebrand, *Introduction to Numerical Analysis*, second edition, McGraw-Hill Book Company, New York, 1974, hereby incorporated by reference). FIG. 4 illustrates an example of orthogonal periodicity. The figure shows a variety of waveforms that represent the activity captured by a set of signatures for a particular dataspace in a particular location. The Y-axis is the intensity of activity during a particular day, and X-axis is the day. A weekday waveform 405 captures the activity during the days of the week (i.e., Monday-Friday). Whereas a Saturday waveform 410 and a Sunday waveform 415 capture the activity on Saturday and Sunday, respectively. A solid line shows weekday periodicity waveform 405; a short dashed line shows the Saturday periodicity waveform 410; and a long dashed line show Sunday periodicity waveform 415.

FIG. 4 illustrates the waveforms are orthogonal in that the activity level for weekday waveforms is zero during Saturday and Sunday, while the Saturday waveform is zero for all non-Saturday days, and the Sunday waveform is zero for all non-Sunday days. The system captures these orthogonal periodicities by storing the activities in distinct sets of signatures, with one set of signatures for each orthogonal period. As explained above, the set can include both individual time slot signatures as well as a composite signature for the entire orthogonal period. When a user query is submitted within a particular period, the corresponding set of signatures is used in identifying and organizing the search results.

Although the above example is in terms of a week, periodicity can extend beyond a week. For example, periodicities can exist within a day or can extend beyond a week. In addition, some periodicities may not be orthogonal. Thus, the system uses a second kind of periodicity, namely overlapping periodicity, to capture this phenomenon.

Figure 5:
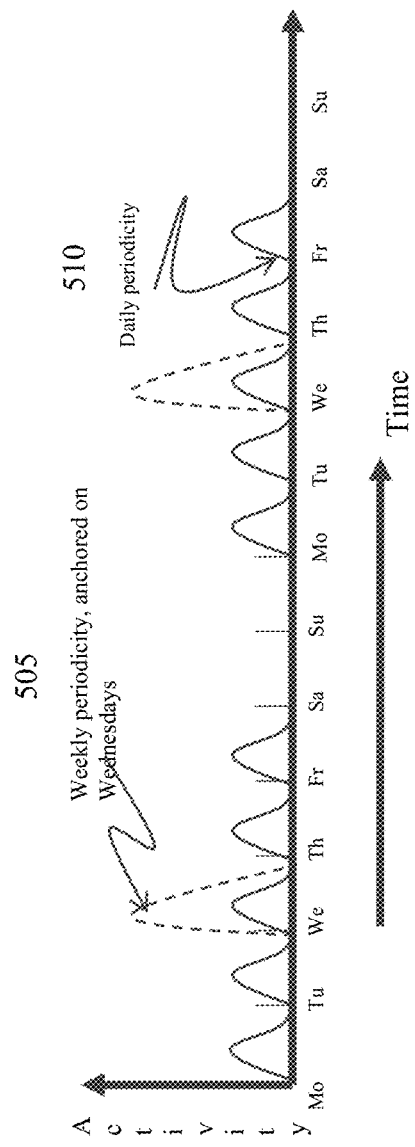
FIG. 5 illustrates overlapping periodicities.

In overlapping periodicities, the periods overlap; i.e., the same time and day can belong to multiple periods, one having a larger frequency than the other. Thus, the strong orthogonality property of Equation 2 does not apply to overlapping periodicities. FIG. 5 shows an example of overlapping periodicity. In this example, a user watches a recurring program every Wednesday, along with the usual daily programs that she watches. Thus, there is a weekly period 505 with a frequency of once per week and a daily period 510 with a frequency of once per day.

Overlapping periodicities are distinguished by storing the same activities in multiple sets of signatures, one set for each overlapping periodicity. In the example of FIG. 5, the system will store the same Wednesday activity both in daily set 510 and weekly set 505. Notice that weekly set 505 does not contain activities from other days. When a query is submitted on a Wednesday, a union of both signatures is used in identifying and organizing the content results. Both signatures are combined in such as way as to reflect the fact that the weekly signature 505, anchored on Wednesdays, has a greater impact on the query results than does daily signature 510.

As mentioned above, the learning system defines periodicities according to the users' behavior. In one illustrative implementation, the system compares each recorded user action and determines the periodicity of similar actions by measuring the time that elapses between the similar actions. The similarity can be based on, for example, the user watching the same television channel or the user watching television programs of the same genre or microgenre. Therefore, if a user watches a particular television show on the first Tuesday of every month, the system would capture this as a monthly periodicity. Thus, although the system can use predefined periodicities, the system creates periodicities of any time duration as needed by the particular usage case. As mentioned above, capturing the user's viewing preferences in the television dataspace is only one example of an implementation of the learning system. Other examples include learning the user's dialing preferences in the telephone dataspace or tracking the user's buying behavior in the internet dataspace.

Signatures as Multiple Vectors

As explained above, vectors can be used to capture the family of users' behavior. A vector is defined as a linear array of numbers. Every vector belongs to a vector space. In one embodiment of the learning system, the system only operates in vector spaces in $R^{+n}$, defined as $$R^{+n} = \{(x_1, x_2, \ldots, x_n) | x_i \geq 0 \text{ all } i\} \quad \text{(Equation 3)}$$

Figure 6:
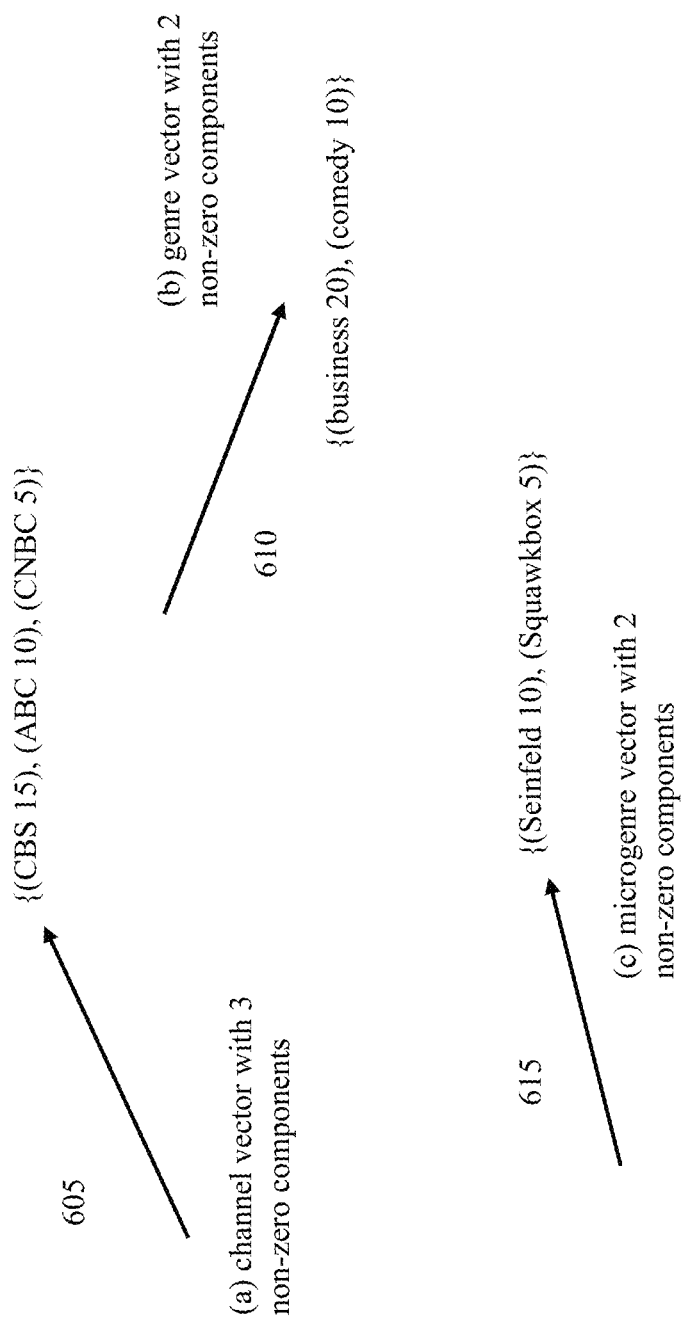
FIG. 6 illustrates sample vectors in three vector spaces.

The dimensionality of the vector space depends on the type of vector. For example, the dimensionality of a channel vector space is the number of channels in the television system. The values in the vector also depend on the type of vector; e.g., it can be duration or count or any other metric deemed appropriate to capture the activity of the family of users. FIG. 6 shows an example of a collection of vectors capturing the users' activity between 10:00 AM and 10:30 AM on a weekday.

The vectors in FIG. 6 correspond to three different vector spaces—channel, genre, and microgenre. The dimensions of these vector spaces are the number of channels in the TV system, the number of genres defined in the learning system, and the number of microgenres dynamically created in the learning system, respectively. Only nonzero values are stored in the various vectors. All other values are implicitly zero and are not stored in the system. Thus, the learning system fundamentally stores all vectors as sparse vectors. The technology of sparse vectors and sparse matrix computations eases the burden of working with large vector spaces (see I. S. Duff, A. M. Erisman, and J. K. Reid, Direct Methods for Sparse Matrices, Monographs on Numerical Analysis, Oxford Science Publications, Clarendon Press, Oxford, 1986, for a description of numerical computations using sparse matrices and sparse vectors, hereby incorporated by reference).

A channel vector 605 in the figure has nonzero values for channels CBS, ABC, and CNBC. The values correspond to the number of minutes the user watched each channel between 10:00 AM and 10:30 AM. Similarly, the program genres are captured in a genre vector 610. In this example, the CBS and CNBC channels were broadcasting programs of type business and ABC was broadcasting a program of type comedy. Finally the program microgenres are captured in a microgenre vector 615. In the above example, ABC was broadcasting the comedy show Seinfeld, CNBC was broadcasting a business show Squawkbox, and no microgenre was created for the CBS show.

As previously mentioned, the techniques described above can be implemented in data collection modules and signature computation modules that reside on either a client device or a remote server system. Thus, the channel, genre, and microgenre data can be gathered and processed locally by the client device, or this information can be sent to a remote server system for processing. Likewise, the signatures can reside on a client device or on a remote server system for use as described below.

In addition to capturing the user's activities according to keyword (i.e., channel in the television dataspace context), genre, and microgenre, the system also learns the amount of time the user spends in each dataspace independent of location and time slot. This gives rise to yet another signature: the dataspace fraction signature. The dataspace fraction signature (herein "dfs") has the coordinates of time and location and is represented by dfs(t, g). The signature dfs(t, g) is a normalized probability vector indicating the fraction of time (and/or activity count) the user spent in various dataspaces. For example, dfs(t, g)[s] contains the value indicating the fraction of time and/or count spent in dataspace s, at time t in location g. This two-coordinate signature is used to reorder the search results space when a search across dataspaces is performed. Meanwhile, as described above, a three-coordinate signature is used to reorder the items within each dataspace, e.g., ks(t, g, s) denotes a keyword signature in time slot t, in location g, and in dataspace s; ks(t, g, s)[x] denotes the value of element x in the keyword signature. Therefore, when the user initiates a search across all dataspaces, the system will reorder content items from the multiple dataspaces according to the user's dataspace preferences based on the information contained in the dataspace fraction signature. If the user performs actions in one particular dataspace relative to another, the result from the more heavily used dataspace would be promoted over the results from the lesser-used dataspace.

The following example is provided to illustrate this aspect of the learning system. A mobile user visited the telephone dataspace 30 times, the television dataspace 20 times, and the web dataspace 10 times while located in Denver during the 10 AM time slot. During these interactions with the system, the user called Sam, Sally, and Stewart, speaking for 5, 15 and 10 minutes respectively. The user watched a television program entitled "Seinfeld" for 30 minutes. In addition, the user browsed the Google webpage for 10 minutes and Yahoo! webpage for 20 minutes, respectively. Using a count measure for the dataspace fraction signature and a duration measures for the television, telephone, and web dataspaces, the keyword signature and dataspace fraction signature ensemble, will be as follows:

dfs(10, "Denver")["phone-space"]=0.5
dfs(10, "Denver)["TV-space"]=0.33
dfs(10, "Denver")["web-space"]=0.17
ks(10, "Denver", "phone-space")["Sam"]=0.17
ks(10, "Denver", "phone-space")["Sally"]=0.50
ks(10, "Denver", "phone-space")["Stewart"]=0.33
ks(10, "Denver", "TV-space")["Seinfeld"]=1.0
ks(10, "Denver", "web-space")["Google"]=0.33
ks(10, "Denver", "web-space")["Yahoo!"]=0.67

Thus, if the user enters a text query starting with the letter "S", all results beginning with the letter "S" would be presented to the user. However, the matching results from the phone-space would be promoted over the results from the TV-space and the web-space because the dataspace fraction signature probability for the phone-space is the greatest. This is so even though the probability for the lone TV-space item is greater than any of the phone-space items. Within the phone-space, the individual items would be sorted according to the keyword signature probability values. Therefore, the entry for "Sally" would be promoted over the other phone-space items. This example clearly shows the Bayesian property of the signatures. That is, the probabilities add up to one, conditioned on the fact that the user is in a particular dataspace (see B. W. Lindgren, G. W. McElrath, D. A. Berry, *Introduction to Probability and Statistics*, Macmillan publishing co., New York, 1978, herein incorporated by reference, for more details on Bayes's theorem).

As described above, the signatures associated with a particular dataspace (i.e., keyword, genre, and microgenre signatures) capture the probability of the user performing a future action or desiring a future content item based on past activities and selections that took place within that particular dataspace. Thus, the individual dataspace signatures are conditional signatures in that the probabilities they measure are conditioned upon the user operating in the particular dataspace to which those signatures relate.

The dataspace fraction signature probabilities can be used to weight the individual dataspace signature probabilities to provide a measure of the probability of a user performing a given action outside of a particular dataspace. This operation gives rise to an unconditional signature. The unconditional signature measures the probability of the user performing an action outside of any particular dataspace based on the information contained in the individual dataspace signatures and the information contained in the dataspace fraction signatures. The system uses Equation 4, below, to determine the unconditional keyword signature for an activity "A". Unconditional signatures for genre and microgenre can be determined in the same way.

$$uks(t,g,s)[A]=ks(t,g,s)[A]*dfs(t,g)[s] \quad \text{(Equation 4)}$$

The learning system can organize the various dataspaces, content, and selectable actions into a tree hierarchy, which the user can navigate using the client device. The unconditional signatures are used by the learning system to rearrange the various branches of the tree structure so as to present the most favored content to the user based on the probabilities stored in the signatures. In addition, the unconditional probabilities enable the system to present lists of commingled selectable actions and content items based on the most commonly performed actions and most commonly exhibited preferences. For example, the learning system is capable of creating a "My Favorites" list based on the various signatures, or the system could rearrange a content tree hierarchy in order to reduce the effort required of the user to reach certain preferred content.

Correlated Activity Signatures

The learning system is also capable of learning correlated activities across dataspaces. A correlated activity is an activity performed in a secondary dataspace while starting from a primary dataspace. In general, by capturing correlated activities across dataspaces, the system is learning not only standalone actions and content preferences, but the system is learning chains of actions performed by the user. For example, a user enters the telephone dataspace of his device to make a telephone call. During the telephone call, the user wishes to enter the calendar dataspace to search for and review the date and time of a particular appointment. In this example, the user remains engaged with the primary dataspace, the telephone dataspace, for the duration of the telephone call. The user also performs a correlated action, the act of searching for an appointment, in the secondary dataspace, which is the calendar dataspace.

The purpose of learning the correlated activities is to achieve better ordering of the search query results in the secondary dataspace based on the correlated activities learned by the system. Thus, the correlated activity signatures provide yet another way to learn the preferences of the user and how the user interacts with his or her client device. This additional set of preferences and learned actions further enhances the user experience.

In general, the system has an activity matrix A that is a square N by N matrix, where N is the number of dataspaces. Each entry in the matrix is a signature vector that captures the actions performed in the secondary dataspace while operating from the primary dataspace. Thus, A is in fact a three dimensional matrix, which can be defined as follows:

$$A(i,i)[x]:=0; 1 \le i \le N, \text{ for all items } x \in \text{dataspace } i$$

$$A(i,j)[x]:=\text{average number of accesses of item } x \text{ in dataspace } j \text{ while in dataspace } i; \ 1 \le i \le N; 1 \le j \le N; \ i \ne j; \text{ for all items } x \in \text{dataspace } j \quad \text{(Equation 5)}$$

The matrix determined by Equation 5 captures the correlated activities of the user, and therefore can be used in accordance with the techniques disclosed herein to predict the probability that the user would perform an action in a secondary dataspace while operating from a primary dataspace. In addition, the correlated activity signatures can be used to determine the unconditional probability of the user accessing a keyword item x in dataspace s, location g, and at time t. The probability determination depends in part on the mode of access utilized by the user. As described in Equation 6 below, if the user is entering dataspace s at the root level of the client device (i.e., the user is not currently in a dataspace), the probability determination is based on the dataspace fraction signature and the relevant signatures for the selected dataspace (e.g., the keyword signature, the genre signature, or the microgenre signature). If the user is entering dataspace s from another dataspace, the probability determination is based on the dataspace fraction signature and the correlated activity matrix A.

$$Prob[x] = \begin{cases} dfs(t,g)[s] * ks(t,g,s)[x]; s \text{ is visited at root level} \\ \sum_{1 \le i \le N} A(i,s)[x] * dfs(t,g)[i]; \text{otherwise} \end{cases}$$ (Equation 6)

For the sake of simplicity, the learning system's ability to capture correlated activities was described in terms of a primary and secondary dataspace only. However, the invention is not limited to correlations between only two dataspaces. The learning system can also capture user activities and preferences when the user enters a first dataspace, enters and performs an action in a second dataspace, and enters and performs yet further actions in a third dataspace. In fact, using the principles and techniques described above, the learning system can create N! number of correlation signatures.

Signature Clustering

As described above, the users' activity and preferences are stored as vectors. Capturing the users' activity and preferences as vectors has many benefits. Among these is the fact that because signatures are vectors, one can easily determine when two signatures are nearly identical. For example, let $\tilde{x}$ and $\tilde{y}$ be two signatures in the same vector space. Lower case letters in bold will generally denote normalized probability vectors in appropriate dimension. A tilde over the top of a vector will generally denote un-normalized vectors. Greek symbols and lower case letters, without bold, will generally denote scalars. If $$\text{vector angle}(\tilde{x}, \tilde{y}) = \frac{\tilde{x}^T \tilde{y}}{\|\tilde{x}\|\|\tilde{y}\|} \ge (1 - \varepsilon),$$ (Equation 7)

where $\varepsilon$ is a small fraction in the vicinity of 0.01, then the two signatures are nearly identical. Equation 7 states that if the cosine of the angle between the two signatures is small enough, then they are nearly identical, up to a scaling factor. The scaling factor recognizes that two vectors may have different magnitudes, but still be overlapping. For example, a first user has a genre vector of {(sports 20); (world news 50)} and a second user has a genre vector of {(sports 60); (world news 150)} where the first value within the vector elements is the genre and the second value is minutes watched per day. Although the magnitudes of these two vectors are different, the genres and ratio of minutes of sports to world news is identical. Thus, the learning system identifies these two signatures as nearly identical. The learning system can exploit this aspect in a variety of ways, as described in greater detail below.

In one illustrative implementation, the system clusters signatures that are similar into subsets. The subsets can then be used for many purposes, such as promotions, targeted advertisements, etc. For example, if several users of a particular cluster have watched a certain television program, this television program will be recommended to other users of the cluster who have yet to view the program. Similarly, outside of the television context, if users of a particular cluster have purchased a given item, ads for this item are presented to the other users of the cluster who have not purchased the item.

The notion of viewing signatures as vectors can be exploited to determine the similarity between the signatures by using Equation 7. Each cluster represents nearly identical signatures. Initially, the procedure starts with singleton clusters, and recursively collapses them until no more merging is possible. An example of pseudo-code that generates clusters of signatures is provided below:

```
PROCEDURE
    Inputs:
        1. N signatures s₁, s₂, . . . , sₙ
        2. Tolerance threshold ε, 0 ≤ ε ≤ 1.0
    Outputs:
        1. Sets Ψ₁ , Ψ₂ , . . . , Ψ_c containing the signature clusters
    BEGIN
        1. Initially define singleton sets Ωⱼ := {sⱼ}; 1 ≤ j ≤ N
        2. merged := FALSE
        3. for 1 ≤ i ≤ N - 1 do
            a. if set Ωᵢ = ∅, continue
            b. for i+1 ≤ j ≤ N do
                i. if set Ωⱼ = ∅, continue
                ii. If for every x ∈ Ωᵢ and every y ∈ Ωⱼ
                    vector_angle(x, y) ≥ (1 - ε), then
                    A. Ωᵢ := Ωᵢ ∪ Ωⱼ
                    B. Ωⱼ := ∅
                    C. merged := TRUE
                end_if
            end_for
        end_for
        4. if merged = TRUE, go to step 2.
        5. c := 0
        6. for 1 ≤ i ≤ N do
            a. if Ωᵢ ≠ ∅ then
                i. c := c + 1
                ii. Ψ_c := Ωᵢ
            end_if
        end_for
    END
END_PROCEDURE
```

Signature Decomposition

In addition, the learning system can decompose one or more signatures to approximate the number of family members in a signature, the gender of each family member, and the ages of the family members. The system uses a nonlinear optimization model to approximate these values. In this example, the learning system uses genre signatures; similar models apply to channel and microgenre signatures.

The technique starts with historical, human behavioral, statistical data on television viewing habits obtained from generally available data (such as the user viewing preferences available from the DVB Project, see www.dvb.org). In particular, Δ is a set of all genres that are available to the viewing public. Upper case Greek letters in bold font generally denotes sets. Thus, a collection of probability distributions exists, namely $f_g^y(t)$ Probability that a genre g would be watched by a person of gender y and age t; y={male, female};

$$0 \le t \le \infty; g \in \Delta$$ (Equation 8)

The learning system also provides a signature s that collectively describes the viewing habits of the household. The illustrative maximum likelihood estimation problem formulated below defines the most likely set of household members that may produce the signature s. For the purposes of this example, all vectors, normalized or unnormalized, are lower case bold letters.

The inputs to the optimization problem are the probability distribution functions $f_g^y(t)$ and a family signature s that collectively represents the activities of a household. The outputs are n, the number of members in the household, where $1 \leq n$, the age and gender of each family member i, where $1 \leq i \leq n$, and a set of signatures $s_1, s_2, \ldots, s_n$, where signature $s_1$ corresponds to family member i. Further, let $N=|\Delta|$, the cardinality of the Genre set, $\Phi$=set of all non-negative basis matrices B for the vector space $R^{+N}$ (i.e., $B=[b_1, b_2, \ldots, b_N]$, where $b_1$ is a nonnegative N-vector and $b_1$ $1 \leq i \leq N$, are linearly independent, and for any vector $s \in R^{+N}$, $$s = \sum_{i=1}^{i=N} \alpha_i b_i,$$

with $\alpha_i \geq 0$).

The decision variables are as follows: basis matrix $B \in \Phi$, variables $x_1, x_2, \ldots, x_N$, which represent the ages of family members with signatures corresponding to the basis vectors in B, and variables $y_1, y_2, \ldots, y_N$, which represent the gender of the corresponding family members.

For the purpose of optimization, it is necessary to define an objective function to maximize. Towards this end, the system uses an intermediate function, as follows:

$$s = \sum_{i=1}^{i=N} \alpha_i b_i, \alpha_i \geq 0, \quad \text{(Equation 9)}$$

for any vector $s \in R^{+N}$
and any basis Matrix $B \in \Phi$ $$h(v, x, y) \triangleq \prod_{1 \leq k \leq N} f_k^y(x) v^{(k)}, \quad \text{(Equation 10)}$$

where $v^{(k)}$ is the $k^{th}$ component of vector $v$

Function h(v, x, y) evaluates the likelihood probability of a person with age x and gender y having a signature v. Note that the system is taking the product of all the components of vector v. Thus, the maximum likelihood estimation becomes $$\underset{B \in \Phi}{\text{Maximize}} \sum_{1 \leq j \leq N} h(\alpha_j b_j, x_j, y_j) \quad \text{(Equation 11)}$$

subject to the following constraints:

$$s = \sum_{i=1}^{i=N} \alpha_i b_i; \alpha_i \geq 0; \quad \text{(Equation 12)}$$

$$1 \leq x_j \leq \infty; 1 \leq j \leq N; \quad \text{(Equation 13)}$$

$$y_j = \{0, 1\}; 1 \leq j \leq N. \quad \text{(Equation 14)}$$

This optimization problem can be shown to be NP-Hard (see M. R. Garey, and D. S. Johnson, *Computers and Intractability A Guide to the theory of NP-completeness*, W. H. Freeman and Company, New York, 1979, herein incorporated by reference), since any technique needs to search over the space of all bases in $R^{+N}$ and the fact that the y variables are integer variable. This problem has some similarities to another non-standard class of optimization problems known in the literature as semi-definite programs. An approximate solution to this problem can be achieved using an illustrative technique described below.

The estimation technique uses a first approximation by converting these discrete variables to continuous variables with bounds. This makes the transformed problem amenable to differentiable optimization. The technique also uses a second approximation by identifying a subset of the set of all bases $\Phi$ as the set of bases in $R^{+N}$ that are permutations of the coordinate basis matrix and restricts the search to this set. Given any basis from this set, the inner iteration involves a steepest ascent technique in variables ($\alpha_j$, $x_j$, and $z_j$) to obtain a local maximum (where $z_j$ is a continuous approximation of $y_j$). The iterations are terminated when no improvement in the objective function occurs. After termination, the gender variables that are fractional are rounded/truncated using a rounding heuristic, described below. Given a fixed basis matrix, the transformed maximum likelihood estimation problem becomes a continuous maximum likelihood estimation problem and is given by the following equations:

$$\text{Maximize} \sum_{1 \leq j \leq N} h(\alpha_j b_j, x_j, z_j) \quad \text{(Equation 15)}$$

subject to the following constraints:

$$s = \sum_{1 \leq j \leq N} \alpha_j b_j \quad \text{(Equation 16)}$$

$$1 \leq x_j \leq \infty \quad 1 \leq j \leq N \quad \text{(Equation 17)}$$

$$0 \leq z_j \leq 1 \quad 1 \leq j \leq N \quad \text{(Equation 18)}$$

$$\alpha_j \geq 0 \quad 1 \leq j \leq N \quad \text{(Equation 19)}$$

An example of pseudo code for solving the above continuous maximum likelihood estimation problem is given below. The pseudo code consists of an outer iteration and inner iteration. In the outer iteration, the code iterates through basis matrices. While in the inner iteration, the code employs the steepest-ascent optimization technique to obtain the optimal solution, given a basis matrix.

The steepest-ascent optimization technique has three steps. First, the optimization technique obtains the gradient of the objective function at the current iteration. This is done in step 2.c.ii, set forth below, using difference approximations. The technique of using difference approximations, as well as other numerical and matrix techniques can be found in D. G. Luenberger, *Linear and Nonlinear Programming*, second edition, Addison-Wesley publishing company, Reading Mass., 1989, herein incorporated by reference. Second, the optimization technique projects the gradient onto the null space of B, to obtain the ascent direction d (step 2.c.iii). Third, the optimization technique obtains the optimal step length along d (step 2.c.iv). In the field of optimization, this is called a step-length computation and involves a one-dimensional optimization. The inner iterations proceed until no more improvement in the objective function is possible. After this, the basis matrix is changed and the inner iterations are reinitiated. Finally, rounding heuristics (such as those in G. L. Nemhauser, and L. A. Wolsey, *Integer and Combinatorial Optimization*, John Wiley & sons New York, 1988, herein incorporated by reference) are employed to round off the fractional variables.

In the pseudo code set forth below, I is an identity matrix of order N, and $P_i$ is the $i^{th}$ permutation matrix in the sequence of permutations of the index set $\{1, 2, 3, \ldots, N\}$.

```
PROCEDURE
  Inputs:
    1. The historical probabilities f_k^y(x)
    2. The family stochastic signature s
  Outputs:
    1. Number of family members
    2. Sex of family members
    3. Age of family members
    4. Individual signatures of family members
BEGIN
    1. Initialize:
       a. Current basis matrix B := I
       b. Iteration counter i := 0
       c. Permutation matrix P := I
       d. newOuterObj := 0; oldOuterObj := -∞
       e. α_j := s_j  1 ≤ j ≤ N
       f. x_j := 1  1 ≤ j ≤ N
       g. z_j := 0  1 ≤ j ≤ N
       h. stopping tolerance for inner iterations ε := 0.001
       i. stopping tolerance for outer iteration β := 0.0001
    2. While ((newOuterObj - oldOuterObj)/|oldOuterObj| > β)
       Do//outer iteration
       a. oldOuterObj := newOuterObj
       b. Initialize inner iteration; newInnerObj := 0;
          oldInnerObj := -∞
       c. while ((newInnerObj-oldInnerObj)/|oldInnerObj| > ε) Do
          i. oldInnerObj := newInnerObj
          ii. Compute the gradient vector g := [∂h/∂α_j], [∂h/∂x_j],
              [∂h/∂z_j] using difference approximation.
          iii. Project the gradient vector g on to the null space of
               matrix B to obtain the direction vector d := g_⊥B
          iv. Compute the optimal step length δ along the
              direction d.
          v.
```

$$\begin{bmatrix} \alpha_j \\ x_j \\ z_j \end{bmatrix} := \begin{bmatrix} \alpha_j \\ x_j \\ z_j \end{bmatrix} + \delta d$$

vi.

$$newInnerObj := \sum_{1 \le j \le N} h(\alpha_j b_j, x_j, z_j)$$

```
       endWhile
       d. i := i +1; set P_i := Next permutation matrix in the
          sequence
       e. B := P_i I P_i^T
       f. oldOuterObj := newOuterObj
       g. newOuterObj := newInnerObj
    endWhile
    3. Use rounding heuristics to set fractional z_j variables to the
       nearest integer value to obtain variables y_j.
    4. Compute n := number of α_j that are greater than 0.
    5. Output the optimal solution:
       h. Output n as the number of family members
       i. For 1 ≤ j ≤ N Do
          i. if a_j > 0 then
             a. output α_j b_j as the signature of person j
             b. output x_j as the age of person j
             c. output y_j as the sex of person j
             EndIf
          EndFor
       END
END PROCEDURE
```

Signature Aging

The learning system also provides for remembering past behavior and integrating it into the current signature. The fundamental reason for remembering the past is to infer a recurring pattern in the user behavior, and use the inference to aid in future navigation. Exponential smoothing is a way of gradually forgetting the distant past, while giving more relevance to the immediate past. Thus, activities done yesterday are given more relevance than activities done two days ago, which in turn is given more importance than the activities done three days ago, and so on (see V. E. Benes, *Mathematical Theory of Connecting Networks and Telephone Traffic*, Academic Press, New York, 1965 for additional information, herein incorporated by reference). This technique has the added advantage of reducing the amount of computer memory consumed by the signature.

The learning system uses the concept of exponential smoothing in the context of learning the user's activities. For example, a set of activities for today is captured in a signature s, whereas all of the past activities are remembered in a signature s* (s* remembers all of the past, since the recurrence relation, given below, convolutes all of the past into a single signature). At the end of the day (when the present becomes the past), the system updates s* by the recurrence relation $$s^* = \alpha s + (1-\alpha)s^* \quad 0 \le \alpha \le 1 \qquad \text{(Equation 20)}$$

In Equation 20, α is called the smoothing parameter and it controls how much of the past the system remembers, and how fast the past decays—larger the α, faster the decay. Expanding the above recurrence relation into a recurrence equation illustrates the machinery of exponential smoothing. Where $s^{*(n)}$ denotes the past signature after n days and $s^{(n)}$ represents the activities done during the $n^{th}$ day. Equation 20 expands into $$s^{*(n)} = s^{(n)} + (1-\alpha)s^{(n-1)} + (1-\alpha)^2 s^{(n-2)} + \qquad \text{(Equation 21)}$$
$$\ldots (1-\alpha)^{(n-1)} s^{(1)} + \frac{(1-\alpha)^{(n)}}{\alpha} s^{(0)}.$$

Because α is ≤1, Equation 21 clearly shows that less weight is given to the activities of that past. In some embodiments, all signatures for each macro class (channel, genre, microgenre) are smoothed using the exponential smoothing technique. The determination of when to decay a particular signature is based on the dataspace of the signature and the nature of activities performed in the dataspace. For example, in the television dataspace, a decay period of one day is a suitable period because television shows typically reoccur on a daily basis. Whereas the decay period for the telephone dataspace would be longer so as to decay at a slower rate that the television dataspace. The decay parameter, or smoothing parameter α, can be selected to control the degree of decay of the past user behavior.

The learning system also uses an adaptive decay technique to integrate the past signature information with the most recent signature information. This adaptive decay technique is based on a hybrid chronological-activity based smoothing and provides improved results over strict chronology-based aging when applied to signatures that take into account the user's geographic location. This technique enables the influence of past activities to decay over time, while still preserving the past information during the user's absence from a particular geographic location for a stretch of time. In general, the past signature will be decayed if (1) a new activity has occurred in the geographic location and (2) the elapsed time since the last signature decay event is greater than a threshold. In essence, the system freezes the signatures when no activity is happening in a given location, effectively stopping time for that location. When next an activity occurs in that location, the system smoothes the signatures based on elapsed time.

If a traditional smoothing technique were employed to decay the memory of the past once per day, for example, the signature values may decay to zero if the user were absent from the geographic location for an extended period. Thus, upon returning to that particular location, the user would effectively have to "retrain" the system by rebuilding the signatures corresponding to that location. The adaptive decay technique avoids this problem.

An illustration of an implementation of the adaptive decay technique follows. As mentioned above, signature decay occurs for all signatures in coordinates (t, g, s) (i.e., time t, geographic location g, and dataspace s), only when there is a new activity in (t, g, s). In addition, a minimum time must elapse before decaying takes place. To account for long elapsed times, the system uses the concept of epoch time. Epoch time is the absolute local time since a certain distant past. The concept of epoch time can be found in current-day operating systems (e.g., Linux and WinCE) that fix a reference point in the distant past and return the elapsed time since that reference point. For the example below, T is the epoch time when some activity x happens in (t, g, s). Note that the coordinate t is an integer denoting the discretized time denoting the time-of-day or time slot, whereas T is an epoch time. For use in the Equation 22 below, β(t, g, s) is the decay threshold for signatures, r(t, g, s) is the last time, in epoch units, that signatures in (t, g, s) were decayed, and e(t, g, s) is a vector capturing a newly performed user action (i.e., current signature) with a duration/count metric (explained above) in position x and zeros in all other positions. This technique also uses the smoothing parameter a as described above. Equation 22, shown below, is one implementations the adaptive decay technique.

$$ks(t, g, s) = \begin{cases} \alpha e(t, g, s)[x] + \\ (1-\alpha)ks(t, g, s) \end{cases}; \quad \text{if } T > r(t, g, s) + \beta(t, g, s) \\ \begin{cases} ks(t, g, s) + \\ \frac{\alpha}{(1-\alpha)} e(t, g, s)[x] \end{cases}; \quad \text{otherwise} \end{cases}$$ (Equation 22)

Under this implementation, the system decays the signature if the time interval since the last decay is greater than the decay interval; in this case, the system performs a convex combination of the past activity and present activity. If the last decay has occurred more recently than the decay interval, then the historic signature is combined with the current signature, with a multiplier α/(1−α) applied to the current signature. The technique of using this multiplier optimizes storage. Typically, when performing an exponential smoothing operation, the past is the period of time up to time r(t, g, s), and the present is the period of time from time r(t, g, s) to time T. Under a typical application, the new activity x would be stored in a temporary storage, ts(t, g, s), along with all additional subsequent activities, until the time r(t, g, s)+β(t, g, s). At that time, the smoothing formula would combine the past with the new activities according to Equation 23.

$$ks(t,g,s) = \alpha ts(t,g,s) + (1-\alpha)ks(t,g,s)$$ (Equation 23)

The system avoids the need for temporary storage by combining each new activity with the past signature as each new activity occurs, using the multiplier described above to offset what would otherwise be a premature composition. This ensures true exponential smoothing. Although the above discussion involved only the keyword signatures, ks, the same principles and techniques apply to all other signatures described herein.

Use of Signatures to Personalize Content

As mentioned above, one illustrative use of the learning system is to enhance the user experience during a search procedure. In one illustrative implementation, the various individual, aggregate, and program signatures reside on a server system that contains a set of content items (e.g., television programs, television channels, movies, etc.). The server system uses the signatures to personalize search results provided to users of the system. In particular, the results obtained through a query are identified and reordered by promoting relevance values of individual search results based on the set of signatures. For example, in a system employing an incremental search method (as described in the above incorporated U.S. Patent Applications), the system begins searching for content item results as the user enters letters of a text query. The system identifies content items as candidates for presentation based on comparing the letters of the text query with descriptive terms associated with the content items. Each of these content items is associated with a base relevance value that measures the popularity of the item in the overall population. The system uses these base relevance values to rank which content items are likely sought by the user. Higher base relevance values indicate a higher overall popularity, thus, these items are assumed to be of more interest to the user than items with lower base relevance values.

However, as explained in greater detail below, the system modifies the base relevance values based on the set of user signatures. Thus, if the set of signatures indicates, given the particular time and day of the search, that it is likely the user is searching for a program with the genre of news, the system will promote the relevance values of programs with a genre of news that match the user's query text. Likewise, the system can use the channel and microgenre data associated with the content items in conjunction with the channel and microgenre signatures to promote the base relevance values. The final relevance weights of each item determine if the item is included in the result set and help determine its position in a list of results. Many different promotion techniques can be implemented; one example is the "ruthless promotion technique", described below.

The ruthless promotion technique ensures that any particular search result item that has a nonzero probability in a user signature will have its relevance value boosted such that it will be higher than any other search result items having a zero probability value in the same user signature. For use in Equation 24 below, K is the number of search results retrieved with relevance numbers $r_1, r_2, \ldots, r_K$, and M is the maximum value any relevance can have, based on the general popularity of the search result. Typically, search engines assign a relevance number to query results based on ranks with some maximum bound. These ranks can be a measure of the popularity or relevance of the items based on popular opinion. Search results are displayed in the shelf space, sorted in descending order of relevance based on these ranks (Herein, the phrase "shelf space" refers to the portion of a display screen of a device that displays the search results in response to a user query. This portion can be organized as a column of text boxes in some implementations.) The values $p_1^{(1)}, p_2^{(2)}, \ldots, p_K^{(1)}$ are the channel signature probabilities ($0 \leq p_i^{(1)} \leq 1$) assigned by the learning system (typically, most of the $p_i^{(1)}$ will be 0). The superscripts on the probabilities refer to type of signature, e.g., channel, genre, or microgenre. The ruthless promotion technique computes new relevance numbers $\tilde{r}_1, \tilde{r}_2, \ldots, \tilde{r}_K$ as $$\tilde{r}_i = \begin{cases} \lfloor (M+1)e^{p_i^{(1)}} \rfloor; & p_i^{(1)} > 0 \\ r_i; & p_i^{(1)} = 0 \end{cases} \quad \text{(Equation 24)}$$

The search items are then reordered using the new relevance numbers. For example, a user had watched the channels "CARTOON NETWORK" and "COMEDY CHANNEL" in the past, with the signature probabilities 0.7 and 0.3 respectively. The generic relevance numbers for channels, based on popular opinion, are 500, 300, 100, and 70, for "CBS", "CNBC", "COMEDY CHANNEL", and "CARTOON NETWORK", respectively with a maximum bound of 1000. Table 1 and Table 2 show the displayed results and their corresponding relevance values, when a query character "C" is typed. Table 1 shows the order of the query results without the benefit of the learning system, and Table 2 shows the order of the results using the ruthless promotion technique. As can be seen, the user convenience is enhanced, because fewer scrolls are required to access the most likely watched channels.

TABLE 2

| Channel | Relevance Number |
|---|---|
| CARTOON NETWORK | 2015 |
| COMEDY CHANNEL | 1351 |
| CBS | 500 |
| CNBC | 300 |

TABLE 1

| Channel | Relevance Number |
|---|---|
| CBS | 500 |
| CNBC | 300 |
| COMEDY CHANNEL | 100 |
| CARTOON NETWORK | 70 |

Other promotion techniques are within the scope of the invention, including, for example, techniques that do not necessarily ensure that a search result item that has a nonzero probability in a user signature will have its relevance value boosted such that it will be higher than any other search result items having a zero probability value in the same user signature. In particular, because there are six signatures capturing the user activity at any time of day—channel, genre, and microgenre for given time slot, and their corresponding composite signatures, these signatures are combined to compute new relevance weights. Equation 24 above shows the use of channel signature for promotion. In the example below, there is an inherent importance in these signatures, from more refined to more coarse. This variant of the ruthless promotion technique considers an aggregated promotion formula, as follows:

$$\tilde{r}_i = \left\lfloor \sum_{1 \leq k \leq 6} (M+1)^k e^{p_i^{(k)}} \right\rfloor \quad \text{(Equation 25)}$$

In Equation 25, the superscript on the probabilities, $p_i^{(k)}$ refers to time slot channel, microgenre, genre, followed by composite channel, microgenre, and genre signatures, with increasing values of k, respectively. Since they are being multiplied by powers of (M+1), a natural relevance importance is implied.

Signatures corresponding to overlapping periodicities are also combined to provide an aggregate signature for a particular time slot. The probabilities in the aggregate signature can be used with the promotion techniques above to identify and rank the results of search. In order to form an aggregate signature, the vectors from the overlapping signatures are added together and renormalized. For example, for a particular time slot, a user has a first signature with a periodicity of every Monday and a second signature with a periodicity of every weekday. The first signature is the genre vector {(0.2 news), (0.8 sports)}; the second signature is the genre vector {(0.1 comedy), (0.4 news), (0.5 sports)}. To form an aggregate signature, the system first arithmetically combines the two vectors to produce the new vector {(0.1 comedy), (0.6 news), (1.3 sports)}, and the system then normalizes the new vector by dividing each numerical element by the sum of the numerical elements of the vector, i.e., 2.0. Thus, the aggregate, normalized genre probability vector of the two overlapping signatures is {(0.05 comedy), (0.3 news), (0.65 sports)}.

Seminormalization of Signatures

In one implementation, the learning system uses integer arithmetic for relevance promotion computations. In particular, all probabilities are represented as integers, appropriately scaled. One compelling motivation for using integer arithmetic is to make the learning system portable to disparate hardware and operating systems, some of which may lack floating arithmetic.

The learning system uses a seminormalization approach to weight more recent activities more heavily in the signatures, while deemphasizing, but still retaining, the information from more distant activities in the signature. Thus, when personalizing services or content provided to the user, the system is more heavily influenced by more recent activities. The basic idea of this seminormalization approach is to make the long-term memory coarse-grained by bucketing small probabilities that result from less common user preferences and/or preferences captured in the more distance past, while still bounding the range of values by using a small relevance scale factor. This approach allows the system to capture both small and large probabilities without requiring a large dynamic range to define the probability bounds. Thus, a small scaling factor is used to distinguish between the relatively more probable activities in the captured in the signatures, while the relatively less probable activities are not lost due to truncation errors.

An illustrative technique for converting an unnormalized signature, x, into a seminormalized signature is provided below. In signature x, all elements $x_i$ are nonnegative integers, representing the activity intensity. Signature x is an N-dimensional vector, and x has at least one positive element. The value d is the infinity norm of x and thus, d is the normalizing sum. The vector p is the normalized $$|x|_\infty \triangleq \sum_{1 \le i \le N} x_i;$$

probability vector corresponding to x; therefore, $$p_i = \frac{x_i}{d}; 1 \le i \le N.$$

In order to seminormalize the signature x, the system uses a fine-grain memory threshold of probabilities, K, represented in log scale; i.e., K is a positive integer denoting a probability threshold $10^{-K}$. All probabilities$\le 10^{-K}$ will be scaled in fine-grain, and all probabilities between 0 and $10^{-K}$ will be scaled in coarse-grain with bucketing. The system also uses a positive integer, S, as the seminormalization range represented in log scale. After seminormalization, a probability value of 1 is scaled to $10^S$. The largest value in the seminormalized vector would be $10^S$. Although not required, S can be equal to K. For use the in equations below, let $t=10^{-K}$, $1=K+2$, and $u=10^S$. Finally, y is the seminormalized vector corresponding to p. Thus, y=f(p, K, S), where f is the function implementing the seminormalization algorithm. The function f is not an invertible function.

Each element i of the seminormalized vector y is defined by the Equation 26.

$$y_i = \begin{cases} 1; & 0 \le p_i < 10^{-2K} \\ v+2; & 10^{(-2K+v)} \le p_i < 10^{(-2K+v+1)} 0 \le v \le K-1 \\ \frac{(10^K 1 - u)}{(10^K - 1)} + \frac{10^K(u-1)p_i}{(10^K - 1)}; & 10^{-K} \le p_i \le 1 \end{cases} \quad \text{(Equation 26)}$$

Figure 7:
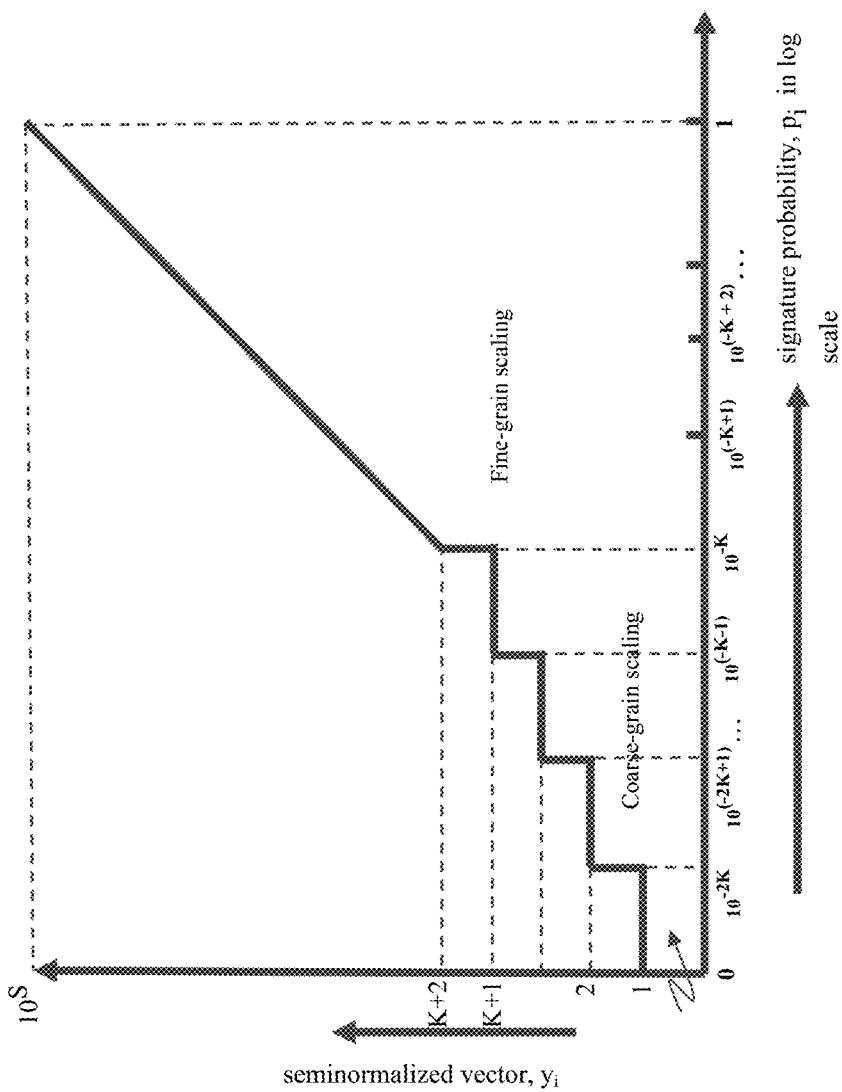
FIG. 7 illustrates seminormalization of signature probabilities.

The first 2 parts of Equation 26 define the coarse-grain bucketing, and the last part of the equation defines the fine-grain scaling. FIG. 7 shows a pictorial representation of Equation 26. The X-axis is shown in log scale. In FIG. 7, S=K, and there are K buckets of width 0.1. The buckets start with the bucket having a left boundary $10^{-2K}$ and ending with the bucket with the right boundary $10^{-K}$. There is a special underflow bucket for any probability$<10^{-2K}$. Each $p_i$ falling within a bucket is scaled to a fixed count. For probabilities larger than $10^{-K}$, the $p_i$ is scaled using a linear equation. The slope of the linear scaling equation in plot is approximately $10^S$ with the intercept at (K+2).

Figure 8:
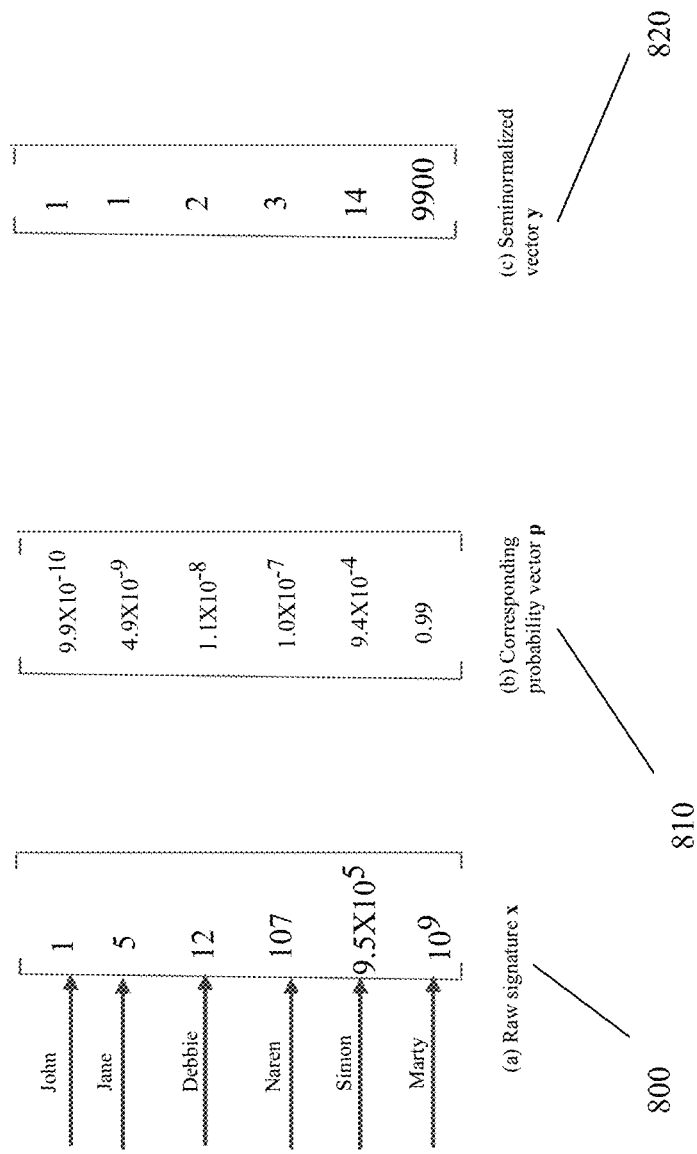
FIG. 8 illustrates an example of a seminormalized signature.

An example of this approach as applied to an electronic phonebook application on a mobile phone is provided below. In this example, each outgoing call is counted and stored in a raw signature. The system scales the call counts by a large number so that truncation errors in the smoothing and aging process, due to integer arithmetic, are reduced. FIG. 8 illustrates a raw phonebook signature 800 with 6 entries. The row names in signature 800 indicate the person called, and the values are the scaled frequency, after aging and smoothing. Thus, the value 1 represents the long-term memory of a phone call made to John, perhaps many years ago, and not repeated again. Similarly, the entry corresponding to Jane has a signature value of 5. This value can be interpreted two ways: (1) Jane was called as long ago as John, but with a frequency five times greater than John; or (2) Jane was called more recently with the same frequency as John. The larger values represent short-term memories of calls made in the recent past. The normalized probabilities of these events are shown in a probability vector 810.

It is clear the dynamic range of probability vector 810 is quite large. Using the techniques described above, with K=S=4, the system generated a seminormalized vector 820. The system has collapsed the memory of John and Jane into the underflow bucket, thus making them indistinguishable. Some differentiation has been made for Debbie and Naren, although these entries also represent long-term memories, and therefore, the exact difference in frequency or recency of calls is not retained. However, the system captures the precise relative values of Simon and Marty. The values in the seminormalized vector are completely bounded and suitable for stable relevance promotion.

Activity Spike Detection

The learning system is also useful for detecting sudden bursts of activity (i.e., spike detection) at a particular time and day for a particular search item, e.g., a certain television channel. The system can use these spikes of activity to temporarily boost the base relevance values of particular items that have sudden popularity. Typically, spikes happen when an emergency or crisis has happened in the recent past. For example, if a particular news channel is presenting a late-breaking news story that is attracting a high number of viewers, the system will recognize the sudden popularity of the news program and boost its base relevance in recognition of the fact that other users of the system may also be interested in the news story.

In general, when the collective activity level associated with a particular content item is above a certain threshold attributable to statistical variations, then the activity level is considered a spike. The learning system analyzes the current and past activity levels by collectively examining all of the signatures of the user population. If each user is considered an independent random variable whose probability of watching a program is encoded in a stochastic signature, then the collection of all these independent random variables provides a measure of the overall popularity of the content item. Thus, the system employs these signatures to derive a joint probability distribution of the number of users watching a given program at a given time. Thus a new type of signature, herein a "program signature", $r_k^{(i,t)}$, is defined in Equation 27.

$r_k^{(i,t)}$=Probability that a program i is being watched by k users at time t;0≤k≤N (Equation 27)

An example of a technique for obtaining the program signature is provided below. In general, when the activity level associated with a particular content item exceeds a certain inherent randomness value predicted by the program signature, the system identifies such activity as a spike.

The system creates a set of program signatures, each of which is a statistical convolution of all individual signatures in the population that have watched the particular program. By convolving the individual signatures, the system creates an aggregate mean and standard deviation of the activity level associated with the given program. Thus, a program signature captures the fraction of all of the current users interacting with the system that are currently watching the given program. Because the number of users interacting with the system changes over time, the fraction of users watching a particular program changes over time as well. The system captures this information by creating program signatures for the various time slots.

These signatures estimate the mean and higher moments of the probability distribution of the number of people accessing this program in terms of fractional probabilities. The aggregate signature and related statistical measures define the normal level of activity for the particular search item. Thus, by continually monitoring the current level of activity for the particular search item at a given time, the system can detect if the current activity is above or below the normal level. If the activity exceeds a certain threshold, the system adjusts the reordering technique to temporarily boost the relevance of the particular search item to recognize that the item may be of particular interest.

An example of creating an aggregate signature is provided below. For the sake of simplicity, the example is restricted to one day, one time slot, one content item, i, and a single category of signature (e.g., channel, genre, or microgenre). This technique for finding the aggregate signature is applied to all time periods, all days, all search items, and all signatures. In the following example, N is the number of users using the system, $q_i^{(j)}$ is the normalized signature value of user j for item i (i.e., the fraction of time user j watched program i) where $1 \leq j \leq N$, $\Psi$ is the index set $\{1, 2, \ldots, N\}$, $\Phi_m$ is the set of subsets of $\Psi$ of size m where $0 \leq m \leq N$, and X is a random variable denoting the number of users currently watching program i.

The unnormalized probability that there are m users watching program i, herein $r_m$, is determined by Equation 28.

$$r_m = \sum_{\Theta \in \Phi_m} \prod_{1 \leq k \leq m} q_i^{(j_k)}, \text{ where } \Theta = \{j_1, j_2, \ldots, j_m\} \quad \text{(Equation 28)}$$

The normalization constant, G, is given by Equation 29.

$$G = \sum_{0 \leq m \leq N} r_m \quad \text{(Equation 29)}$$

The probability density function of X, $f_X(m)$, the mean of X, $\mu_X$, and the standard deviation of X, $\sigma_X$ are now given by the following equations:

$$f_X(m) = \frac{1}{G} r_m; 0 \leq m \leq N \quad \text{(Equation 30)}$$

$$\mu_X = \sum_{0 \leq m \leq N} m f_X(m) \quad \text{(Equation 31)}$$

$$\sigma_X = \sqrt{\sum_{0 \leq m \leq N} (m - \mu_X)^2 f_X(m)} \quad \text{(Equation 32)}$$

The system monitors the number of users watching program i. Chebychev's inequality dictates that, with 96% confidence, the random variable X cannot be above $\mu+5\sigma$ due to inherent randomness. Thus, whenever the number of users watching program i goes beyond $\mu_X+5\sigma_X$, the system identifies this as a spike of activity. The system can temporarily boost the base relevance of program i in queries for which program i is a candidate in recognition of the fact that the user may be interested in the same program. The relevance can be boosted by a predetermined amount, or it may be boosted by an amount that is proportional to the increase in viewing of the program. In addition, the system can use a variety of multiples of $\sigma_X$ (not only $5\sigma_X$) to determine when a spike of activity is occurring.

The system can also infer the overall relevance of particular search items using the aggregate signatures. As described above, the system computes the mean of the statistical convolution of N signatures, N being the number of system users. Using this mean value, the system generically reorders the search results even in the absence of a signature for a particular user. Thus, the user benefits from the systems knowledge of the popular option of various search items, and these popular opinions are used to identify and order search results for presentation to the user. For example, if the aggregate signature has a large mean for the television program "The Apprentice", then any user who does not have a personal signature will have this item in the top shelf on an appropriate query (the query, for instance, can be "trump", which is a microgenre of the program "The Apprentice").

Figure 9:
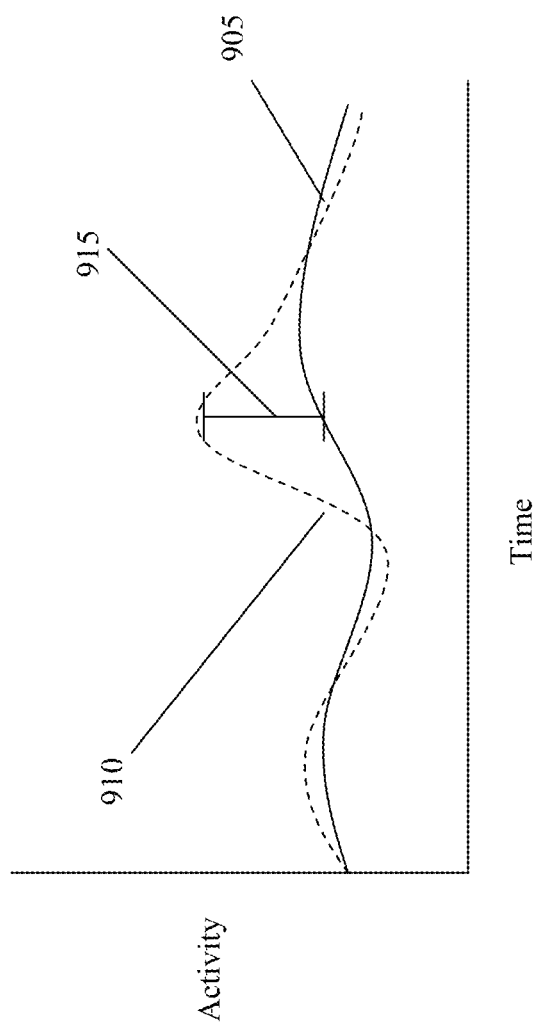
FIG. 9 illustrates an example of detecting an increased level of activity associated with a content item.

FIG. 9 illustrates an example of detecting an increased level of activity associated with a content item (i.e., an activity spike). A normal level of activity 905, as determined using the techniques described above is shown. Normal level of activity 905 is based on the aggregate signatures. As the system is being used, a current level of activity 910 is generated using continuously calculated aggregate signatures based on the current content items usage or activity. Upon detecting an increase in activity level 915, which is beyond a specified threshold, the system identifies the content item as having a spike of activity, and the system promotes the ranking of that content item, as described above.

The learning system also allows accessing rare search items using preprocessing. In some implementations described above, the search engines work by first gathering significant amounts of results matching the query, and filtering out low relevance results before applying a promotion technique. This technique has several advantages, including increasing the speed of the system and reduces network bandwidth required. However, a specific user may be interested in an item having low overall popularity that is filtered out of the results before applying a promotion technique. In the absence of a signature, this rare item may never me presented in the search results (this rare item is sometimes referred to as the "long tail" in the probability distribution sense).

In order to capture the rare item in the ordered search results, some implementations of the system compute the relevance before filtering, using the promotion techniques described above or other promotion techniques. Thus, the rare item is ranked highly for the particular user, allowing him or her to access the item with ease. Here, signatures enable fine-grain customization and increase user satisfaction.

An inherent feature of the stochastic signature mechanism is the probabilistic nature of the signature entries, i.e., the signature entries are all normalized probabilities. This enables the system to export the signatures to other, potentially unrelated systems, with ease. For example, over some period of time, the television system interface described above learns that, in general, a given user prefers the Spirituality genre 50% of the time, Sports genre 40% of the time, and the Seinfeld show 10% of the time. In response, the system creates a set of signatures for the user that captures these preferences. The user can elect to share this signature information with other systems.

Therefore, when the user registers with a website that sells books, the user can elect to share his signature information with this website. Because the signature information is stored in terms of normalized probabilities, the signature can be easily imported into the website that is configured to utilize such probability information. In addition, the website need not have an identical set of genres as that of the television system in order to use the signature information. For example, the website may not have "Seinfeld" defined as a genre or category of books. In this case, the website can simply renormalize the signature by removing the irrelevant entries, i.e., Seinfeld, and determining new normalized probabilities for the remaining genres. Thus, the new normalized probabilities for the user would be 56% for Spirituality and 44% for Sports. Sharing signatures in this way obviates the need for relearning in the new system. Also, different subsets of signatures can be shared for different systems.

Signature Based Preference Service

As explained above, the learning system captures the user's preferences across multiple dataspaces. In addition, portions of the learning system can be incorporated into various user client devices, thereby enabling the system to capture the user's preferences across multiple devices. For example, the system can track the user's actions performed on a mobile telephone, a television system, a handheld computer device, and/or a personal computer. This enables the system to provide personalized services to the user across the multiple dataspaces and multiple devices. Thus, user preferences expressed on one device can be used to personalize the user interactions on a different device.

Likewise, the learning system can provide the learned user preferences captured in the various signatures to third-party service providers. The information provided to third-party service providers allows the service providers to personalize the services for the user outside of the learning system. In such an implementation, the learning system determines what preference information to provide to the service providers based on the nature of the services provided. The learning system can provide this information on a per transaction basis, or the system can periodically synchronize a set of signatures stored by the third-party service provider. Furthermore, the user can configure the learning system so as to control which third-party service receives user preference information.

By providing a centralized system that learns and stores the user's preferences, the learning system enables the user to avoid creating disconnected pockets of personalization associated with only one particular dataspace or device. Therefore, a user may immediately leverage the preference information contained in the user's signatures when interacting with a new service rather than having to wait for the new service to learn the user preferences. Thus, the learning system can provide personalization information to the third-party service provider to improve the user's experience with the service.

This comprehensive personalization across diverse user activities and devices is especially helpful to the user when the user interacts with the same service provider using different interface devices. Not only does the learning system capture the user's preferences from these diverse interactions, but the system also stores the details of the user's transaction for later retrieval by the user. For example, a user can book a flight through a travel website using a personal computer. The learning system captures the detailed information associated with transaction, e.g., the date of travel, the time of the flight, and the departure and destination city. At a later time, the user wishes to modify the travel reservations, and elects to do so using a mobile telephone. Because the system monitors the user's interactions with various service providers, the system recognizes that the user has placed a telephone call to the travel service. In response, the learning system automatically presents the user's upcoming travel itineraries on the user's mobile telephone or sends the information to the travel service's customer service agent with the user's consent.

In the alternative, if the user is presented with an automated voice response system, the learning system can send the relevant itineraries to the travel service (e.g., via an SMS message dispatched to the telephone number called or DTMF tones at the beginning of the telephone call), which would provide the travel service with a background context of the telephone call to improve the automated voice response system's response to the user voice commands. The power of a comprehensive personalization across diverse user activities and devices becomes very evident in voice based navigation applications. Comprehensive personalization can provide the necessary context that can vastly improve ambiguities in user input that plague these types of systems today.

Figure 10:
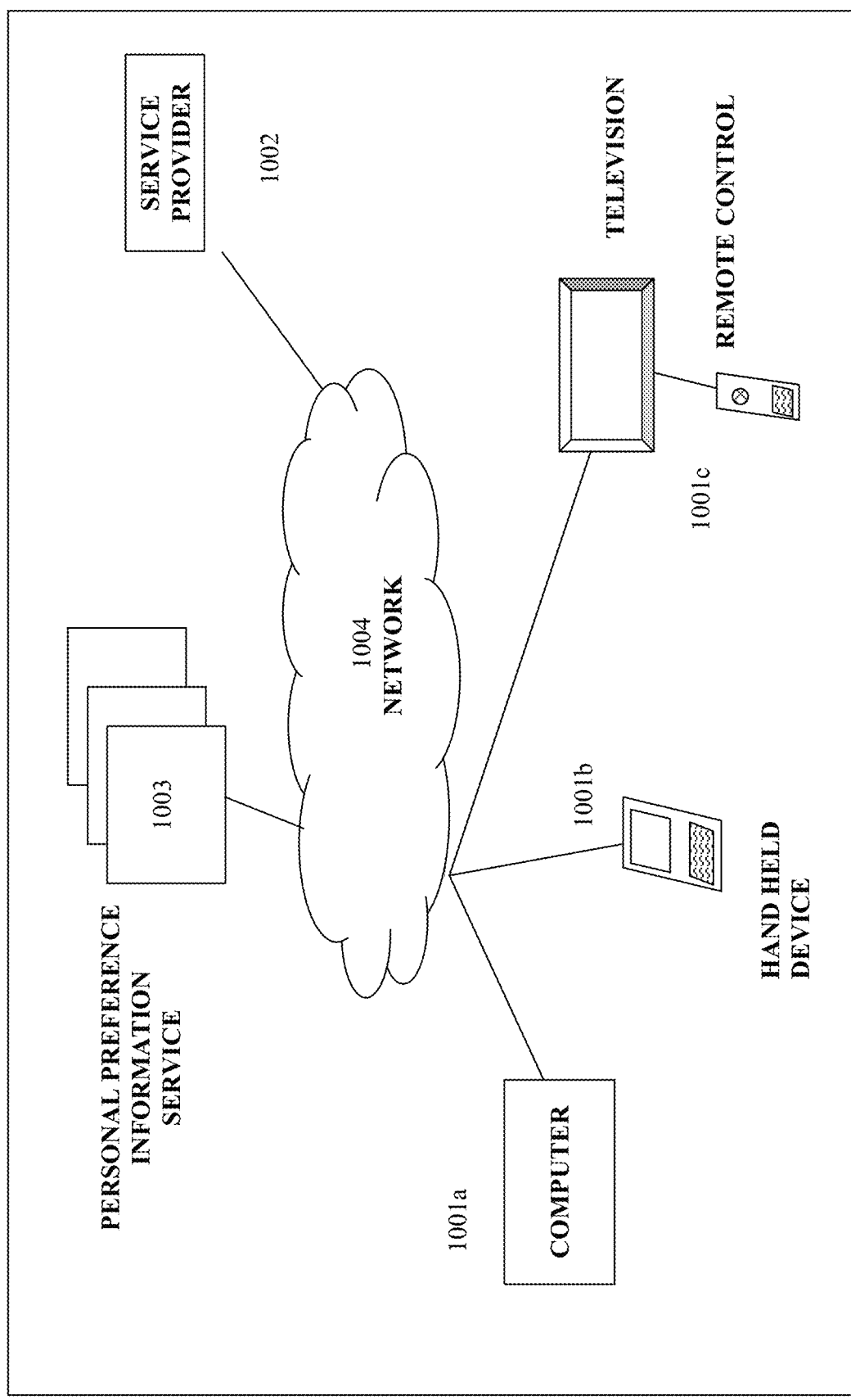
FIG. 10 illustrates a context-specific personal preference information service.

FIG. 10 illustrates a part of the learning system for providing a context specific personal preference information service. In a preferred embodiment, a user device 1001*a-c* solicits a service, on behalf of the user, from a service provider 1002. This can include, for example, making a telephone call to modify a travel itinerary or accessing a search engine to find some information. The context-sensitive personal preference information service 1003 enables the external service provider 1002 to provide a targeted response to the user based on user's prior activity, data access history, and the learned user preferences.

Figure 11:
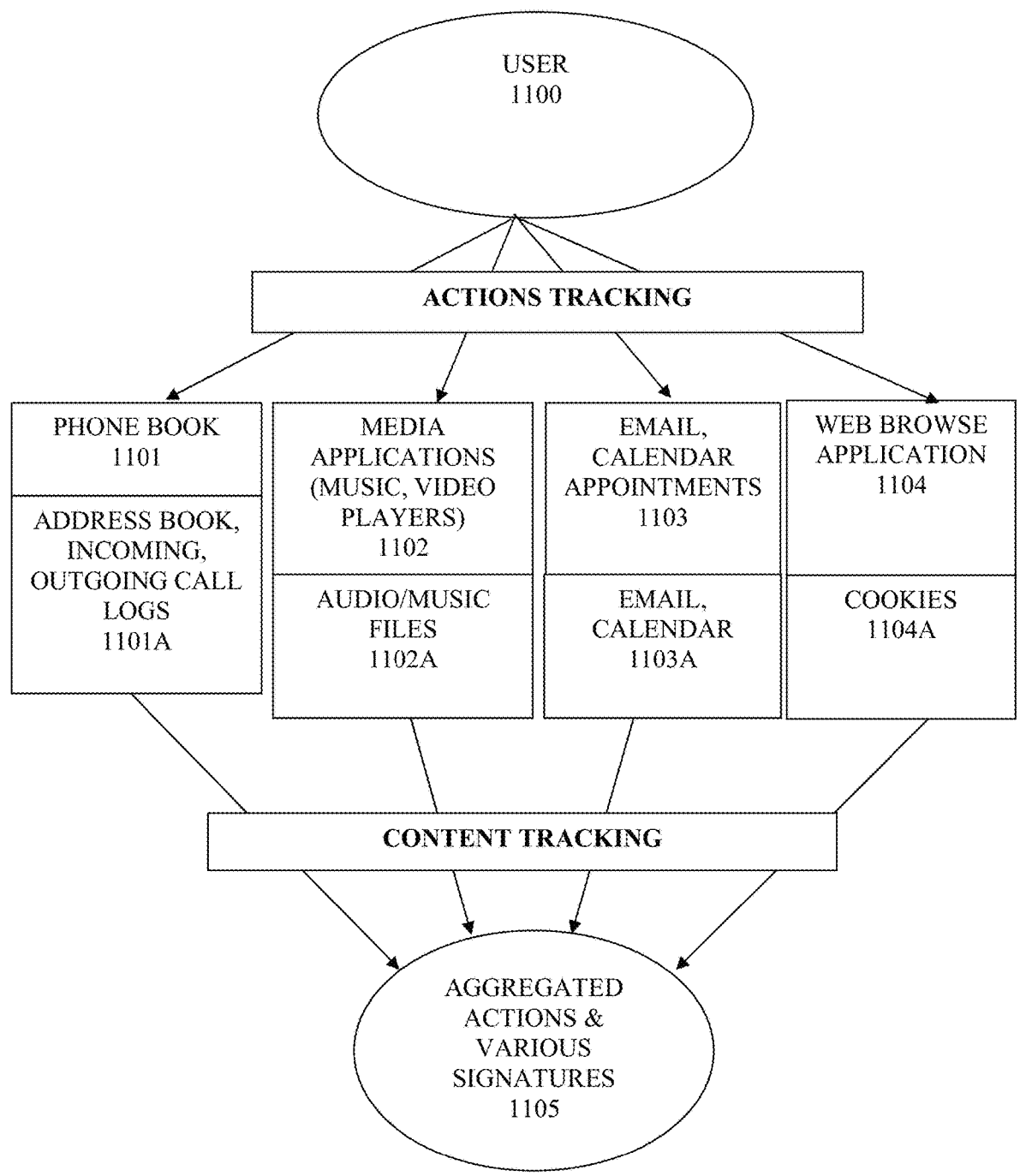
FIG. 11 illustrates the local tracking and strengthening of the personal preference signatures based on user activity and the content on a mobile device.

Service provider 1002 can also serve as the source of information and relevance updates for user device 1001*a-c*. A network 1002 functions as the distribution framework and can be a combination of wired and wireless connections. The navigation devices can have a wide range of interface capabilities and include such devices as a personal or laptop computer 1001*a*, a hand-held device 1001*b* (e.g. phone, PDA, or a music/video playback device) with limited display size and an overloaded or small QWERTY keypad, and a television remote control system 1001*c*, wherein the remote control has an overloaded or small QWERTY keypad. The navigation devices provide user activity data to the learning system via personal preference information service 1003 to create the various signatures. As mentioned above, in alternate embodiments, the user device can create the various signatures, and the signatures can be kept on the device. This enables the device to locally filter and order content items received from service provider 1002 and/or content items that reside on the device itself As described above, the learning system captures the user's preferences from the user's interactions with various dataspaces. FIG. 11 illustrates the local tracking and strengthening of the personal preference signatures based on user activity and the content on a mobile device. For example, user interaction with a telephone book 1101, media applications 1102, email/calendar 1103, and web browser 1104 are tracked, as well as when and where the interaction takes place. In addition to the user's interaction with these applications, the content that is coupled with these applications such as call logs 1101A, music files 1102A, email data/calendar appointments 1103A, and browser cookies 1104A are also tracked to capture the user's preferences. Aggregated actions and various signatures 1105 are captured by the learning system as described above.

The aggregated data and signatures 1105 are used by a wide variety of services, ranging from a local data prefetching service, in order to improve search performance, to a commercial third-party service provider, in order target the user for a specific product offering. The sets of signatures generated by the learning system form an onion-like layered structure; the inner layers are specific and capture the exact details of the user's actions, while the outer layers characterize the user's general preferences. For example, the inner layers capture (1) the time and the location where the user performed an action, (2) the nature of the action (e g tuning to a channel or the purchase of a book, DVD, or airline ticket), and (3) the details of the action (e.g. the channel and/or program the user tuned to, the title of book the user ordered, or the departure and destination airports of an airline ticket purchase). This layered structure coincides with the various signatures created by the learning system. The inner layers correspond to the microgenre and keyword signatures, while the outer layers correspond to the genre signatures.

The service provider requesting the user's signature information can designate the degree of specificity of user preferences desired. For example, a video content search engine wishing to use the user's signatures to order the results of a query may request specific information on which channels or program the user watched. A bookstore, on the other hand, may request broad user preferences of book tastes. The personal signature information sent in the later case would not be the individual instances of purchased books, but rather the broad user preferences at a genre level.

Figure 12:
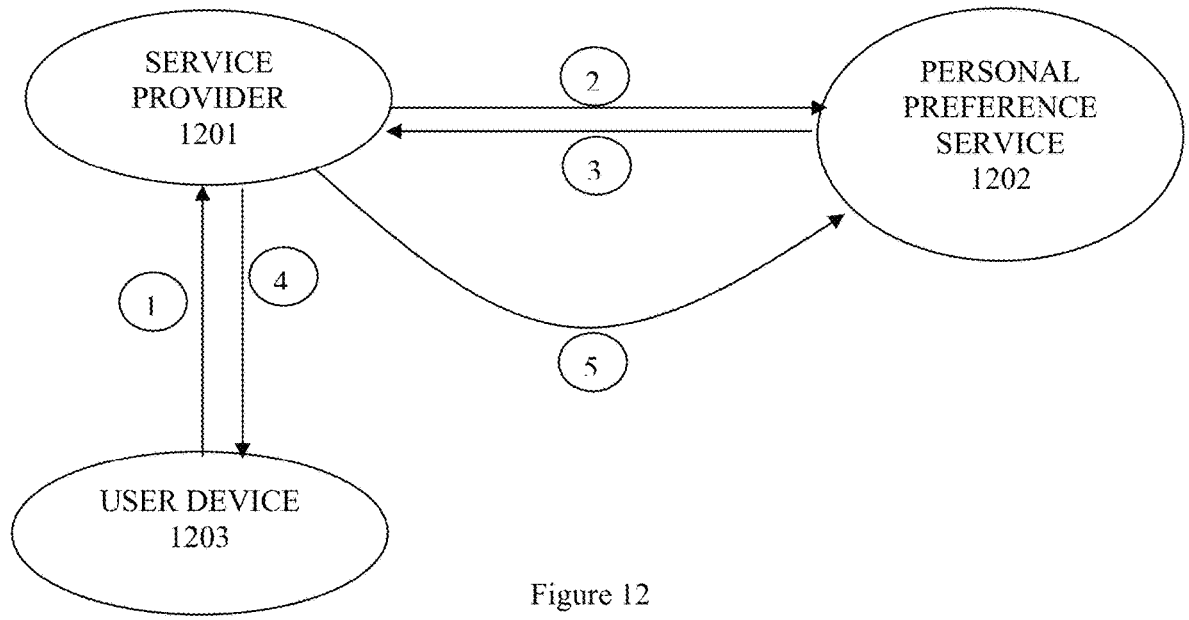
FIG. 12 illustrates the information flow when a user device makes a request to a service provider.

FIG. 12 illustrates the information flow when a user device 1203 makes a request to a service provider 1201 (step 1). The request contains a unique identifier that identifies the user or the user device. The identity could be an anonymous yet unique identifier of the device. For example, a one-way hash function of the device hardware identifier may be used to uniquely identify the device; there would be no way to reverse map to the actual device that generated the response, given the one-way nature of the hash function. In this case, the personal preference service 1202 has only have a set of unique device identifiers that share signatures for each user; there would be no identity information beyond the identifiers. In this way, the user's identity is maintained anonymous, yet responses matching user's preferences can be delivered.

In addition to the substance of the request, the communication from user device 1203 to service provider 1201 contains information that describes the context of the request, as explained below. Service provider 1201 communicates the substance of the request and the additional context information to personal preference service 1202 (step 2). The context information includes the identifier of the user device currently being employed, the location of the user device, if available, the time of the request, and general description of the action the user is performing (e.g., the fact the user is currently using a telephone versus playing media). The additional context information enables personal preference service 1202 to provide context-sensitive personal preference information to service provider 1201. Descriptive tags are assigned to the various actions the user can perform using the system. The system associates these descriptive tags with the signatures that are generated by the corresponding actions. In this way, personal preference service 1202 sends relevant preference information based on the tags sent by user device 1203 to service provider 1201 (step 3).

The relevant personal preference information is used by the service provider 1201 to send a targeted response to the user device 1203 (step 4). Additionally, service provider 1201 sends feedback to personal preference service 1202 about the targeted response that was sent (step 5). This feedback is used by personal preference service 1202 to adjust the personal actions signature of the user.

By disaggregating personal preferences through a standalone entity, i.e. personal preference service 1202, multiple service providers that provide different services can all benefit from the aggregated personal preference accrued across different service providers, different user actions, and different user devices. The end user gains immensely due to the key benefit of having targeted responses to many different types of requests. For example, a user who purchases books from Amazon.com gets the benefit of a targeted response when he goes to the Barnes & Nobles site using the techniques described above.

As described above, personal preference service 1202 can also be a centralized aggregator of user actions across different devices. Thus, user actions performed on different devices, e.g., a mobile computing device, a home television with set-top box, and a personal computer, could all be aggregated to provide user preferences for identifying and ordering search results. For example, a user could initiate a remote recording for a favorite program using a mobile device, where the discovery of the desired program can be made easy by leveraging the user's viewing behavior on a television system. Thus, the available episodes of Seinfeld could be automatically displayed in the mobile device, for example, based on the fact that the user has viewed Seinfeld many times in the past on the television system.

Figure 13:
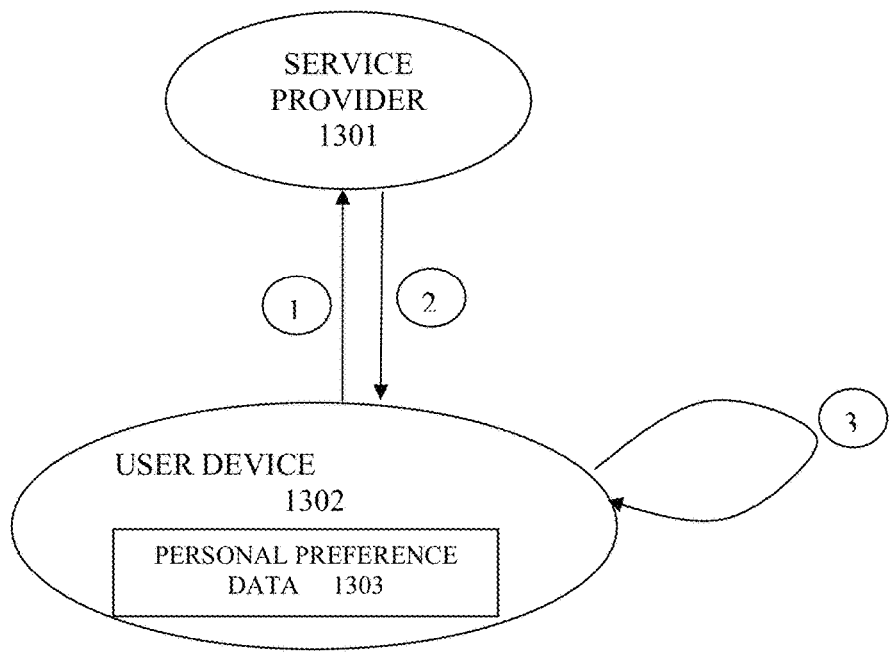
FIG. 13 illustrates an alternate information flow when a user device makes a request to a service provider.

FIG. 13 illustrates the information flow when a user device 1302 makes a request to a service provider 1301. In this scenario, the context sensitive personal preference information is sent along with the request (step 1) to generate a response (step 2). The personal preference data 1303 is locally resident on user device 1302. Additionally, personal preference data 1303 is updated (step 3) based on the response received from service provider 1301.

In another implementation of the learning system, a user device can serve as the personal preference provider in a peer-to-peer fashion for other user devices. For example, in a home entertainment network with more than one DVR (Digital Video Recorder), one DVR can serve as the personal preference provider for another DVR resident in the same home. When the user performs a search for content on a particular DVR, the other DVR in the home provides a personalized preference service to enable the user to find the desired content more quickly by leveraging the prior user viewing habits across the different DVRs.

In addition, a particular user can elect to share his or her signatures with another user. This can be accomplished in a peer-to-peer fashion as described above. In this case, the preferences learned for one user are used to personalize content results for another user. For example, the system will generate a set of signatures for a first user while that user selected various content from a book dataspace. These signatures encode the book reading preferences of the first user. A second user has a similar interest to the first user, and the second user wishes to select books related to similar topics as the first user. In this case, the first user can share his signature with the second user. The system then uses the first user's signatures to personalize the content results for the second user. In this way, the system enables the second user to benefit from the learned preferences of the first user without the second user having to train the system.

Figure 14:
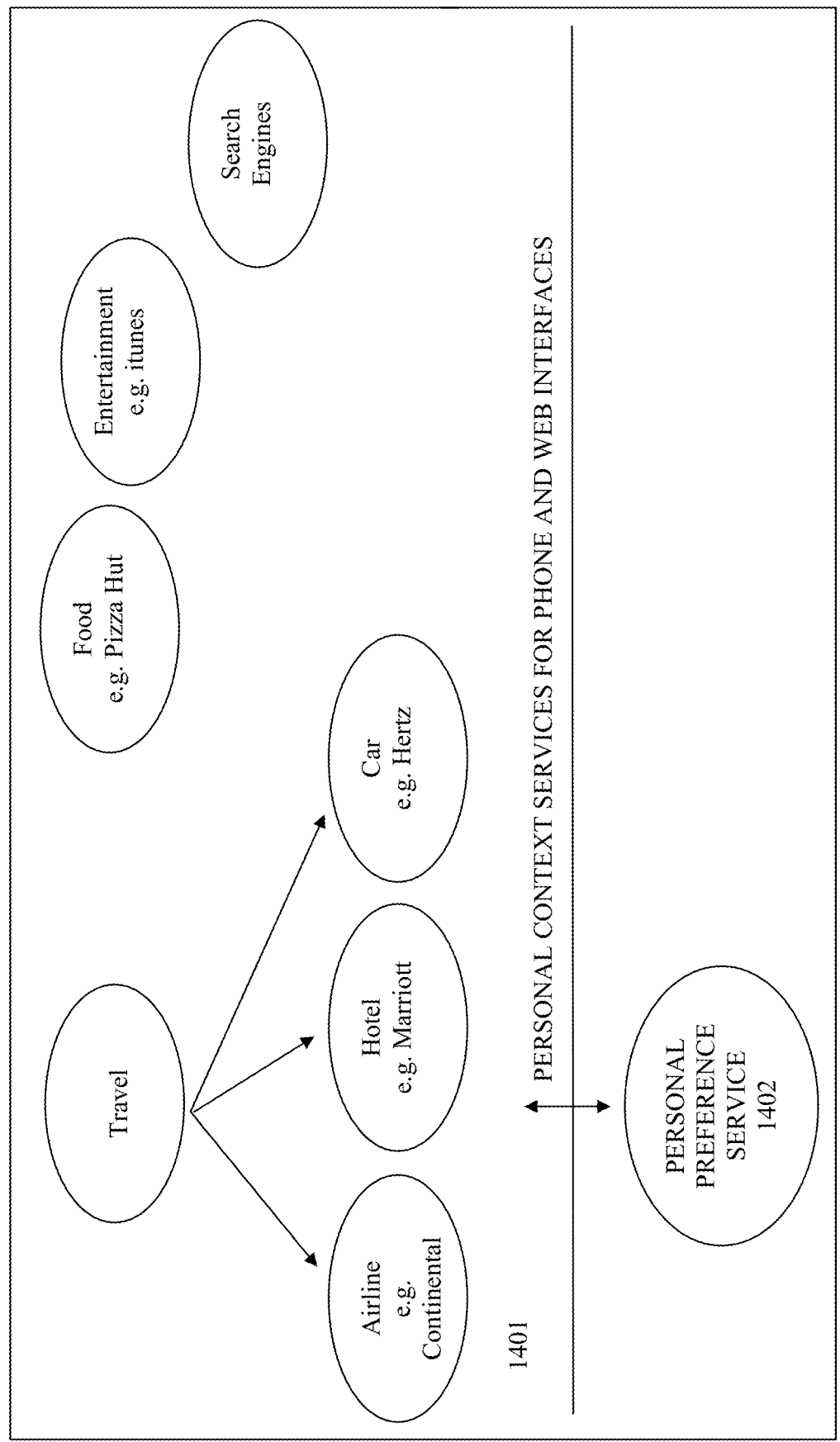
FIG. 14 illustrates examples of services that benefit from the context-sensitive personal preference service.

FIG. 14 illustrates different services 1401, for example, travel services (airline, car, and hotel), food services, entertainment services, and search engines services, that benefit from the context-sensitive personal preference service 1402. Although each service provider may have its own personalized services, when users first identify themselves, the services have no knowledge of the first time customer. The techniques disclosed herein increase the likelihood of the acquiring and retaining first time customers by offering targeted services immediately upon using the service. The techniques disclosed also enhance the first-time user experience. In contrast, without these techniques, users would have to create an account with a service and build an action history with that service before receiving personalized services.

Using the techniques described above, a user, for example, can go to any travel site and the site, without knowing the user and without requiring him to create an account or log in, can still offer the user personalized services based on the history of prior travel actions the user took on other platforms or web sites. Additionally, for services where comprehensive personalization is not in place, these services can leverage the personal preference service discussed above.

Figure 15:
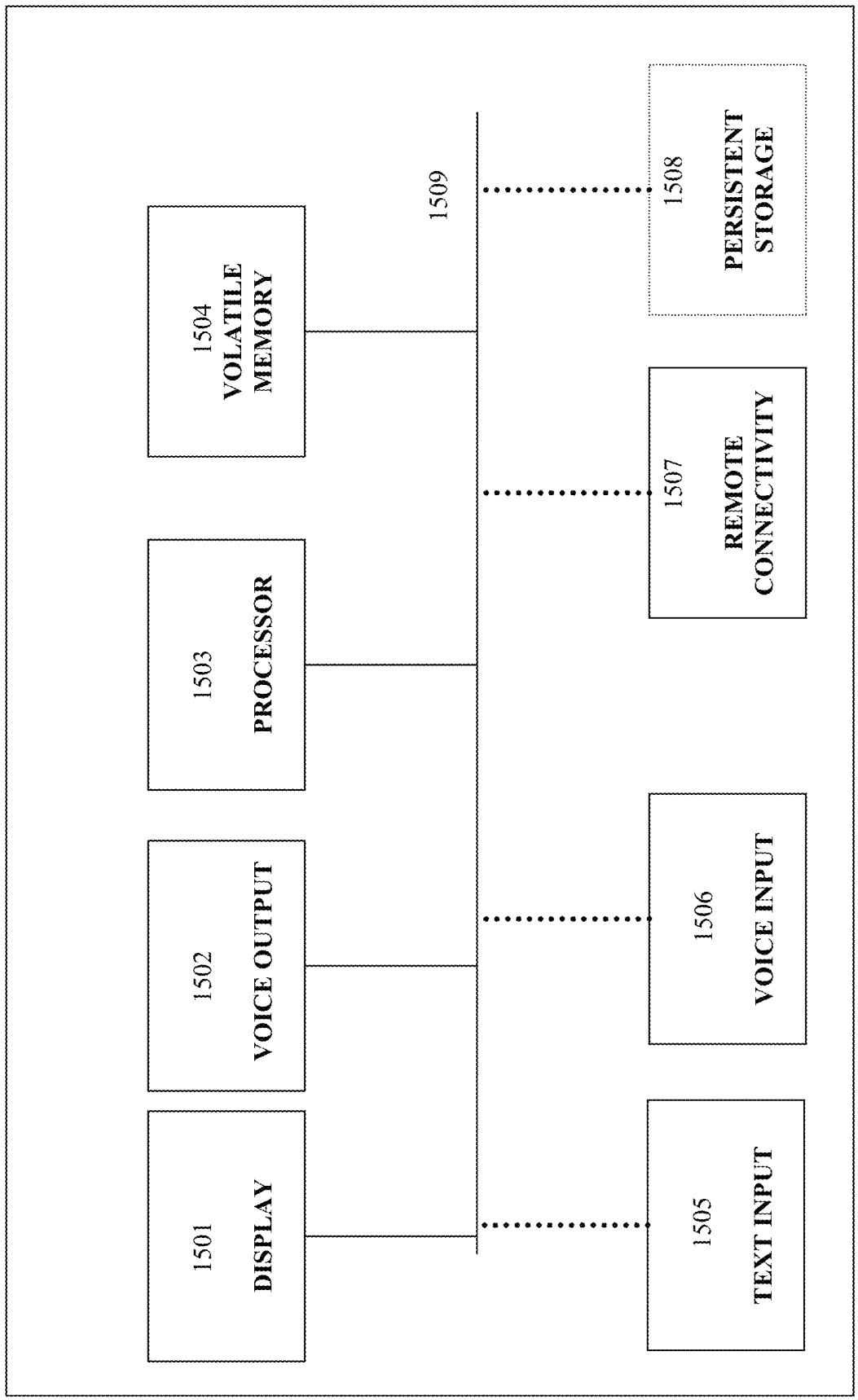
FIG. 15 illustrates possible user device configurations for use with the learning system and the context-sensitive personal preference service.

Because the learning system and personal preference service operate across multiple dataspaces and multiple user devices, the user device configuration can vary greatly. FIG. 15 illustrates possible user device configurations for use with the learning system and the context-sensitive personal preference service. In one configuration, a user device 1509 can have multiple output capabilities, for example, a display 1501 and/or a voice output 1502. In addition, user device can have a processor 1503, volatile memory 1504, a text input interface 1505, and/or voice input 1506. Furthermore, user device 1509 can have remote connectivity 1507 to a server through a network and can have persistent storage 1508.

In another user device configuration, user device 1509 may not have local persistent storage 1508. In such a scenario, user device 1509 would have remote connectivity 1507 to submit the user's request to a server and retrieve responses from the server. In yet another configuration of user device 1509, the device may not have remote connectivity 1507. In such case, the learning system, personalization database, and signatures are locally resident on local persistent storage 1508. Persistent storage 1508 can be a removable storage element, such as SD, SmartMedia, or a CompactFlash card. In a configuration of user device 1509 with remote connectivity 1507 and persistent storage 1508, user device 1509 can use remote connectivity 1507 for a personalization data update or for the case where the personalization database is distributed between local persistent storage 1508 and a server.

It will be appreciated that the scope of the present invention is not limited to the above-described embodiments, but rather is defined by the appended claims, and these claims will encompass modifications of and improvements to what has been described. For example, embodiments have been described in terms of a television content system. However, embodiments of the invention can be implemented on a mobile phone to assist the user in retrieving personal contact information for individuals.

What is claimed is:

1. A method comprising:
monitoring user interactions with a first plurality of media content items of a first third-party service provider application installed on a mobile device, wherein each media content item of the first plurality of media content items has an associated descriptive term to describe content of the respective media content item;
determining a set of media content preferences of the user for the first plurality of media content items of the first application by:
receiving a user selection of a media content item of the first plurality of media content items;
determining an associated descriptive term of content of the media content item; and
identifying the associated descriptive term of the media content item as a media content preference of the set of media content preferences;
determining a subset of the media content preferences of the user that are relevant to a second plurality of media content items of a second third-party service provider application, distinct from the first third-party service provider application; and
selecting and presenting, from within the second third-party service provider application, a media content item of the second plurality of media content items of the second third-party service provider application based on the subset of the media content preferences.

2. The method of claim 1, wherein the second application is an application provided by a third-party service provider with respect to a service provider of the mobile device.

3. The method of claim 1, wherein presenting the content item further comprises presenting the content item of the second plurality of content items of the second application in response to receiving incremental input entered by the user for incrementally identifying desired content items of the second plurality of content items of the second application.

4. The method of claim 1, wherein the selecting and presenting of the content item is further based on popularity values associated with each content item of the second plurality of content items, and wherein each popularity value indicates a relative measure of a likelihood that the respective content item is desired by the user.

5. The method of claim 1, wherein a plurality of content items of the second application or the first plurality of content items of the mobile device are contained on at least one of a cable television system, a video-on-demand system, an IPTV system, and a personal video recorder.

6. The method of claim 1, wherein the second application has not characterized the content preferences of the user.

7. The method of claim 1, wherein monitoring the user interactions further comprises monitoring the user interactions with a plurality of applications installed on the mobile device.

8. The method of claim 1, further comprising generating a request for the subset of content preferences from the second application.

9. A non-transitory computer-readable medium having instructions encoded thereon, the instructions comprising:
instructions for monitoring user interactions with a first plurality of media content items of a first third-party service provider application installed on a mobile device, wherein each media content item of the first plurality of media content items has an associated descriptive term to describe content of the respective media content item;

instructions for determining a set of media content preferences of the user for the first plurality of media content items of the first application by:
   receiving a user selection of a media content item of the first plurality of content items;
   determining an associated descriptive term of content of the media content item; and
   identifying the associated descriptive term of the media content item as a media content preference of the set of media content preferences;
instructions for a subset of the media content preferences of the user that are relevant to a second plurality of media content items of a second third-party service provider application, distinct from the first third-party service provider application; and
instructions for selecting and presenting, from within the second third-party service provider application, a media content item of the second plurality of media content items of the second third-party service provider application based on the subset of the media content preferences.

10. The non-transitory computer-readable medium of claim 9, wherein the first application comprises at least one of a phone application, phone book application, address book application, calendar application, downloadable media content application, television application, travel application, web application, and book application.

11. The non-transitory computer-readable medium of claim 9, wherein the instructions for presenting the content item further comprise instructions for presenting the content item of the second plurality of content items of the second application in response to receiving incremental input entered by the user for incrementally identifying desired content items of the second plurality of content items of the second application.

12. The non-transitory computer-readable medium of claim 9, wherein the instructions for selecting and presenting of the content item further comprise instructions for selecting and presenting of the content item based on popularity values associated with each content item of the second plurality of content items, and wherein each popularity value indicates a relative measure of a likelihood that the respective content item is desired by the user.

\* \* \* \* \*